United States Patent [19]

Ikeda et al.

[11] Patent Number: 5,442,538
[45] Date of Patent: Aug. 15, 1995

[54] APPARATUS FOR CONTROLLING POWER CONVERTER BASED ON OUTPUT CURRENT

[75] Inventors: Katsumi Ikeda; Yushin Yamamoto, both of Kobe, Japan

[73] Assignee: Mitsubishi Denki Kabushiki Kaisha, Tokyo, Japan

[21] Appl. No.: 178,204

[22] Filed: Jan. 6, 1994

[30] Foreign Application Priority Data

Jan. 7, 1993 [JP] Japan .................................. 5-001387
Jul. 8, 1993 [JP] Japan .................................. 5-168778

[51] Int. Cl.⁶ ............................................. H02M 3/24
[52] U.S. Cl. ......................................... 363/95; 363/71
[58] Field of Search ......................... 363/71, 74, 78, 79, 363/95, 97, 98, 131, 132

[56] References Cited

U.S. PATENT DOCUMENTS

| | | | |
|---|---|---|---|
| 4,757,434 | 7/1988 | Kawabata et al. | |
| 4,803,611 | 2/1989 | Sashida et al. | 363/98 |
| 4,823,251 | 4/1989 | Kawabata et al. | 363/95 |
| 4,947,310 | 8/1990 | Kawabata et al. | 363/71 |
| 5,212,630 | 5/1993 | Yamamoto et al. | 363/71 |
| 5,257,180 | 10/1993 | Sashida et al. | 363/71 |

FOREIGN PATENT DOCUMENTS

| | | | |
|---|---|---|---|
| 0243840 | 4/1987 | European Pat. Off. | H02M 7/5387 |
| 0301483 | 7/1988 | European Pat. Off. | H02M 7/538 |
| 3703218 | 11/1988 | Germany | H02M 7/48 |

OTHER PUBLICATIONS

Fifth International Telecommunications Energy Conference, Oct. 18–21, 1983 IECE of Japan.
Intelec83 [Fifth International Telecommunications Energy Conference] (Oct. 18–23, 1983 Tokyo) p. 205–212 "Inverter Output Voltage Waveform Closed-Loop Control Technique" Y. Sekino, M. Shibata, N. Notaka.

Primary Examiner—Steven L. Stephan
Assistant Examiner—Matthew V. Nguyen
Attorney, Agent, or Firm—Leydig, Voit & Mayer

[57] ABSTRACT

A control apparatus for controlling a power converter includes a plurality of switching devices and enabling converted AC output to be obtained to supply arbitrary AC outputs to a load. A voltage command value generating device for generating a voltage command value is provided to command voltage to be transmitted from the power converter. A voltage control device is provided for controlling a plurality of switching devices of the power converter in accordance with a command voltage level. An electric current detection device is included for detecting an output electric current to be supplied from the power converter to the load. An electric current limiting device is provided for restricting the command voltage level to be supplied to the voltage control device in accordance with a value detected by the electric current detection device.

25 Claims, 57 Drawing Sheets

APPARATUS FOR CONTROLLING POWER CONVERTER BASED ON OUTPUT CURRENT

BACKGROUND OF THE INVENTION

1. Field of the Invention

The present invention relates to a control circuit of a power converter for precisely controlling output voltage from a power converter which has a plurality of switching devices and which is capable of obtaining AC conversion output.

2. Description of the Related Art

FIG. 57 is a block connection diagram equivalent to a conventional inverter control circuit of a type, for example, disclosed in "Inverter Output Voltage Waveform Closed Loop Control Technique", p.205 to 212, a collection of theses, FIFTH INTERNATIONAL TELECOMMUNICATIONS ENERGY CONFERENCE (oct, 18 to 21, Tokyo), Intelec 83.

Referring to FIG. 57, reference numeral 1 represents a main inverter circuit, 2 and 3 respectively represent a reactor and a capacitor which form an AC filter, 4 represents a DC power source, 5 represents a load, 7 represents a drive circuit for the main inverter circuit 1, 801 represents an AC sine-wave reference oscillation circuit, 802 represents an amplitude command generating circuit and 803 represents a voltage control amplifier. Reference numeral 804 represents a pulse-width modulation circuit (hereinafter called a "PWM circuit") comprising, for example, a comparative circuit 804a and a carrier wave generating circuit 804b as shown in FIG. 58. Reference numeral 811 represents a multiplier and 812 represents an adder/subtracter.

The operation of the circuit shown in FIG. 57 will now be described.

A portion of the circuit between the terminals of the capacitor 3 thereof enables output voltage to be obtained, the level of which corresponds to control output PWMO from the PWM circuit 804. On the other hand, the output from the AC sine-wave reference oscillation circuit 801 and that from the amplitude command generating circuit 802 are multiplied in the multiplier 811 so that output voltage command $V_C^*$ is made. Then, the deviation between the output voltage command $V_C^*$ and output voltage $V_C$ is calculated by the adder/subtracter 812. The voltage control amplifier 80.3 and the PWM circuit 804 control the switching operation of the inverter 1 to make the foregoing voltage deviation to be zero.

Since the conventional apparatus for controlling the power converter, such as the inverter, has been constituted as described above, there arises the following problems.

(1) The main inverter circuit 1 is operated as a very low impedance voltage source when viewed from the output side thereof. Therefore, a problem of short circuit sometimes rises on the load side of the main inverter circuit 1. Another problem arises if an in-rush current flows due to a supply of transformer voltage in that an excess flow of the output electric current easily realizes an excess current state and therefore protection of circuit elements becomes difficult.

(2) Since the voltage control system of the main inverter circuit 1 includes an LC filter having an unsatisfactory damping characteristic, the voltage control amplifier 803 cannot easily be so designed as to prevent the resonance of the foregoing filter to stabilize the voltage control system.

(3) Since the reactor 2 is, in series, connected to the output terminal of the main inverter circuit 1 and the voltage drop of the reactor 2 is changed to follow the electric current flowing through the load 5, there arises a necessity for the voltage control amplifier 803 to completely and quickly compensate the foregoing voltage drop in order to control the output voltage to be a desired value. Therefore, even if no precise output voltage is needed, the output voltage control performed by the voltage control amplifier 803 is needed to compensate the voltage drop in the reactor 2. If precise output voltage is needed, the design must be so made that the voltage control amplifier 803 has a large gain. However, the stability of the voltage control system limits the gain enlargement, and therefore overshoot or undershoot of the output voltage corresponding to the response of the voltage control system undesirably takes place if the load has been changed rapidly.

SUMMARY OF THE INVENTION

The present invention is directed to overcome the foregoing problems and an object therefore is to provide an apparatus for controlling a power converter with which the power converter and the output line can easily be protected from an excess current.

Another object of the present invention is to obtain a control apparatus for controlling a power converter which is able to improve the apparent damping factor of an LC filter, with which the design of a voltage control amplifier is facilitated, which is able to compensate voltage drop of a serial reactor at speed higher than the response of a voltage control system to improve the output voltage characteristic and with which the converter and the output line can easily be protected from excess currents.

A control apparatus for controlling a power converter according to the present invention comprises: voltage command value generating means for generating a voltage command value to command voltage to be transmitted from the power converter; voltage control means for controlling a plurality of switching devices of the power converter in accordance with a commanded voltage level; electric current detection means for detecting an output electric current to be supplied from the power converter to the load; and electric current limiting means for restricting the commanded voltage level to be supplied to the voltage control means in accordance with a value detected by the electric current detection means.

DESCRIPTION OF THE PREFERRED EMBODIMENT

First Embodiment

Figure 1:
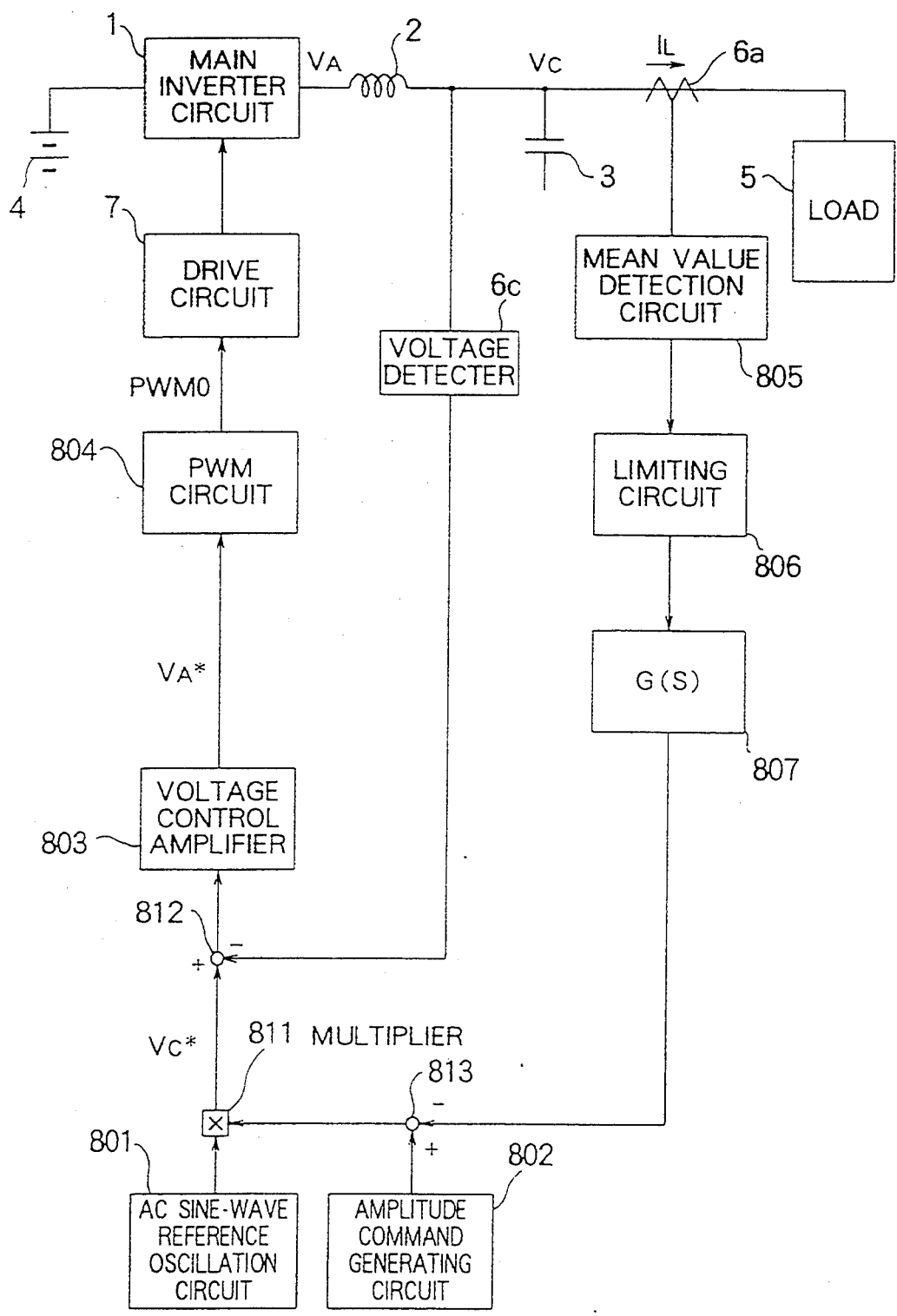
FIG. 1 is a block diagram which illustrates a first embodiment of the present invention.
Figure 2A:
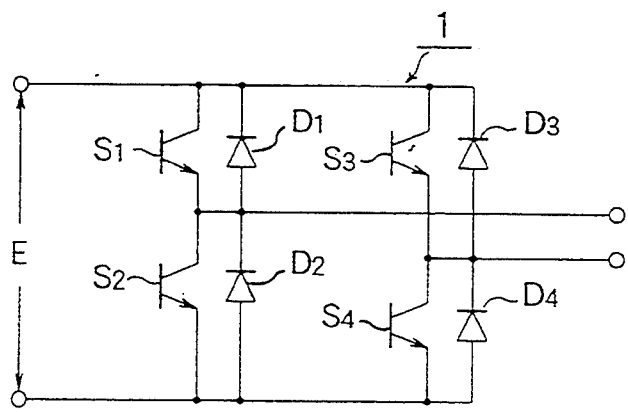
FIG. 2A is a block diagram which illustrates a circuit of a power converter (a main inverter circuit) for use in the present invention.

FIG. 1 illustrates a first embodiment of the present invention. Referring to FIG. 1, reference numeral 1 represents a main inverter circuit exemplified by a circuit for modulating the pulse width of a single-phase full bridge inverter triangle-wave carriers of about 1 to 2 KHz. The single-phase full bridge inverter includes transistors $S_1$ to $S_4$ to which diodes $D_1$ to $D_4$, disposed as shown in FIG. 2a, are inversely connected in parallel. Reference numerals 2 and 3 respectively represent a reactor and a capacitor for a filter, 4 represents a DC power source, 5 represents a load, 7 represents a drive circuit for the main inverter circuit 1, 6a represents a detector for detecting load current $I_L$, and 6c represents a voltage detector for detecting output voltage $V_C$.

Referring to FIG. 1, reference numerals between eight and nine hundred represent elements of a control circuit. Reference numeral 801 represents an AC sine-wave reference oscillation circuit, 802 represents an amplitude command generating circuit, 803 represents a voltage control amplifier, 804 represents a PWM circuit, 805 represents a mean value detection circuit, 806 represents limiting circuit, 807 represents a transfer function G (S), 811 represents a multiplier, and 812 and 813 represent adders/subtracters.

If a function having, for example, a non-linear characteristic, with which the output is multiplied by coefficient times with respect to the input while limiting the same below a certain level, is used as the transfer function G (S) 807, the output voltage is dropped in proportion to a small input. If a large input is received, the amount of the drop of the voltage is limited.

The operation of the thus-constituted first embodiment will now be described with reference to FIG. 1. In order to make output voltage command $V_C^*$ which is the output from the multiplier 811, coincide with output voltage $V_C$ detected by the voltage detector 6c, the voltage control amplifier 803 and the PWM circuit 804 form a voltage control loop so that the switching operation to be performed by the main inverter circuit 1 is controlled.

Load current $I_L$ is detected by the detector 6a, and a mean load electric current value is detected by the mean value detection circuit 805. The limiting circuit 806 has a maximum load current set thereto so that the output from the limiting circuit 806 is zero if the mean load current value is smaller than the predetermined value. If the mean load current value is larger than the predetermined value, a value obtained by subtracting the predetermined value from the mean load current value is transmitted from the limiting circuit 806.

The output from the limiting circuit 806 is passed through the transfer function G (S) 807 as to be subtracted from the output transmitted by the amplitude command generating circuit 802 in the adder/subtracter 813. The output from the adder/subtracter 813 and that from the AC sine-wave reference oscillation circuit 801 are multiplied in the multiplier 811 so that the output voltage command $V_C^*$ is obtained. Therefore, the output voltage command $V_C^*$ is dropped if the mean load current value is larger than the predetermined value set to the limiting circuit 806. Further, the foregoing voltage control loop causes the output voltage $V_C$ to be also dropped to follow the output voltage command $V_C^*$. If the output voltage $V_C$ has been dropped, also the load current $I_L$ is decreased. As a result, the output line can be protected from an excess electric current.

That is, when the inverter is viewed from the output side thereof, the transfer function G (S) 807 is operated as to be a virtual output impedance to drop the output voltage $V_C$ only when the load current $I_L$ larger than the predetermined value has been passed.

Therefore, if the absolute value $|G(S)|$ of the transfer function G (S) 807 is $\infty$, an excess of the load current $I_L$ over the predetermined value due to occurrence of short circuit of a load or the like causes an output impedance $\infty$ to appear because of the response of the mean value circuit. As a result, the output voltage $V_C$ is dropped until the load current $I_L$ is made to be smaller than the predetermined value. Since $|G(S)|$ is finite in actuality, the load current $I_L$ becomes a value somewhat larger than the predetermined value. However, no practical problem arises if the value of the $|G(S)|$ is made to be a sufficiently large value.

The transfer function G (S) 807 may be an arbitrary function if it has an adequate impedance value. If the circuit is a proportional circuit for example, it serves as a resistor. If the same is a differentiating circuit, the transfer function G (S) 807 serves as a reactor. If the same is an integrating circuit, it serves as a capacitor. If the same is a combination circuit of proportional, integrating and differentiating circuits, it serves as a circuit formed by combining a resistor, a capacitor and a reactor. Further, a circuit containing a non-linear element may be employed if it has an adequate impedance which limits the load current $I_L$.

Second Embodiment

Figure 4:
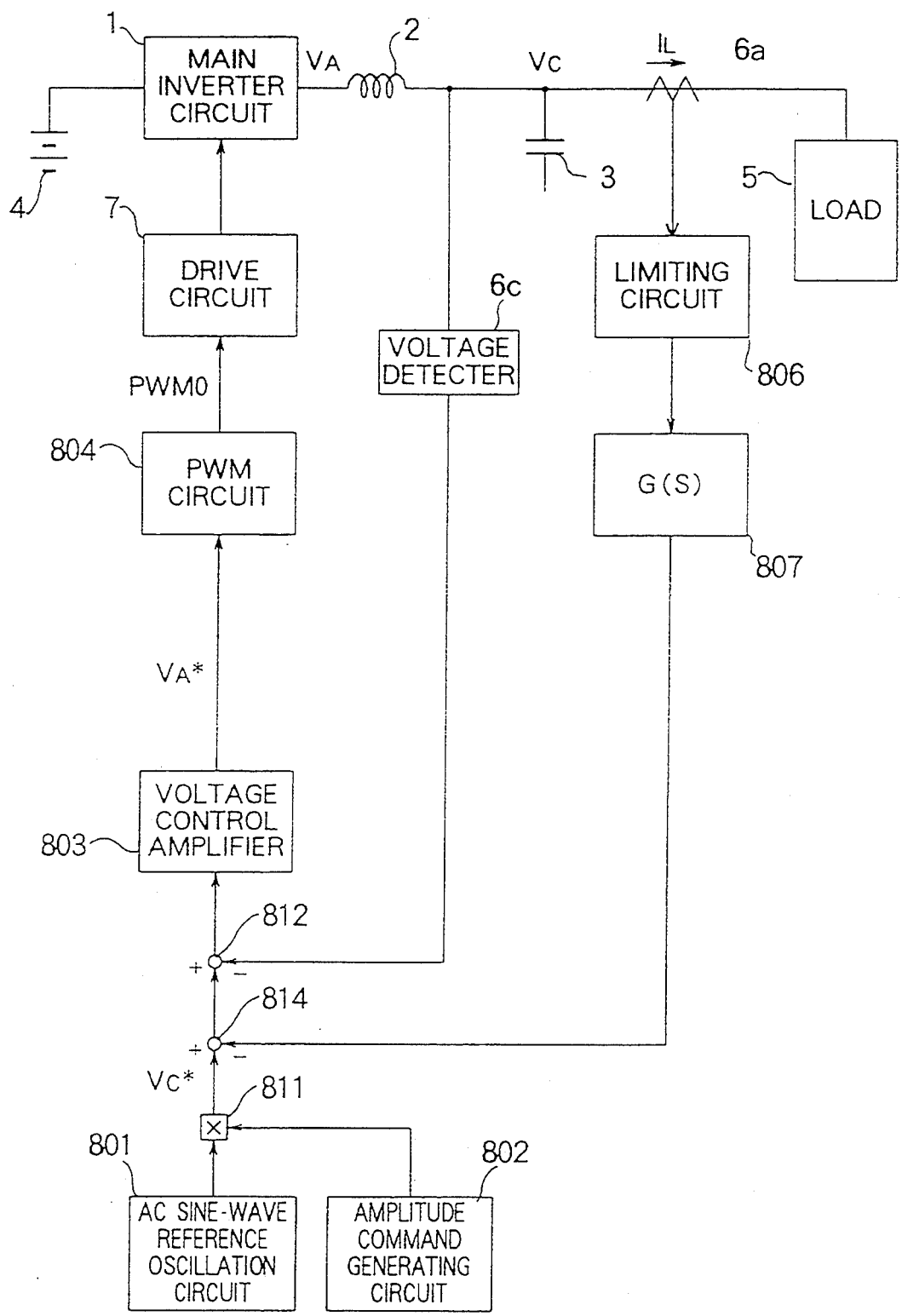
FIGS. 4 to 35 are block diagrams which respectively illustrate second to thirty-three embodiments.

FIG. 4 illustrates a second embodiment of the present invention. Elements corresponding to those shown in FIG. 1 are given the same reference numerals and their detailed descriptions are omitted here. The difference from the foregoing first embodiment lies in that the instantaneous value of the load current $I_L$ is used to change the output voltage command $V_C^*$ as to form a virtual output impedance. The residual structures are the same as those of the first embodiment.

In the circuit shown in FIG. 4, the instantaneous value of the load current $I_L$ is supplied to the limiting circuit 806. If the instantaneous value of the load current is larger than a predetermined positive value or smaller than a predetermined negative value, a value obtained by subtracting the predetermined value from the instantaneous value of the load current is transmitted from the limiting circuit 806. The output from the limiting circuit 806 is passed through the transfer function G (S) 807 and subtracted, in the adder/subtracter 814, from the output voltage command $V_C^*$, which is the output from the multiplier 811.

Since the second embodiment is arranged in such a manner that the output voltage command $V_C^*$ is instantaneously dropped if the instantaneous value of the load current $I_L$ is larger than the predetermined value set to the limiting circuit 806, the load current $I_L$ can be, at high speed, limited within a predetermined value range set to the limiting circuit due to the response of the voltage control loop.

Third Embodiment

Figure 5:
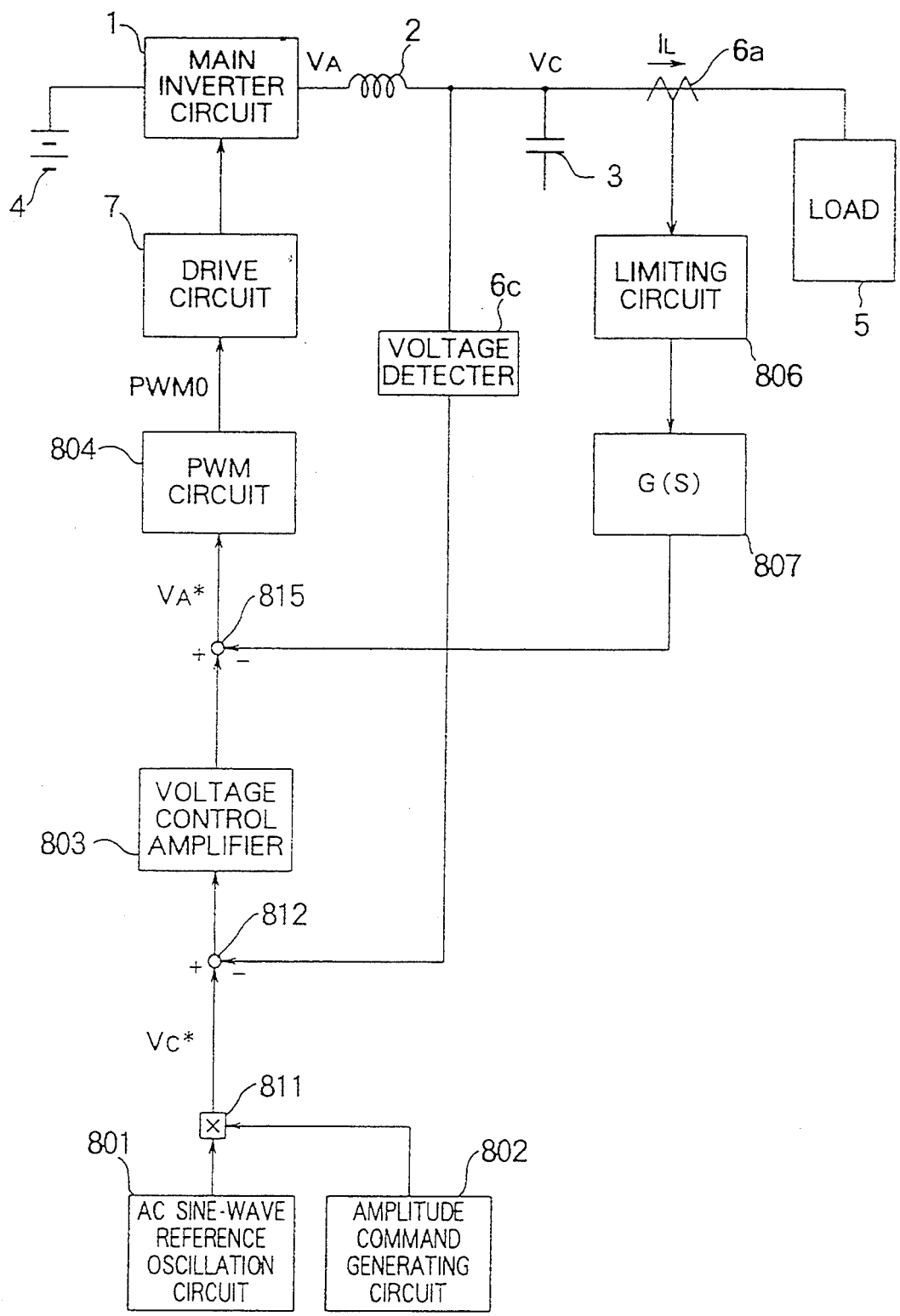

FIG. 5 illustrates a third embodiment of the present invention. Referring to FIG. 5, elements corresponding to those shown in FIG. 1 are given the same reference numerals and their detailed descriptions are omitted here. The difference from the foregoing first embodiment lies in that the instantaneous value of the load current $I_L$ is used to change PWM voltage command $V_A^*$ to form a virtual output impedance. The residual structures are the same as those of the first embodiment.

In the circuit shown in FIG. 5, the instantaneous value of the load current $I_L$ is supplied to the limiting circuit 806. If the instantaneous value of the load current is larger than a predetermined positive value or smaller than a predetermined negative value, a value obtained by subtracting the predetermined value from the instantaneous value of the load current is transmitted from the limiting circuit 806. The output from the limiting circuit 806 is passed through the transfer function G (S) 807 and subtracted, in the adder/subtracter 815, from the output transmitted by the voltage control multiplier 803. The output from the adder/subtracter 815 is used as the PWM voltage command $V_A^*$.

Since the third embodiment is arranged in such a manner that the PWM voltage command $V_A^*$ is instantaneously dropped if the instantaneous value of the load current $I_L$ is larger than the predetermined value set to the limiting circuit 806, the load current $I_L$ can instantaneously be limited within a predetermined value range set to the limiting circuit 806 due to the response of PWM circuit 804.

Fourth Embodiment

Figure 6:
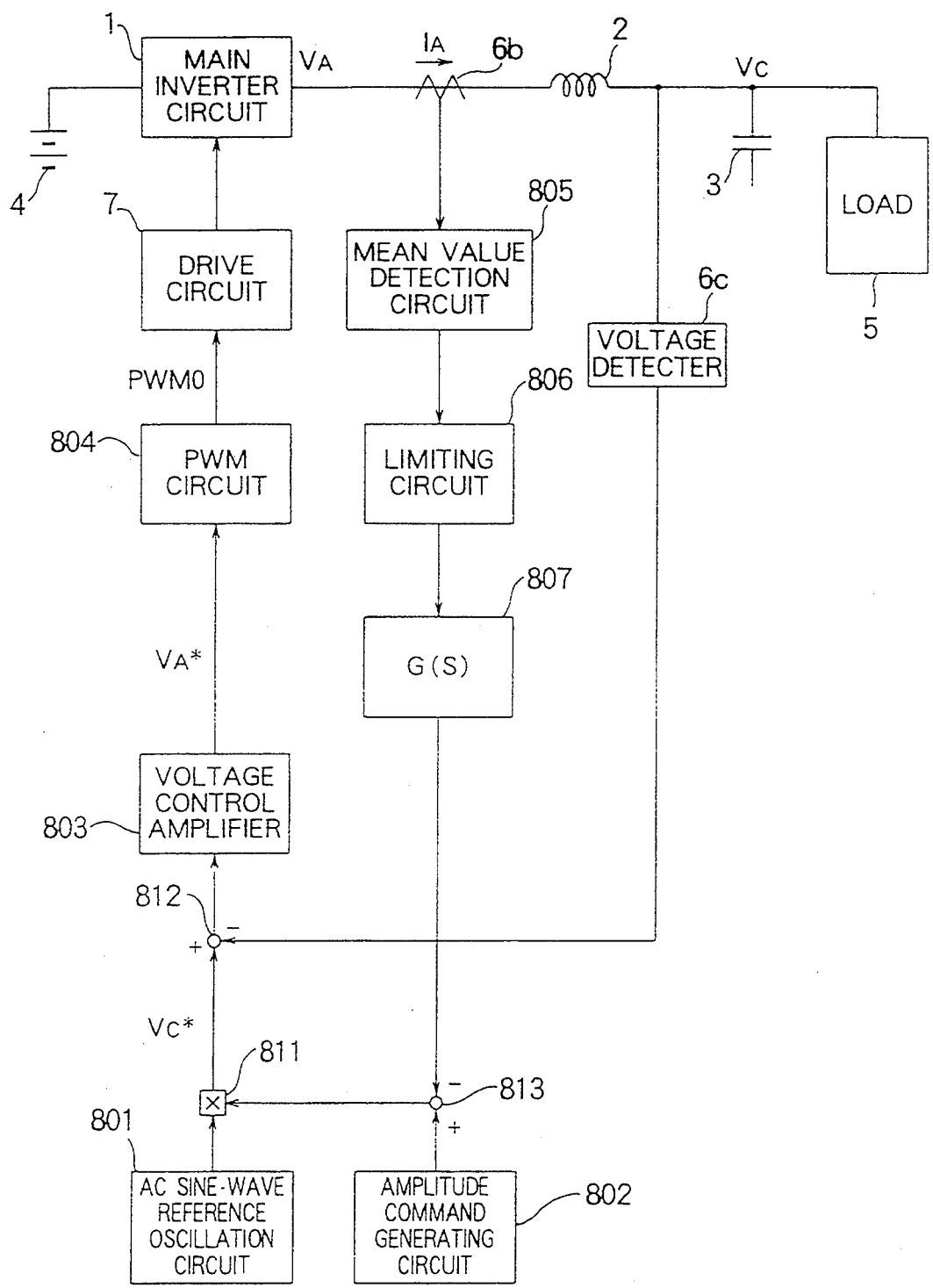

FIG. 6 illustrates a fourth embodiment of the present invention. Referring to FIG. 6, elements corresponding to those shown in FIG. 1 are given the same reference numerals and their detailed descriptions are omitted here. The difference from the foregoing first embodiment lies in that the mean value of inverter current $I_A$ is used to change the output voltage amplitude command to form a virtual output impedance. The residual structures are the same as those of the first embodiment.

Referring to FIG. 6, the inverter current $I_A$ is detected by a detector 6b, while a mean inverter current is detected by the mean value detection circuit 805. The limiting circuit 806 has a maximum inverter current set thereto so that the output from the limiting circuit 806 is zero if the mean inverter current, which is the output from the mean value detection circuit 805, is smaller than the predetermined value. If the mean inverter current is larger than the predetermined value, a value obtained by subtracting the predetermined value from the mean inverter current is transmitted from the limiting circuit 806.

The output from the limiting circuit 806 is passed through the transfer function G (S) 807 and subtracted, in the subtracter 813, from the output from the amplitude command generating circuit 802. Since the output from the subtracter 813 and the output from the AC sine-wave reference oscillation circuit 801 are multiplied in the multiplier 811 to obtain output voltage command $V_C^*$, the output voltage command $V_C^*$ is dropped if the mean inverter current is larger than the predetermined value set to the limiting circuit 806. Also the output voltage $V_C$ is dropped to follow the output voltage command $V_C^*$ by the voltage control loop. If the output voltage $V_C$ has been dropped, the inverter current $I_A$ is decreased. Therefore, the converter can be protected from an excess current.

Since the fourth embodiment is structured in such a manner that the output voltage amplitude command is dropped if the mean value of the inverter current $I_A$ is larger than the predetermined value set to the limiting circuit 806, the inverter current $I_A$ can be limited in an averaged manner to be smaller than the predetermined value set to the limiting circuit 806.

Fifth Embodiment

Figure 7:
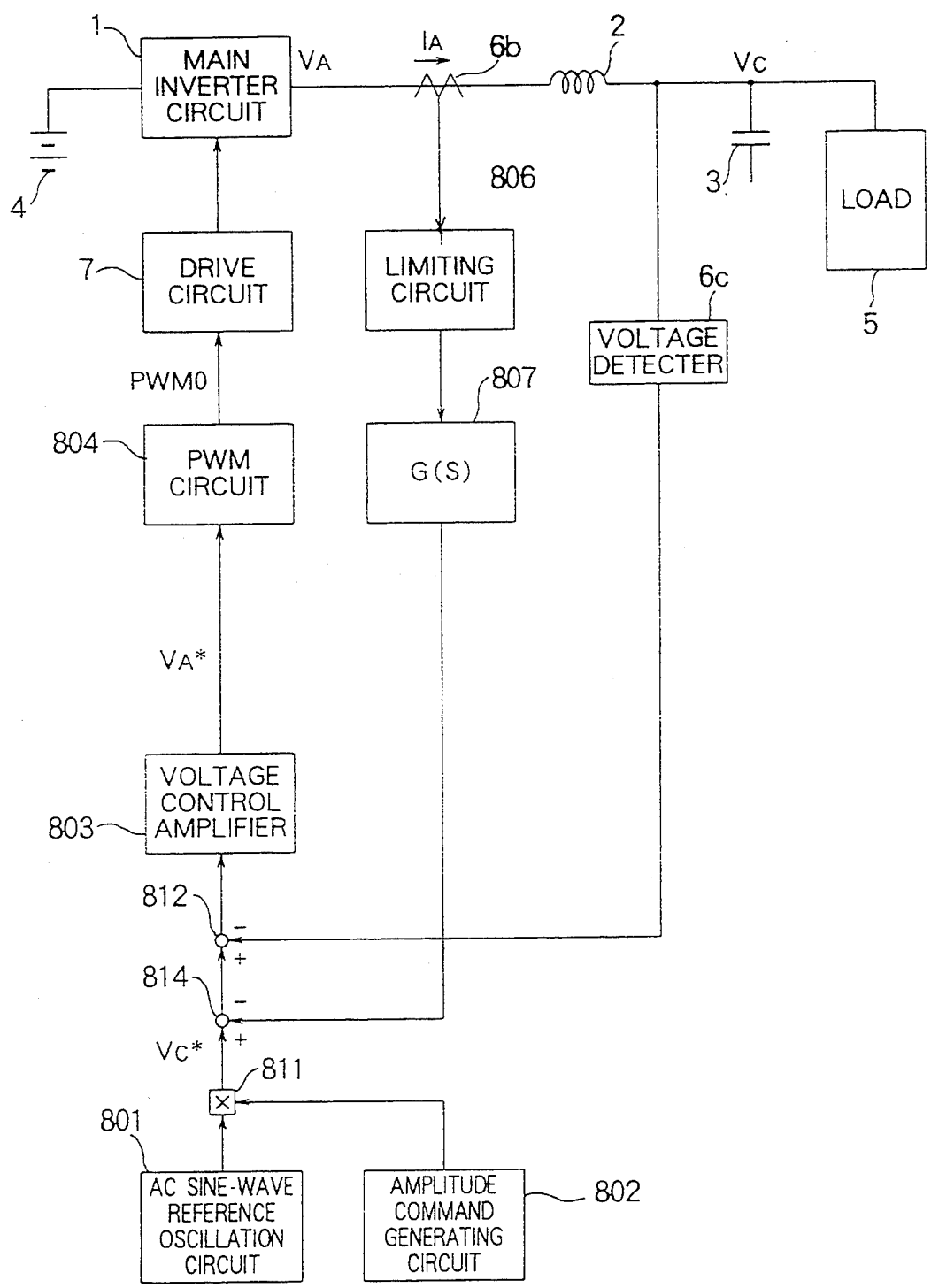

FIG. 7 illustrates a fifth embodiment of the present invention. Referring to FIG. 7, elements corresponding to those shown in FIG. 6 are given the same reference numerals and their detailed descriptions are omitted here. The difference from the foregoing fourth embodiment lies in that the instantaneous value of the inverter current $I_A$ is used to change the output voltage command $V_C^*$ to form a virtual output impedance. The residual structures are the same as those of the fourth embodiment.

Referring to FIG. 7, the instantaneous value of the inverter current $I_A$ is supplied to the limiting circuit 806. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806. The output from the limiting circuit 806 is passed through the transfer function G (S) 807 and subtracted, in the adder/subtracter 814, from the output voltage command $V_C^*$, which is the output from the multiplier 811.

Since the fifth embodiment is arranged in such a manner that the output voltage command $V_C^*$ is instantaneously dropped if the instantaneous value of the inverter current $I_A$ is larger than the predetermined value set to the limiting circuit 806, the inverter current $I_A$ can be, at high speed, limited to a value range set to the limiting circuit 806 due to the response of the voltage control loop.

Sixth Embodiment

Figure 8:
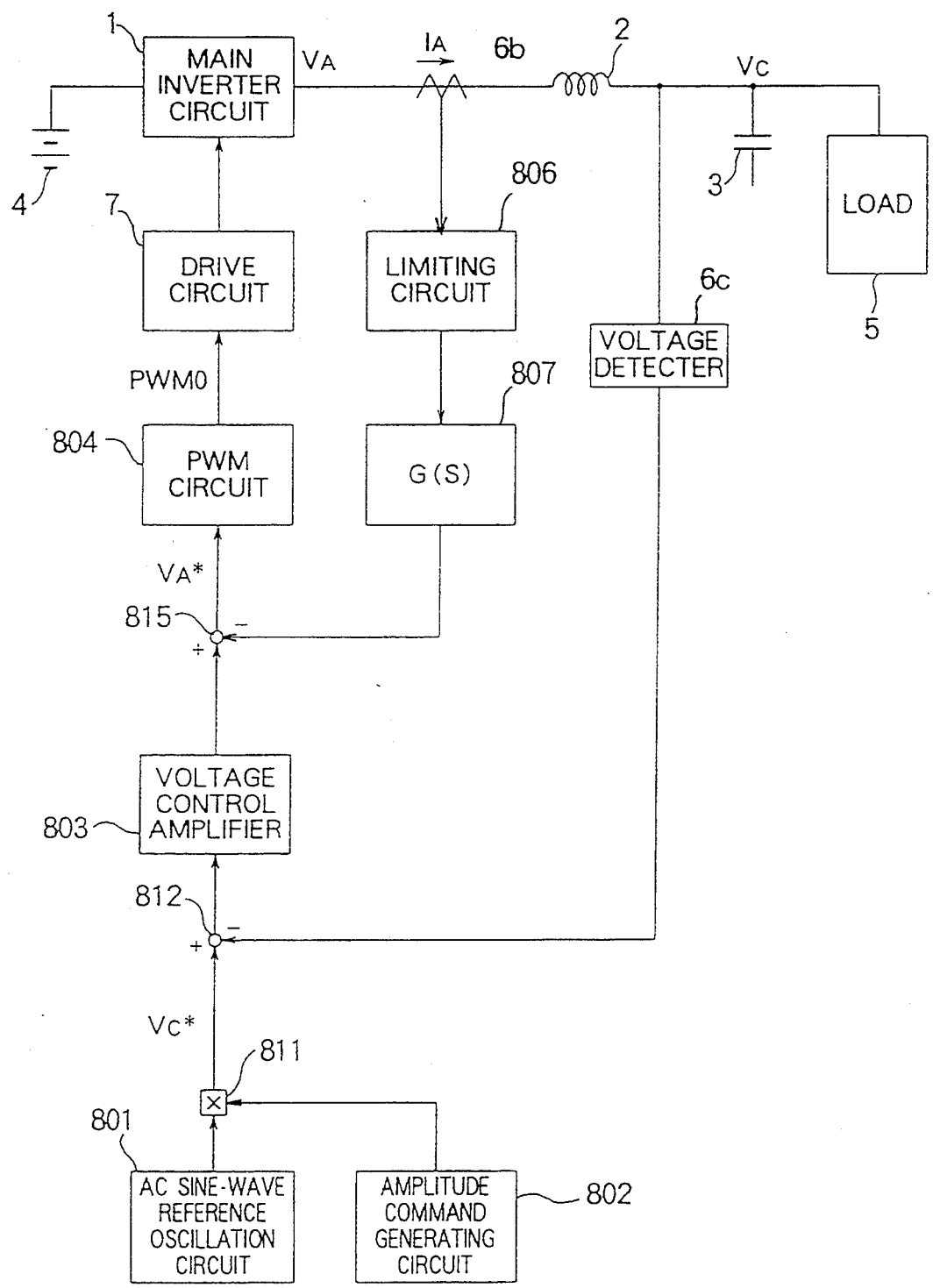

FIG. 8 illustrates a sixth embodiment of the present invention. Referring to FIG. 8, elements corresponding to those shown in FIG. 6 are given the same reference numerals and their detailed descriptions are omitted here. The difference from the foregoing first embodiment lies in that the instantaneous value of the inverter current $I_A$ is used to change the PWM voltage command $V_A^*$ to form a virtual output impedance. The residual structures are the same as those of the fourth embodiment.

Referring to FIG. 8, the instantaneous value of the inverter current $I_A$ is supplied to the limiting circuit 806. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806. The output from the limiting circuit 806 is passed through the transfer function G (S) 807 and subtracted, in the adder/subtracter 815, from the output from the voltage control amplifier 803. The output from the adder/subtracter 815 is made to be the PWM voltage command $V_A^*$.

Since the sixth embodiment is arranged in such a manner that the PWM voltage command $V_A^*$ is instantaneously dropped if the instantaneous value of the inverter current $I_A$ is larger than a predetermined value set to the limiting circuit 806, the inverter current $I_A$ can instantaneously be limited to a predetermined value range set to the limiting circuit 806 due to the response of the PWM circuit 804.

Seventh Embodiment

Figure 9:
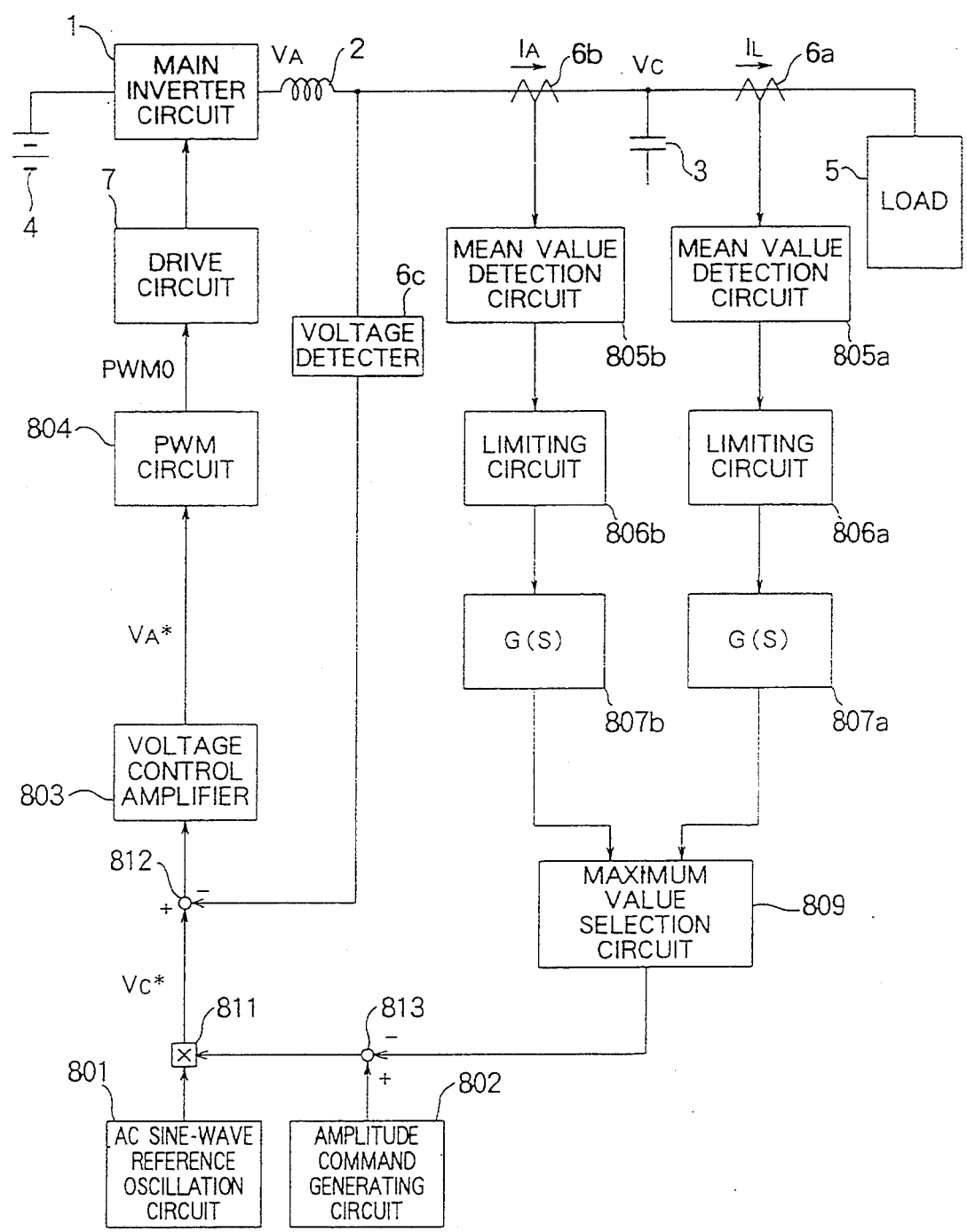

FIG. 9 illustrates a seventh embodiment of the present invention. Referring to FIG. 9, elements corresponding to those shown in FIG. 1 or FIG. 5 are given the same reference numerals and their detailed descriptions are omitted here. As contrasted with the first embodiment arranged in such a manner that only the load current $I_L$ is limited and the fourth embodiment arranged in such a manner that only the inverter current $I_A$ is limited, the seventh embodiment is arranged in such a manner that the mean value of the load current $I_L$ is used to cause a maximum value selection circuit 809 to select either a signal for changing the output voltage amplitude command or a signal for changing the output voltage amplitude command in accordance with the mean value of the inverter current $I_A$ to form a virtual output impedance. The residual structures are the same as those of the first embodiment or the fourth embodiment.

Referring to FIG. 9, the load current $I_L$ is detected by the detector 6a, while the mean value of the load electric current is detected by the average value detection circuit 805a. A limiting circuit 806a has a maximum load current set thereto. If the means value of the load current, which is the output from the mean value detection circuit 805a, is smaller than a predetermined value, the output from the limiting circuit 806a is zero. If the mean value of the load current is larger than the predetermined value, a value obtained by subtracting the predetermined value from the mean value of the load current is transmitted from the limiting circuit 806a.

The output from the limiting circuit 806a is passed through the transfer function G (S) 807a and supplied to the maximum value selection circuit 809. On the other hand, the inverter current $I_A$ is detected by the detector 6b, while the mean inverter current is detected by a mean value detection circuit 805b. A limiting circuit 806b has a maximum inverter current set thereto. If the mean value of the inverter current, which is the output from the mean value detection circuit 805b is smaller than a predetermined value, the output from the limiting circuit 806b is zero. If the mean value of the inverter current is larger than the predetermined value, a value obtained by subtracting the predetermined value from the mean value of the inverter current is transmitted from the limiting circuit 806b.

The output from the limiting circuit 806b is passed through the transfer function G (S) 807b and received by the maximum value selection circuit 809. The maximum value selection circuit 809 selects and transmits a signal that has a larger absolute value. The output from the maximum value selection circuit 809 is, in the subtracter 813, subtracted from the output transmitted by the amplitude command generating circuit 802.

The output from the adder/subtracter 813 and that from the AC sine-wave reference oscillation circuit 801 are multiplied in the multiplier 811 so that the output voltage command $V_C^*$ is obtained. Therefore, if the mean value of the load current $I_L$ is larger than the predetermined value set to the limiting circuit 806a or if the mean value of the inverter current $I_A$ is larger than the predetermined value set to the limiting circuit 806b, the output voltage command $V_C^*$ is dropped. The voltage control loop causes also the output voltage $V_C$ to be dropped to follow the output voltage command $V_C^*$ If the output voltage $V_C$ has been dropped, the load current $I_L$ or the inverter current $I_A$ is as well as decreased. As a result, the converter and the output line are protected from an excess current.

Since the seventh embodiment is arranged in such a manner that the output voltage amplitude command is dropped if the mean value of the load current $I_L$ is larger than the predetermined value set to the limiting circuit 806a or if the mean value of the inverter current $I_A$ is larger than the predetermined value set to the limiting circuit 806b, the load current $I_L$ and the inverter current $I_A$ can be limited in an averaged manner to be smaller than the predetermined values respectively set to the limiting circuits 806a and 806b.

If the predetermined value to be set to the limiting circuit 806a is so determined as to be capable of protecting the output line and if the predetermined value to be set to the limiting circuit 806b is so determined as to be capable of protecting the converter, the load current $I_L$ can be limited to a current range in which the output line can be protected and the inverter current $I_A$ can be limited to a current range in which the converter can be protected.

Although the seventh embodiment is arranged in such a manner that the limiting circuit 806a and the transfer function G (S) 807a for forming the virtual output impedance using the load current $I_L$ and the limiting circuit 806b and the transfer function G (S) 807b for forming the virtual output impedance using the inverter current $I_A$ are individually disposed, the following common type structure may be employed in a case where the predetermined maximum current and the virtual output impedance have the same characteristics: the mean value of the load current $I_L$ and the inverter current $I_A$ are supplied to the maximum value selection circuit 809; and the output from the maximum value selection circuit 809 is passed through the limiting circuit and received by the transfer function G (S), that is, the limiting circuit and the transfer function G (S) are commonly disposed with respect to the load current $I_L$ and the inverter current $I_A$.

Eighth Embodiment

Figure 10:
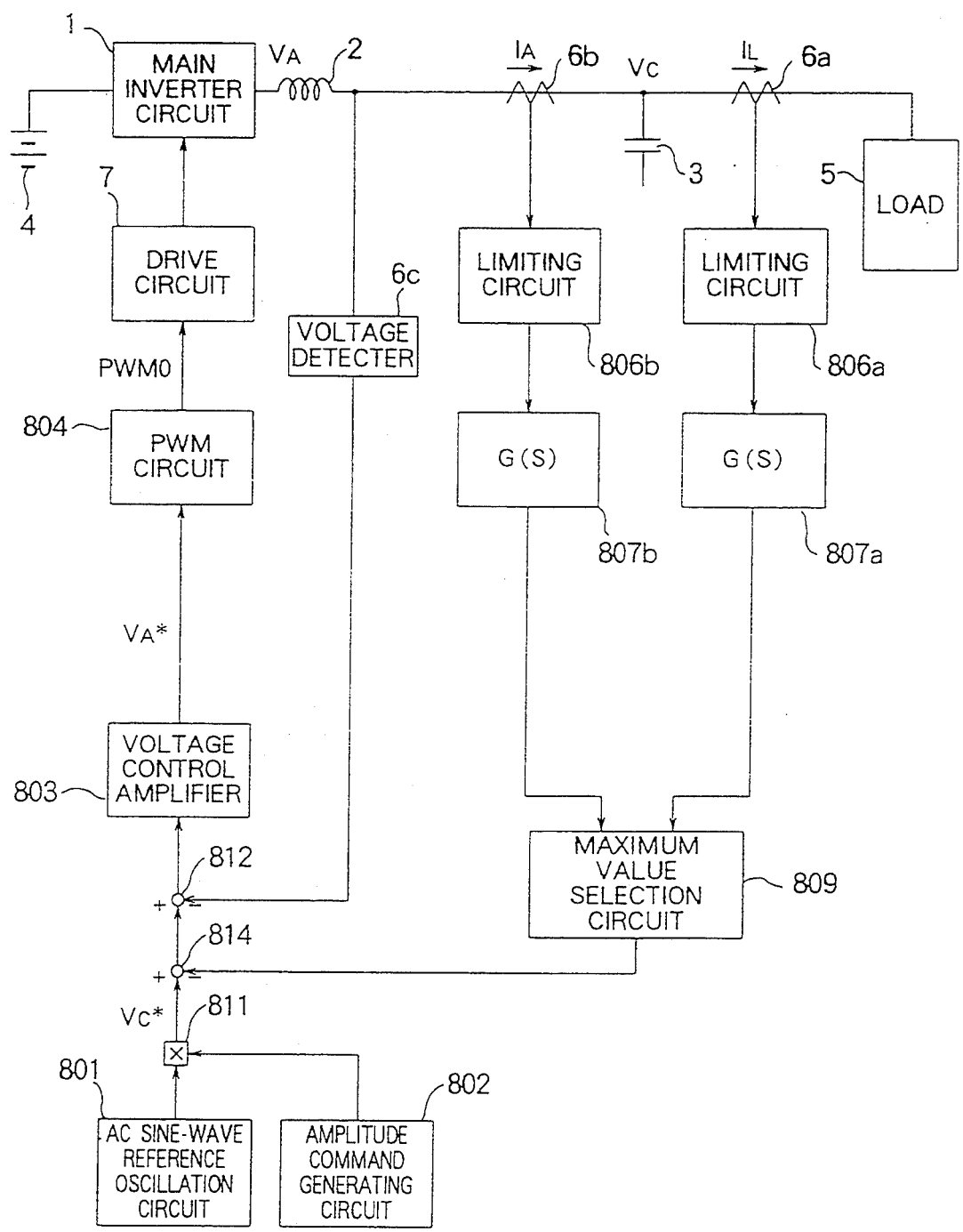

FIG. 10 illustrates an eighth embodiment of the present invention. Referring to FIG. 10, elements corresponding to those shown in FIG. 9 are given the same reference numerals and their detailed descriptions are omitted here. The difference from the foregoing first embodiment lies in that either a signal for changing the output voltage command $V_C^*$ with the instantaneous value of the load current $I_L$ and a signal for changing the output voltage command $V_C^*$ with the instantaneous value of the inverter current $I_A$ is selected by the maximum value selection circuit to form a virtual output impedance. The residual structures are the same as those of the seventh embodiment.

Referring to FIG. 10, the instantaneous value of the load current $I_L$ is supplied to the limiting circuit 806a. If the instantaneous value of the load current $I_L$ is larger than a predetermined positive value or smaller than a predetermined negative value, a value obtained by subtracting the predetermined value from the instantaneous value of the load current $I_L$ is transmitted from the limiting circuit 806a. The output from the limiting circuit 806a is passed through the transfer function G (S) 807a and received by the maximum value selection circuit 809. On the other hand, the instantaneous value of the inverter current $I_A$ is supplied to the limiting circuit 806b. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806b.

The output from the limiting circuit 806b is passed through the transfer function G (S) 807b and received by the maximum value selection circuit 809. The maximum value selection circuit 809 selects a signal having a larger absolute value and outputs it while faithfully restoring the polarity of the signal. The output from the maximum value selection circuit 809 is, in the adder/subtracter 814, subtracted from the output voltage command $V_C^*$, which is the output from the multiplier 811.

Since the eighth embodiment is arranged in such a manner that the output voltage command $V_C^*$ is instantaneously dropped if the instantaneous value of the load current $I_L$ is larger than the predetermined value set to the limiting circuit 806a of if the instantaneous value of the inverter current $I_A$ is larger than the predetermined value set to the limiting circuit 806b, the load current $I_L$ and the inverter current $I_A$ can respectively be, at high speed, limited within the predetermined values respectively set to the limiting circuits 806a and 806b due to the response of the voltage control loop.

Ninth Embodiment

Figure 11:
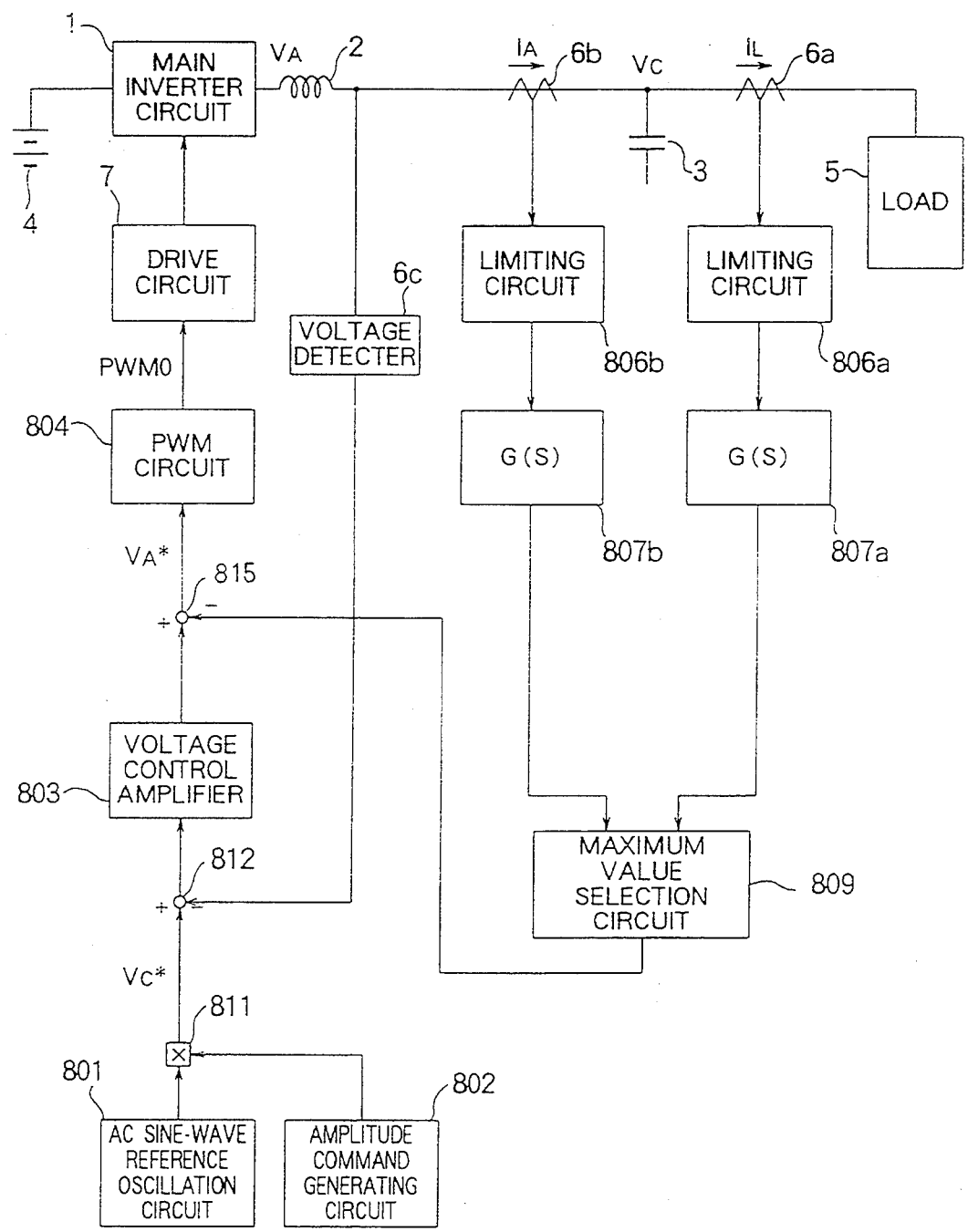

FIG. 11 illustrates a ninth embodiment of the present invention. Referring to FIG. 11, elements corresponding to those shown in FIG. 9 are given the same reference numerals and their detailed descriptions are omitted here. The difference from the foregoing seventh embodiment lies in that either a signal for changing the PWM voltage command $V_A^*$ using the instantaneous value of the load current $I_L$ or a signal for changing the PWM voltage command $V_A^*$ using the instantaneous value of the inverter current $I_A$ is selected by the maximum value selection circuit to form a virtual output impedance. The residual structures are the same as those of the seventh embodiment.

Referring to FIG. 11, the instantaneous value of the load current $I_L$ is supplied to the limiting circuit 806a. If the instantaneous value of the load current $I_L$ is larger than a predetermined positive value or smaller than a predetermined negative value, a value obtained by subtracting the predetermined value from the instantaneous value of the load current $I_L$ is transmitted from the limiting circuit 806a. The output from the limiting circuit 806a is passed through the transfer function G (S) 807a and received by the maximum value selection circuit 809. On the other hand, the instantaneous value of the inverter current $I_A$ is supplied to the limiting circuit 806b. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806b.

The output from the limiting circuit 806b is passed through the transfer function G (S) 807b and received by the maximum value selection circuit 809. The maximum value selection circuit 809 selects a signal having a larger absolute value and outputs it while faithfully restoring the polarity of the signal. The output from the maximum value selection circuit 809 is in the adder/subtracter 815, subtracted from the output of the voltage control amplifier 803. The output from the adder/subtracter 815 is made to be the PWM voltage command $V_A^*$.

Since the ninth embodiment is arranged in such a manner that the PWM voltage command $V_A^*$ is instantaneously dropped if the instantaneous value of the load current $I_L$ is larger than the predetermined value set to the limiting circuit 806a or if the instantaneous value of the inverter current $I_A$ is larger than the predetermined value set to the limiting circuit 806b, the load current $I_L$ and the inverter current $I_A$ can respectively be limited within the predetermined values respectively set to the limiting circuits 806a and 806b due to the response of the PWM circuit 804.

Figure 2B:
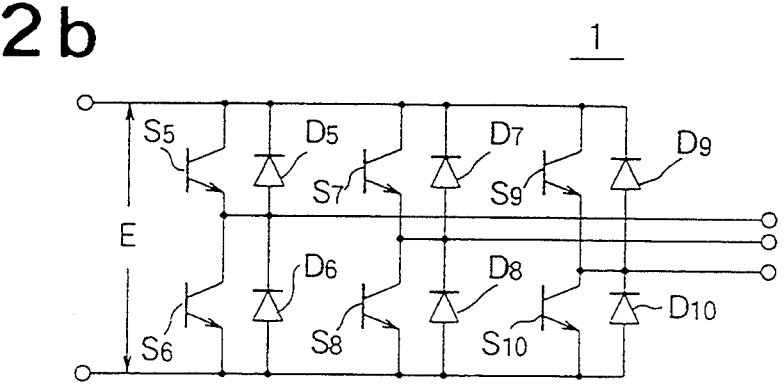
FIG. 2B is a block diagram which illustrates a circuit of another power converter for use in the present invention.

Although the first to ninth embodiments have been described about the single-phase inverter, the foregoing arrangement may be applied to a three-phase inverter structured as shown in FIG. 2b and having transistors $S_5$ to $S_{10}$ to which the diodes $D_5$ to $D_{10}$ are inversely connected in parallel if a similar control circuit is used for each phase or at least two phases.

As contrasted with the eighth and ninth embodiments in which the limiting circuit 806a and the transfer function G (S) 807a for forming the virtual output impedance using the load current $I_L$ and the limiting circuit 806b and the transfer function G (S) 807b for forming the virtual output impedance using the inverter current $I_A$ are individually disposed, the following common type structure may be employed in a case where the predetermined maximum current and the virtual output impedance have the same characteristics: the instantaneous values of the load current $I_L$ and the inverter current $I_A$ are supplied to the maximum value selection circuit and the output from the maximum value selection circuit is passed through the limiting circuit and received by the transfer function G (S), that is, the limiting circuit and the transfer function G (S) are disposed commonly to the load current $I_L$ and the inverter current $I_A$.

Tenth Embodiment

A tenth embodiment of the present invention will now be described. Among multi-phase AC circuits, a three-phase and three-wire system AC circuit is conditioned that the sum of the three phase currents is zero. Therefore, the foregoing circuit has coherency that limiting of a certain phase to a predetermined value range causes the electric currents of the residual phases to be so changed as to satisfy the foregoing condition. As a result, it is difficult to individually control the three phases.

Figure 3:
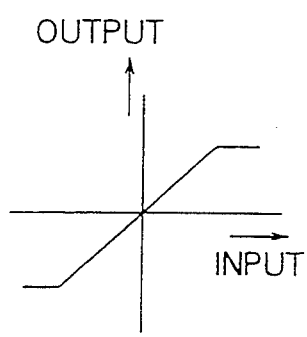
FIG. 3 is a graph which illustrates the characteristics of transfer functions G (S) 807 and Z (S) 822.
Figure 12:
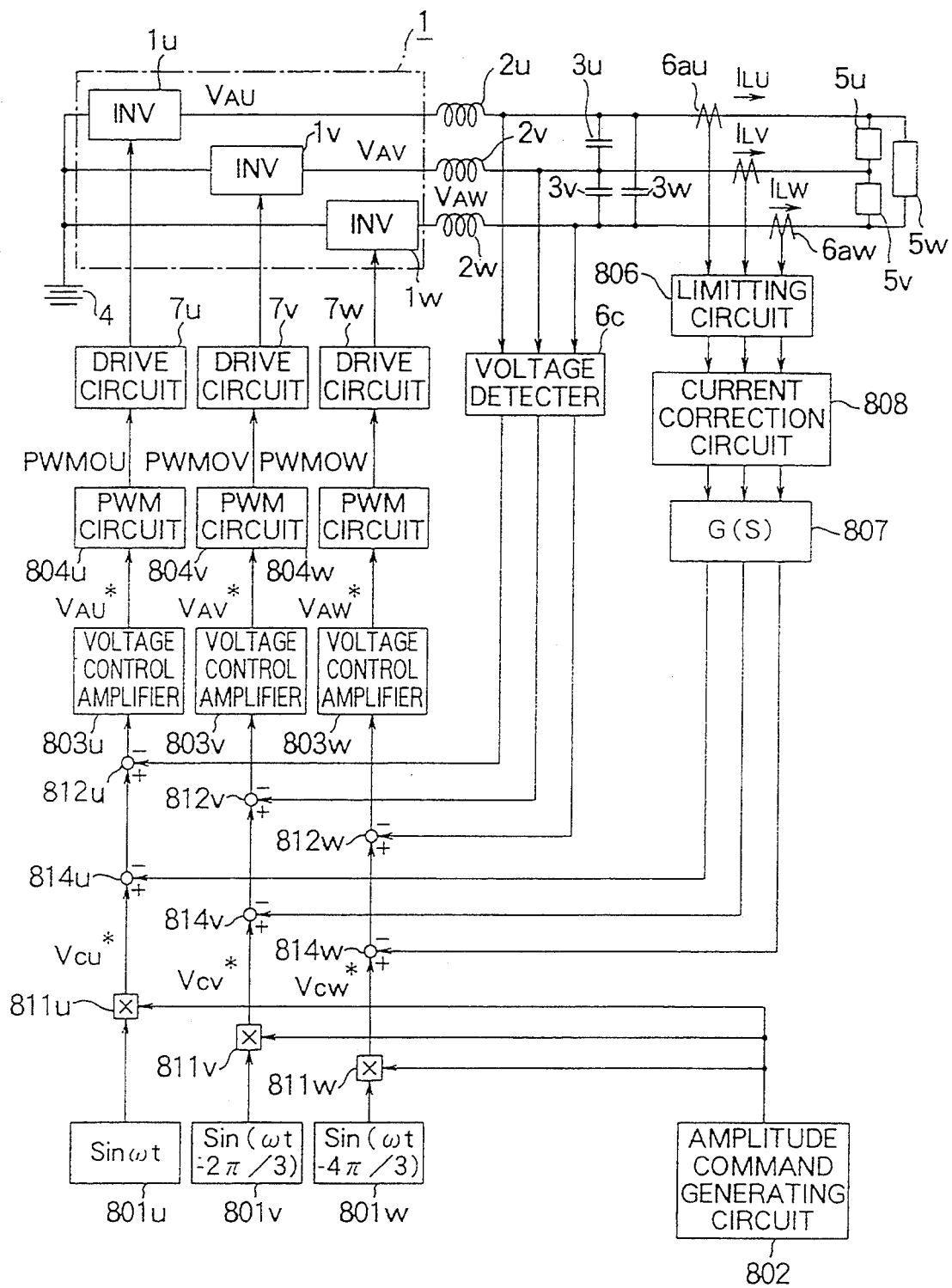

FIG. 12 illustrates the tenth embodiment of the present invention. Referring to FIG. 12, elements corresponding to those shown in FIG. 3 are given the same reference numerals and their detailed descriptions are omitted here. The difference from the foregoing second embodiment lies in that a control circuit is disposed for each phase and an electric current compensation circuit is additionally disposed so that an incoherent control is performed.

Referring to FIG. 12, a main inverter circuit 1 is formed into a three-phase structure as shown in FIG. 2b, wherein elements having suffix u are elements of a U-phase inverter, those having suffix v are elements of a V-phase inverter and those having suffix w are elements of a W-phase inverter. The instantaneous value of the load current $I_L$ for each phase is supplied to the limiting circuit 806. If the instantaneous value of the load current $I_L$ is larger than a predetermined positive value or smaller than a predetermined negative value, a value obtained by subtracting the predetermined value from the instantaneous value of the load current $I_L$ is transmitted from the limiting circuit 806 for each phase.

The output from the limiting circuit 806 is passed through the transmission function G (S) 807 and received by a current correction circuit 808. The current correction circuit 808 transmits signals so corrected as to make the sum of the supplied three-phase signals to be zero. The signals are then, in adders/subtracters 814u, 814v and 814w, subtracted for each phase from output voltage commands $V_{CU}^*$, $V_{CV}^*$ and $V_{CW}^*$, which are outputs from multipliers 811u, 811v and 811w.

The detailed operation of the current correction circuit 808 will now be described. Assumptions are made here that the detected load current values are $I_{LU}$, $I_{LV}$, $I_{LW}$, values set to the limiting circuit 806 are $\pm K$, the outputs from the limiting circuit 806 are $I_{LMU}$, $I_{LMV}$, $I_{LMW}$ and the outputs from the current correction circuit 808 are $I_{JU}$, $I_{JV}$ and $I_{JW}$. If only the U-phase current has become excessive, the outputs from the limiting circuit 806 are made as follows:

$$I_{LMU} = I_{LU} - K \quad (1)$$

$$I_{LMV} = 0 \quad (2)$$

$$I_{LMW} = 0 \quad (3)$$

The outputs from the current correction circuit 808 are as follows so that correction is so made that the sum of the signals of the three phases is made zero and they are transmitted.

$$I_{JU} = I_{LMU} \quad (4)$$

$$I_{JV} = -I_{LMU}/2 \quad (5)$$

$$I_{JW} = I_{LMU}/2 \quad (6)$$

If electric currents of the two phases, for example, the U phase and the V-phase, have become excessive, the outputs from the limiting circuit 806 are made as follows:

$$I_{LMU} = I_{LU} - K \quad (7)$$

$$I_{LMV} = I_{LV} - K \quad (8)$$

$$I_{LMW} = 0 \quad (9)$$

The outputs from the current correction circuit 808 are made as follows so that correction is so made that the sum of the signals of the three phases is made zero and they are transmitted:

$$I_{JU} = I_{LMU} \quad (11)$$

$$I_{JV} = I_{LMV} \quad (12)$$

$$I_{JW} = -(I_{LMU} + I_{LMV}) \quad (13)$$

That is, the current correction circuit 808 converts the signal into a signal with which the sum of the signals of the three phases adaptable to the three-phase and three-wire system is made to be zero.

Since the tenth embodiment is arranged in such a manner that, if any one of the instantaneous values of the respective phases of the load current $I_L$ has exceeded a predetermined value set to the limiting circuit 806, a correction signal for making the sum of the signals of the three phases to be zero is used to instantaneously drop the commanded output voltage, the load current $I_L$ can be, at high speed and without coherence, limited to the predetermined value range set to the limiting circuit 806 due to the response of the voltage control loop.

Eleventh Embodiment

Figure 13:
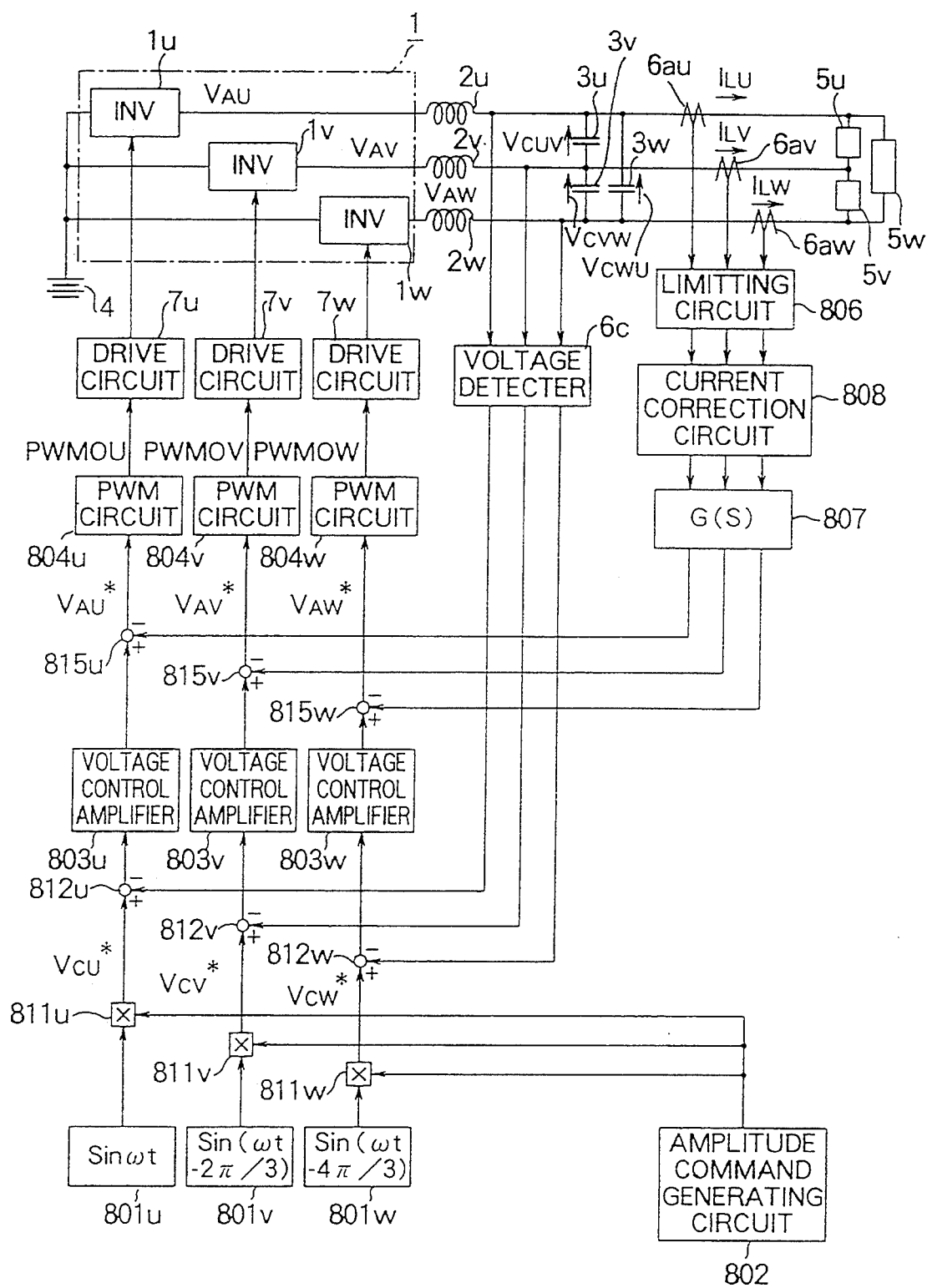

FIG. 13 illustrates an eleventh embodiment of the present invention. Referring to FIG. 13, elements corresponding to those shown in FIG. 12 are given the same reference numerals and their detailed descriptions are omitted here. The difference from the foregoing first embodiment lies in that the instantaneous value of the load current $I_L$ is used to change the PWM voltage command to form a virtual impedance. The residual structures are the same as those of the tenth embodiment.

Referring to FIG. 13, the instantaneous value of the load current $I_L$ for each phase is supplied to the limiting circuit 806. If the instantaneous value of the output current is larger than a predetermined positive value or smaller than a predetermined negative value, a value obtained by subtracting the predetermined value from the instantaneous value of the load current is transmitted for each phase from the limiting circuit 806. The outputs from the limiting circuit 806 are passed through the transmission function G (S) 807 and supplied to the current correction circuit 808.

The current correction circuit 808 transmits signals so corrected that the sum of the supplied signals for the three phases is zero, the signals being then subtracted, in the adders/subtracters 815u, 815v and 815w, from the outputs from the voltage control amplifiers 803u, 803v and 803w. The outputs from the adders/subtracters 815u, 815v and 815w are made to be PWM voltage commands $V_{AU}^*$, $V_{AV}^*$ and $V_{AW}^*$.

Since the eleventh embodiment is arranged in such a manner that, if any one of the instantaneous values of the respective phases of the load current $I_L$ has exceeded a predetermined value set to the limiting circuit 806, a correction signal for making the sum of the signals of the three phases to be zero is used to instantaneously drop the commanded output voltage, the load current $I_L$ can be, at high speed and without coherence, limited to the predetermined value range set to the limiting circuit 806 due to the response of the PWM circuit 804.

Twelfth Embodiment

Figure 14:
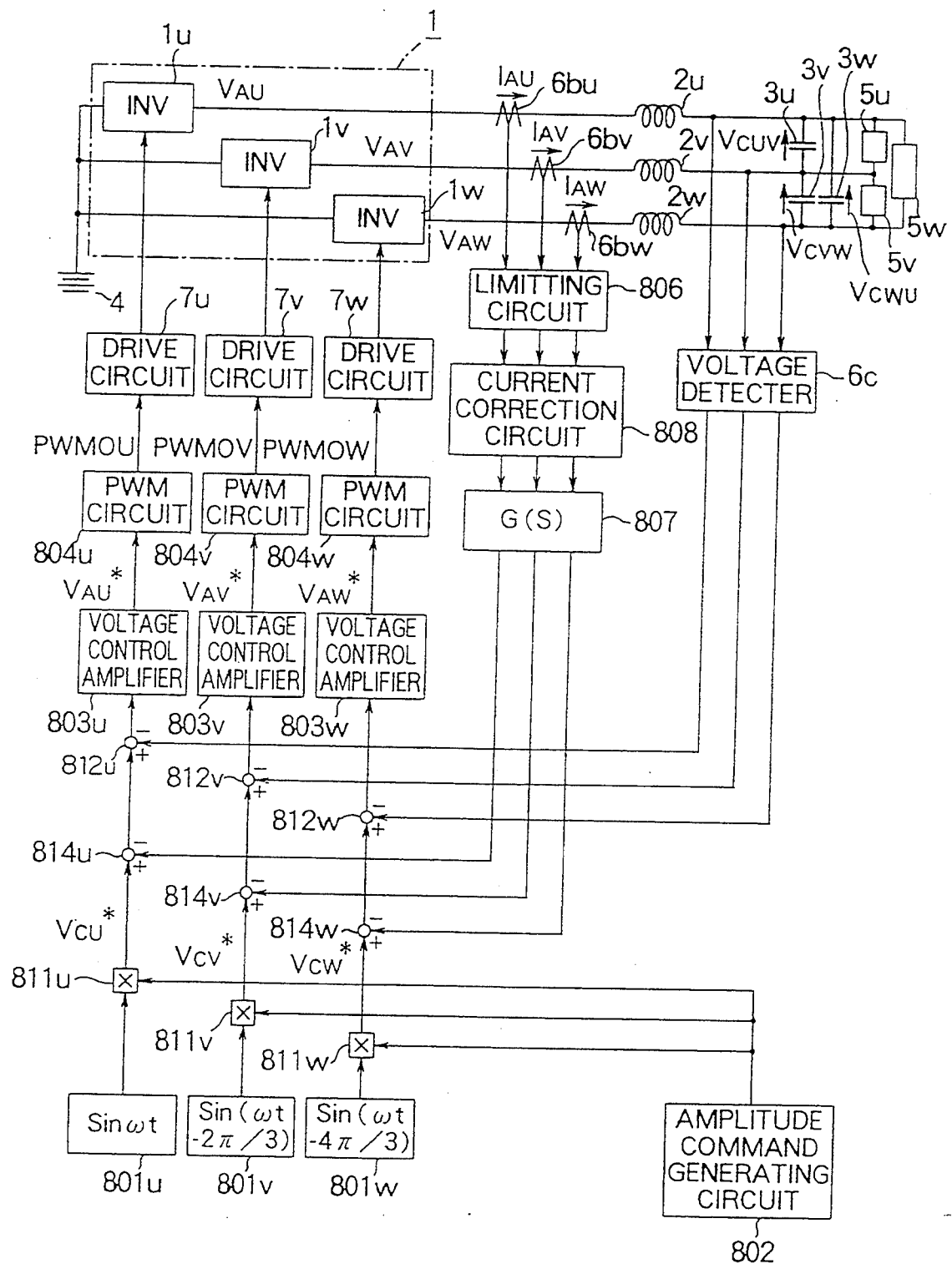

FIG. 14 illustrates a twelfth embodiment of the present invention. Referring to FIG. 14, elements corresponding to those shown in FIG. 12 are given the same reference numerals and their detailed descriptions are omitted here. The difference from the foregoing first embodiment lies in that the instantaneous value of the inverter current $I_A$ is used to change the output voltage command to form a virtual output impedance. The residual structures are the same as those of the tenth embodiment.

Referring to FIG. 14, the instantaneous value of the load current $I_L$ for each phase is supplied to the limiting circuit 806. If the instantaneous value of the output current is larger than a predetermined positive value or smaller than a predetermined negative value, a value obtained by subtracting the predetermined value from the instantaneous value of the output current is transmitted for each phase from the limiting circuit 806. The outputs from the limiting circuit 806 are passed through the transmission function G (S) 807 and supplied to the current correction circuit 808.

The current correction circuit 808 transmits signals so corrected that the sum of the supplied signals for the three phases is zero, the signals being then subtracted for each phase, in the adders/subtracters 814u, 814v and 814w, from output voltage commands $V_{CU}^*$ $V_{CV}^*$ and $V_{CW}^*$, which are outputs from the multipliers 811u, 811v and 811w.

Since the twelfth embodiment is arranged in such a manner that, if any one of the instantaneous values of the respective phases of the inverter current $I_A$ has exceeded a predetermined value set to the limiting circuit 806, a correction signal for making the sum of the signals of the three phases to be zero is used to instantaneously drop the commanded output voltage, the load current $I_L$ can be, at high speed and without coherence, limited to the predetermined value range set to the limiting circuit 806 due to the response of the voltage control loop.

Thirteenth Embodiment

Figure 15:
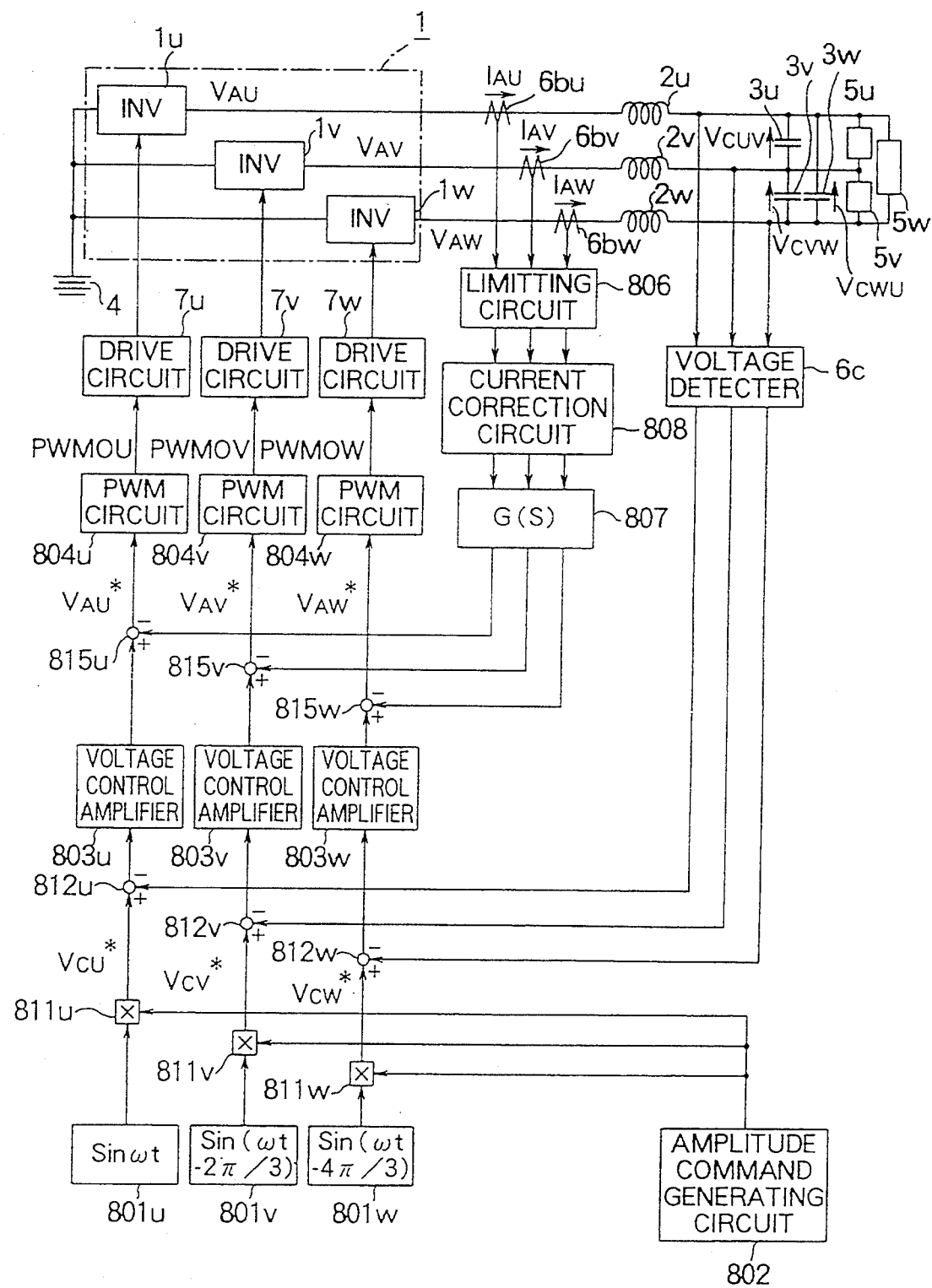

FIG. 15 illustrates a thirteenth embodiment of the present invention. Referring to FIG. 15, elements corresponding to those shown in FIG. 14 are given the same reference numerals and their detailed descriptions are omitted here. The difference from the foregoing twelfth embodiment lies in that the instantaneous value of the inverter current $I_A$ is used to change the PWM voltage command to form a virtual output impedance. The residual structures are the same as those of the twelfth embodiment.

Referring to FIG. 15, the instantaneous value of the inverter current $I_A$ for each phase is supplied to the limiting circuit 806. If the instantaneous value of the inverter current $I_A$ is larger than a predetermined positive value or smaller than a predetermined negative value, a value obtained by subtracting the predetermined value from the instantaneous value of the inverter current $I_A$ is transmitted for each phase from the limiting circuit 806. The outputs from the limiting circuit 806 are passed through the transmission function G (S) 807 and supplied to the current correction circuit 808.

The current correction circuit 808 transmits signals so corrected that the sum of the supplied signals for the three phases is zero, the signals being then subtracted for each phase, in the adders/subtracters 815u, 815v and 815w, from outputs from the multipliers 803u, 803v and 803w. The outputs from the adders/subtracters 815u, 815v and 815w are made to be PWM voltage commands $V_{AU}^*$, $V_{AV}^*$ and $V_{AW}^*$.

Since the thirteenth embodiment is arranged in such a manner that, if any one of the instantaneous values of the respective phases of the inverter current $I_A$ has exceeded a predetermined value set to the limiting circuit 806, a correction signal for making the sum of the signals of the three phases to be zero is used to instantaneously drop the PWM voltage command, inverter current $I_A$ can be instantaneously, without coherence, limited to the predetermined value range set to the limiting circuit 806 due to the response of the PWM circuit 804.

Fourteenth Embodiment

Figure 16:
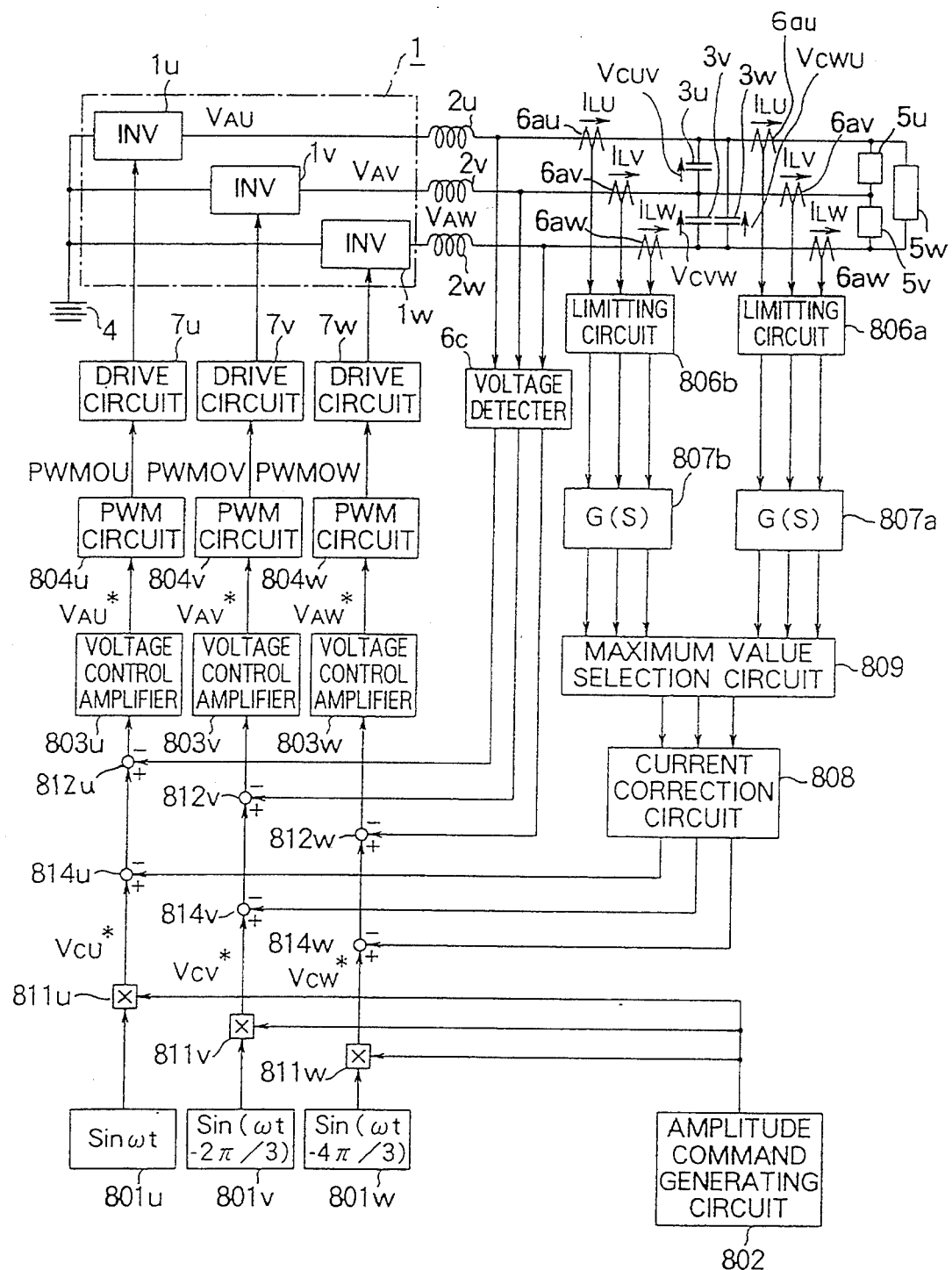

FIG. 16 illustrates a fourteenth embodiment of the present invention. Referring to FIG. 16, elements corresponding to those shown in FIGS. 12 or 14 are given the same reference numerals and their detailed descriptions are omitted here. As contrasted with the tenth embodiment arranged in such a manner that only the load current $I_L$ is limited and the twelfth embodiment arranged in such a manner that only the inverter current $I_A$ is limited, this embodiment is arranged in such a manner that the maximum value selection circuit 809 selects the signal for changing the output voltage command using the load current $I_L$ or a signal for changing the output voltage command using the inverter current $I_A$ to form a virtual output impedance. The residual structures are the same as those of the tenth or the twelfth embodiment.

Referring to FIG. 16, the instantaneous value of the load current $I_L$ for each phase is supplied to the limiting circuit 806a. If the instantaneous value of the output current is larger than a predetermined positive value or smaller than a predetermined negative value, a value obtained by subtracting the predetermined value from the instantaneous value of the load current is transmitted from the limiting circuit 806a. The output from the limiting circuit 806a is passed through the transfer function G (S) 807a and received by the maximum value selection circuit 809.

On the other hand, the instantaneous value of the inverter current $I_A$ for each phase is supplied to the limiting circuit 806b. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806b. The output from the limiting circuit 806b is passed through the transfer function G (S) 807b and received by the maximum value selection circuit 809.

The maximum value selection circuit 809 selects and transmits a signal for each phase that has a larger absolute value. The outputs from the maximum value selection circuit 809 are supplied to the current correction circuit 808 as to be corrected so that the sum of the signals for the three phases is made to be zero. The outputs for the respective phases are then subtracted from the output-voltage commands $V_{CU}^*$, $V_{CV}^*$ and $V_{CW}^*$ which are the outputs from the multipliers 811u, 811v and 811w, the subtractions being performed in the adders/subtracters 814u, 814v and 814w.

Since the fourteenth embodiment is arranged in such a manner that, if any one of the instantaneous values of the load currents $I_L$ for respective phases is larger than the predetermined value set to the limiting circuit 806a or if any one of the instantaneous values of the inverter current $I_A$ for respective phases is larger than the predetermined value set to the limiting circuit 806b, the correction signal for making the sum of the signals of the three phases to be zero is used to instantaneously drop the output voltage command, the load current $I_L$ and the inverter current $I_A$ can be, at high speed and without coherence, limited to the predetermined value ranges set to the limiting circuits 806a and 806b due to the response of the voltage control loop.

Fifteenth Embodiment

Figure 17:
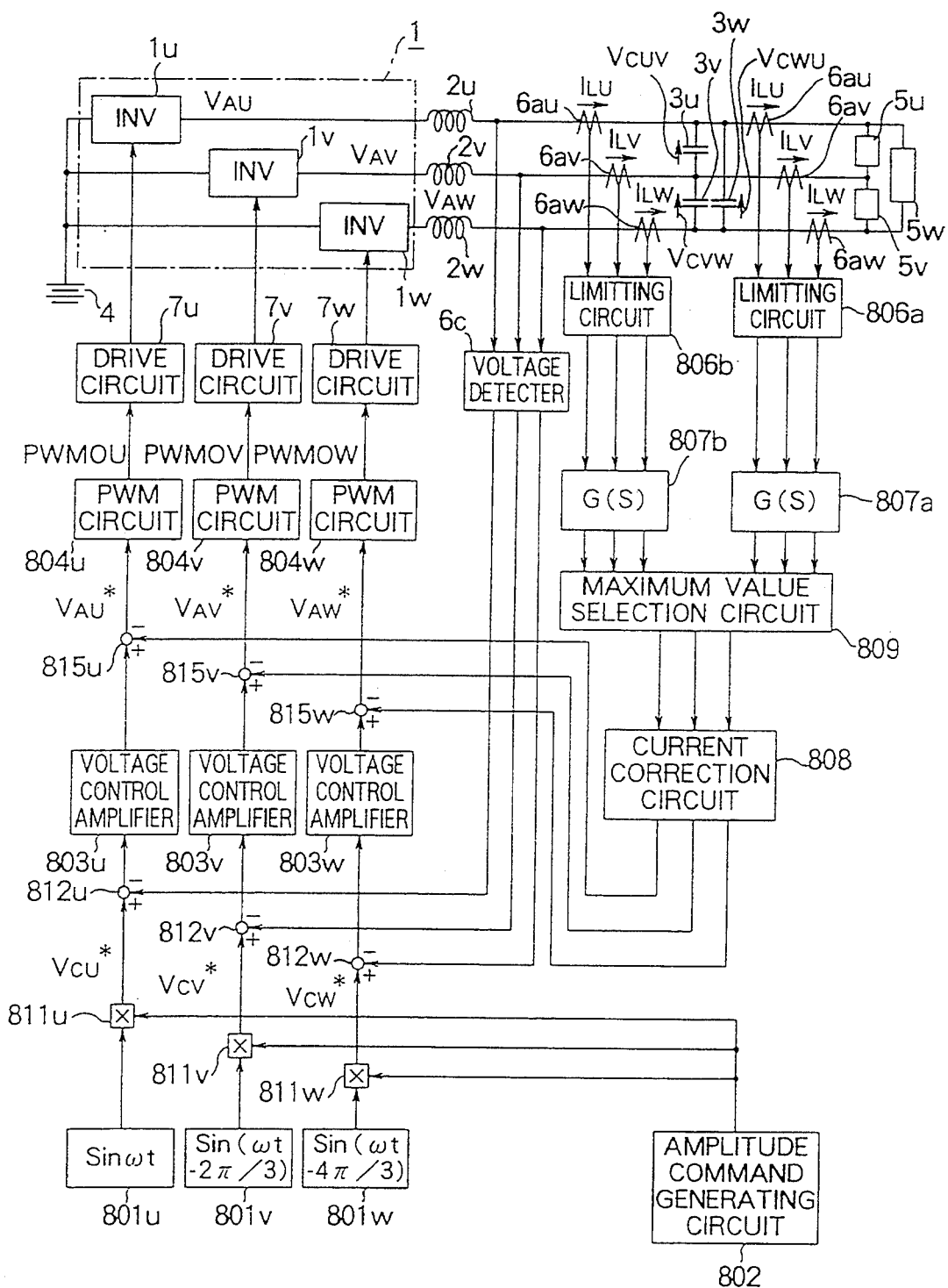

FIG. 17 illustrates a fifteenth embodiment of the present invention. Referring to FIG. 17, elements corresponding to those shown in FIG. 16 are given the same reference numerals and their detailed descriptions are omitted here. The difference from the foregoing fourteenth embodiment lies in that the selection circuit 809 selects a signal for changing the PWM voltage command using the instantaneous value of the load current $I_L$ and a signal for changing the PWM voltage command using the inverter current $I_A$ to form a virtual output impedance. The residual structures are the same as those of the fourteenth embodiment.

Referring to FIG. 17, the instantaneous value of the load current $I_L$ for each phase is supplied to the limiting circuit 806a. If the instantaneous value of the load current is larger than a predetermined positive value or smaller than a predetermined negative value, a value obtained by subtracting the predetermined value from the instantaneous value of the load current is transmitted from the limiting circuit 806a. The output from the limiting circuit 806a is passed through the transfer function G (S) 807a and received by the maximum value selection circuit 809.

On the other hand, the instantaneous value of the inverter current $I_A$ for each phase is supplied to the limiting circuit 806b. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806b. The output from the limiting circuit 806b is passed through the transfer function G (S) 807b and received by the maximum value selection circuit 809.

The maximum value selection circuit 809 selects and transmits a signal for each phase that has a larger absolute value. The outputs from the maximum value selection circuit 809 are supplied to the current correction circuit 808 as to be corrected so that the sum of the signals for the three phases is made to be zero. The outputs for the respective phase are then subtracted from the outputs from the voltage control amplifiers 803u, 803v and 803w. The outputs from the adders/subtracters 815u, 815v and 815w are made to be the PWM voltage commands $V_{AU}^*$, $V_{AV}^*$ and $V_{AW}^*$ Since the fifteenth embodiment is arranged in such a manner that, if any one of the instantaneous values of the load currents $I_L$ for respective phases is larger than the predetermined value set to the limiting circuit 806a or if any one of the instantaneous values of the inverter current $I_A$ for respective phases is larger than the predetermined value set to the limiting circuit 806b, the correction signal for making the sum of the signals of the three phases to be zero is used to instantaneously drop the PWM voltage command, the load current $I_L$ and the inverter current $I_A$ can be, instantaneously and without coherence, limited to the predetermined value ranges set to the limiting circuits 806a and 806b due to the response of the PWM circuit 804.

Although the fourteenth and the fifteenth embodiments are arranged in such a manner that the limiting circuit 806a and the transfer function G (S) 807a for forming the virtual output impedance using the load current $I_L$ and the limiting circuit 806b and the transfer function G (S) 807b for forming the virtual output impedance using the inverter current $I_A$ are individually disposed, the following common type structure may be employed in a case where the predetermined maximum current and the virtual output impedance have the same characteristics: the instantaneous values of the load current $I_L$ and the inverter current $I_A$ are supplied to the maximum value selection circuit; and the output from the maximum value selection circuit is passed through the limiting circuit and received by the transfer function G (S), that is, the limiting circuit and the transfer function G (S) are commonly disposed with respect to the load current $I_L$ and the inverter current $I_A$.

Sixteenth Embodiment

Figure 18:
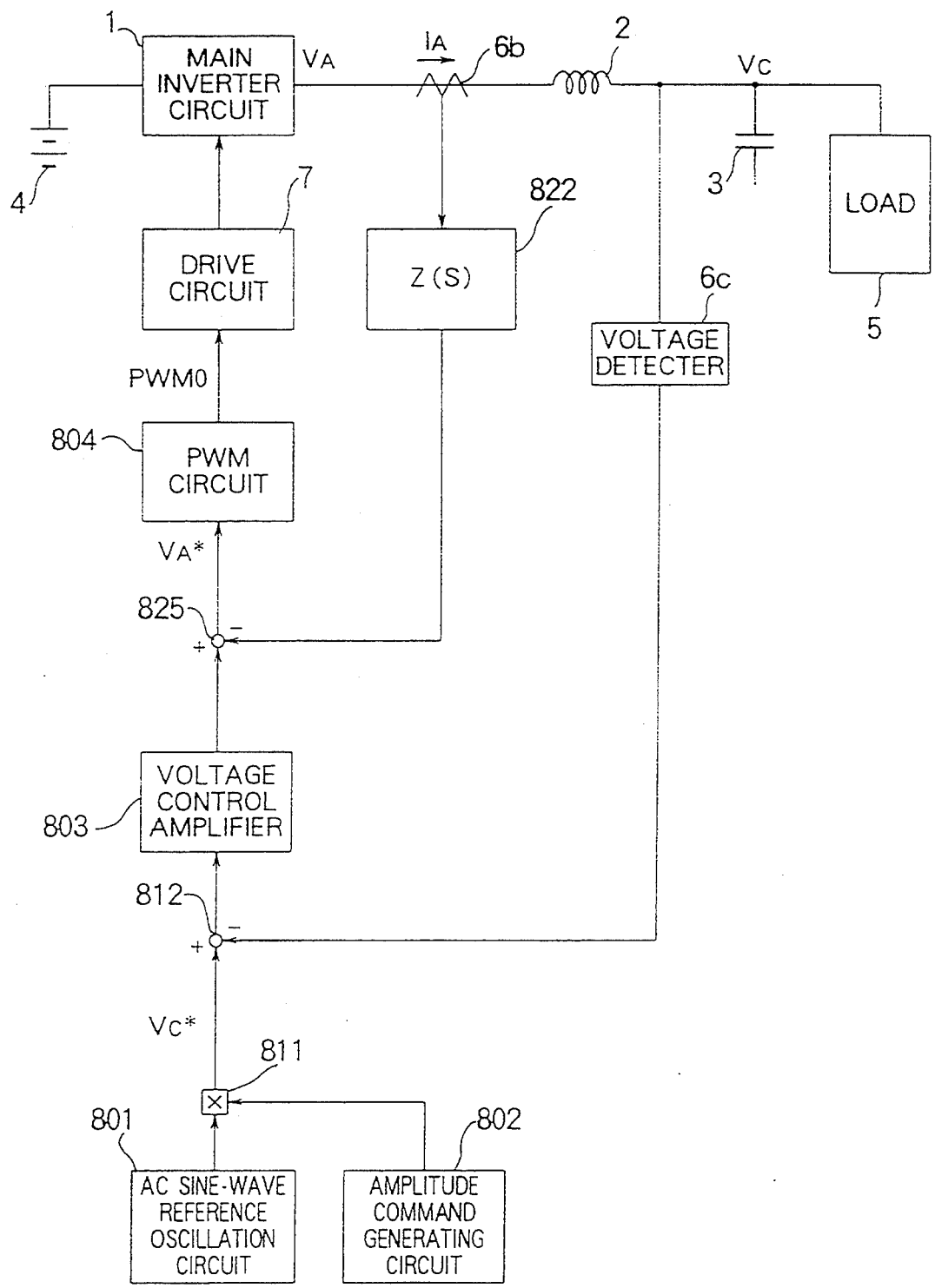

FIG. 18 illustrates a sixteenth embodiment of the present invention. Referring to FIG. 18, reference numeral 1 represents a main inverter circuit exemplified by a circuit for, with triangle-wave carriers of about 1 to 2 KHz, modulating the pulse width of a single-phase full bridge inverter arranged as shown in FIG. 2a. Reference numerals 2 and 3 respectively represent a reactor and a capacitor for a filter, 4 represents a DC power source, 5 represents a load, 7 represents a drive circuit for the main inverter circuit 1, 6b represents a detector for detecting inverter current $I_A$, and 6c represents a voltage detector for detecting output voltage $V_C$.

Referring to FIG. 1, reference numerals between eight and nine hundred represent elements of a control circuit. Reference numeral 801 represents an AC sine-wave reference oscillation circuit, 802 represents an amplitude command generating circuit, 803 represents a voltage control amplifier, 804 represents a PWM circuit, 822 represents transfer function Z (S) having characteristics similar to those of the transfer function G (S) 807 shown in FIG. 3, 811 represents a multiplier, and 812 and 825 represent adders/subtracters.

The operation of the thus-constituted sixteenth embodiment will now be described with reference to FIG. 18. The output from the amplitude command generating circuit 802 and the AC sine-wave reference oscillation circuit are, in the multiplier 811, multiplied so that output voltage command $V_C^*$ is obtained. In order to make the output voltage command $V_C^*$ coincide with output voltage $V_C$ detected by the voltage detector 6c, the voltage control amplifier 803 and the PWM circuit 804 form a voltage control loop so that switching operation to be performed by the main inverter circuit 1 is controlled.

The inverter current $I_A$ is detected by the detector 6b as to be passed through the transfer function Z (S) 822, the inverter current $I_A$ being then, in the adder/subtracter 825, subtracted from the output from the voltage control amplifier 803. The output from the adder/subtracter 825 is made to be the PWM voltage command $V_A^*$.

If the transfer function Z (S) 822 is a proportional circuit, PWM voltage command $V_A^*$ is dropped by the inverter current $I_A$. Therefore, a state is realized in which a virtual resistor is in series connected to the reactor 2.

At this time transfer function H (S) of the open loop of the control system is made as follows:

$$H(S) = \{1/(LCS^2 + RCS + 1)\} \times VC \qquad (13)$$

where VC (S) is a transfer function of the voltage control amplifier 803.

Therefore, the apparent transfer function F (S) of the LC filter is made as follows:

$$F(S) = 1 / (LCS^2 + RCS + 1) \quad (14)$$

Further, damping coefficient $\zeta$ is made as follows:

$$\zeta = (R/2) \times \sqrt{(C/L)} \quad (15)$$

As can be understood from Equation (15), if damping of the PWM voltage command $V_A^*$ using the inverter current $I_A$ is not performed, R is zero and therefore $\zeta$ is made to be zero. Therefore, control cannot easily be performed because of resonant characteristic. However, damping of the PWM voltage command $V_A^*$ using the inverter current $I_A$ is enables R to have an arbitrary value. Therefore, selection of the proportion coefficient R that satisfies that $\zeta$ is 0.7 or more enables damping of the LC filter when viewed from the voltage control amplifier 803 to be improved. As a result, a necessity of special and complicated design of the voltage control amplifier 803 to prevent the resonance of the LC filter can be eliminated.

The transfer function Z (S) 822 may be determined arbitrarily if it is able to improve apparent damping of the LC filter. Further, employment a circuit including a non-linear element will not raise a problem if it is able to improve apparent damping of the LC filter.

Seventeenth Embodiment

Figure 19:
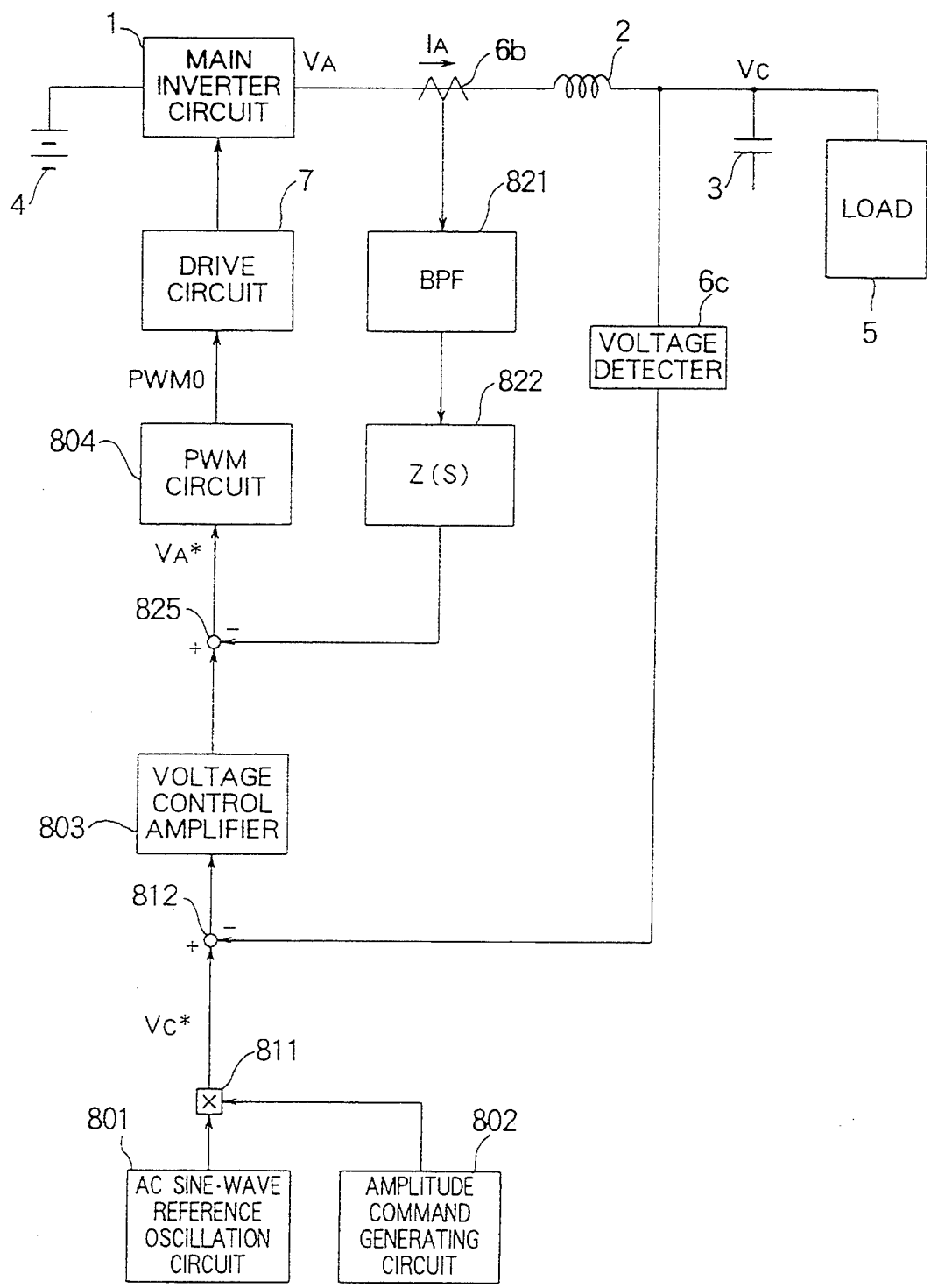

FIG. 19 illustrates a seventeenth embodiment of the present invention. Referring to FIG. 19, elements corresponding to those shown in FIG. 18 are given the same reference numerals and their detailed descriptions are omitted here. The difference from the foregoing sixteenth embodiment lies in that a band pass filter 821 which passes only the resonance frequency of the LC filter is additionally disposed. The residual structures are the same as those of the sixteenth embodiment.

Referring to FIG. 19, the inverter current $I_A$ is detected by the detector 6b as to be passed through the band pass filter 821 which passes only the resonance frequency of the LC filter. Then, the inverter current $I_A$ is supplied to the transfer function Z (S) 822. The output from the transfer function Z (S) 822 is, in the adder/subtracter 825, from the output from the voltage-control amplifier 803. The output from the adder/subtracter 825 is made to be the PWM voltage command $V_A^*$.

The transfer function Z (S) 822 is, similarly to that according to the sixteenth embodiment, formed into a circuit capable of damping of the LC filter when viewed from the voltage control amplifier 803. Since the band pass filter 821 permits the components in the resonant frequency band for the LC filter to pass through smoothly, a similar operation for improving damping is performed.

In a frequency band in which the main inverter circuit 1 supplies electric power to the load 5, for example, at a commercial frequency, for example, 50 or 60 Hz, the signal to be supplied to the transfer function Z (S) 822 is removed by the band pass filter 821. Therefore, the output from the transfer function Z (S) 822 is made zero.

The seventeenth embodiment is structured in such a manner that the LC filter when viewed from the voltage control amplifier 803 acts cause a virtual impedance in only the resonant frequency band for the LC filter to be, in series, connected to the reactor 2 to improve damping. In a frequency band in which electric power is supplied to the load 5, the same acts as a filter having a low impedance characteristic. Therefore, even if the load has been changed rapidly, the voltage control amplifier 803 is required to compensate only voltage drop occurring due to the actual output impedance. Therefore, a necessity of special and complicated design of the voltage control amplifier 803 to prevent the resonance of the LC filter can be eliminated. Further, transient characteristics of the output voltage in a frequency band, in which electric power is supplied, can be improved.

Eighteenth Embodiment

Figure 20:
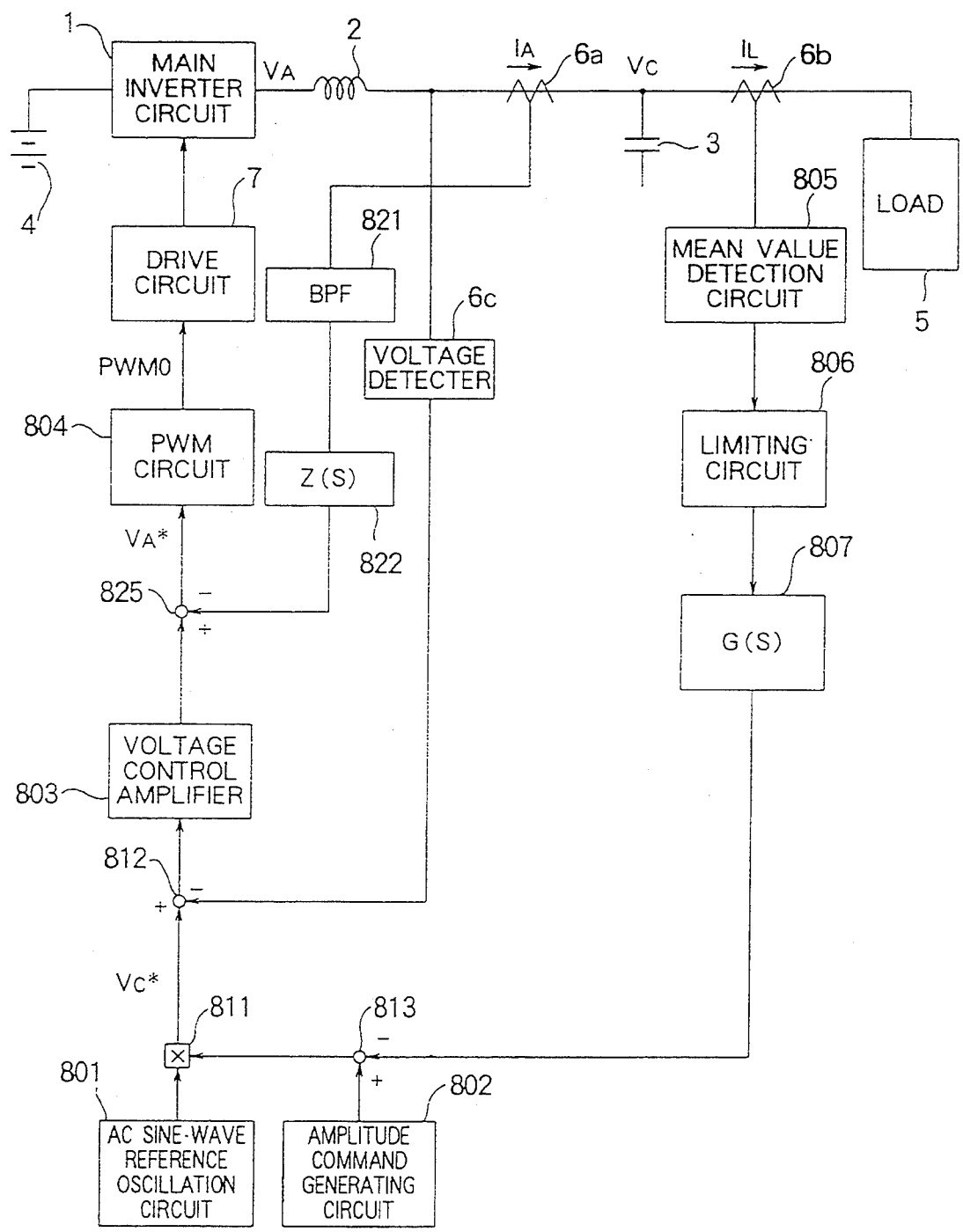

FIG. 20 illustrates an eighteenth embodiment of the present invention. Referring to FIG. 120, elements corresponding to those shown in FIG. 19 are given the same reference numerals and their detailed descriptions are omitted here. The difference from the foregoing seventeenth embodiment lies in that a mean value detection circuit 805, a limiting circuit 806, a transfer function G (S) 806 and an adder/subtracter 813 are additionally disposed. The residual structures are the same as those of the tenth embodiment.

Referring to FIG. 20, in order to make output voltage command $V_C^*$ which is the output from the multiplier 811, coincide with output voltage $V_C$ detected by the voltage detector 6c, the voltage control amplifier 803 and the PWM circuit 804 form a voltage control loop so that the switching operation to be performed by the main inverter circuit 1 is controlled. Load current $I_L$ is detected by the detector 6a, and a mean load electric current value is detected by the mean value detection circuit 805.

The limiting circuit 806 has a maximum load current set thereto so that the output from the limiting circuit 806 is zero if the output from the mean value detection circuit 805 is smaller than the predetermined value. If the mean load current value is larger than the predetermined value, a value obtained by subtracting the predetermined value from the mean load current value is transmitted from the limiting circuit 806. The output from the limiting circuit 806 is passed through the transfer function G (S) 807 as to be subtracted from the output transmitted by the amplitude command generating circuit 802 in the adder/subtracter 813.

The output from the adder/subtracter 813 and that from the AC sine-wave reference oscillation circuit 801 are multiplied in the multiplier 811 so that the output voltage command $V_C^*$ is obtained. Therefore, the output voltage command $V_C^*$ is dropped if the mean output current value is larger than the predetermined value set to the limiting circuit 806. Further, the foregoing voltage control loop causes the output voltage $V_C$ to be also dropped to follow the output voltage command $V_C^*$. If the output voltage $V_C$ has been dropped, also the load current $I_L$ is decreased. As a result, the output line can be protected from an excess electric current.

That is, when the inverter is viewed from the output side thereof, the transfer function G (S) 807 is operated as to be a virtual output impedance to drop the output voltage $V_C$ only when the load current $I_L$ larger than the predetermined value has been passed.

Therefore, if the absolute value $|G(S)|$ of the transfer function $G(S)$ 807 is $\infty$, an excess of the load current $I_L$ over the predetermined value due to occurrence of short circuit of a load or the like causes an output impedance $\infty$ to appear because of the response of the mean value circuit. As a result, the output voltage $V_C$ is dropped until the load current $I_L$ is made to be smaller than the predetermined value. Since $|G(S)|$ is finite in actual, the load current $I_L$ becomes a value somewhat larger than the predetermined value. However, no practical problem arises if the value of the $|G(S)|$ is made to be a sufficiently large value.

The transfer function $G(S)$ 807 may be an arbitrary function if it has an adequate impedance value. If the circuit is a proportional circuit for example, it serves as a resistor. If the same is a differentiating circuit, the transfer function $G(S)$ 807 serves as a reactor. If the same is an integrating circuit, it serves as a capacitor. If the same is a combination circuit of proportional, integrating and differentiating circuits, it serves as a circuit formed by combining a resistor, a capacitor and a reactor. Further, a circuit containing a non-linear element may be employed if it has an adequate impedance which limits the load current $I_L$.

Similarly to the seventeenth embodiment, the structure according to the eighteenth embodiments enables a necessity of special and complicated design of the voltage control amplifier 803 to prevent the resonance of the LC filter can be eliminated. Further, transient characteristics of the output voltage in a frequency band, in which electric power is supplied, can be improved. In addition, if the mean value of the load current IL has exceeded the predetermined value set to the limiting circuit 806, the commanded output voltage is dropped. As a result, the flow of the load current $I_L$ larger than the predetermined value set to the limiting circuit 806 can be limited in an averaged manner.

Nineteenth Embodiment

Figure 21:
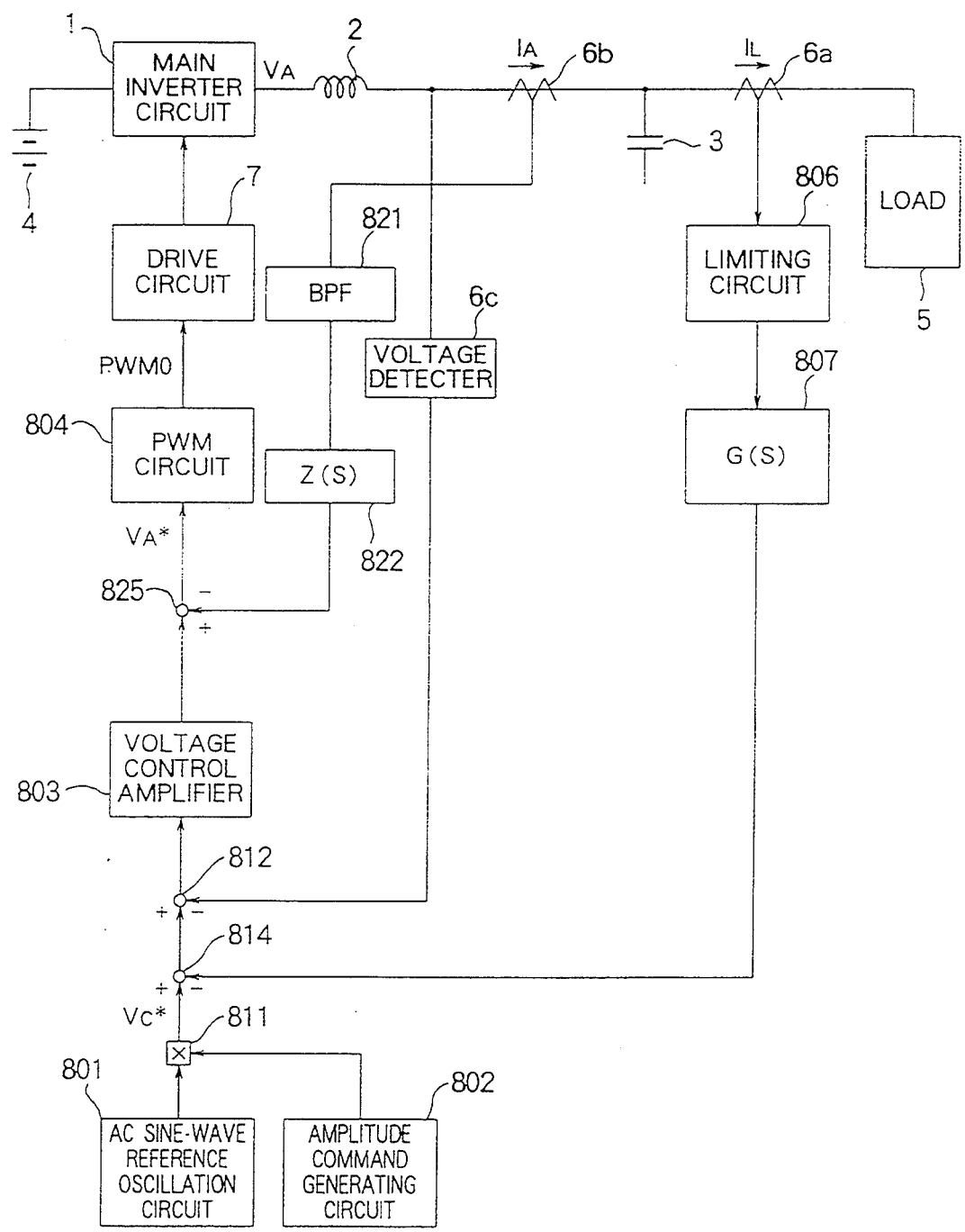

FIG. 21 illustrates a nineteenth embodiment of the present invention. Referring to FIG. 21, elements corresponding to those shown in FIG. 20 are given the same reference numerals and their detailed descriptions are omitted here. The difference from the foregoing eighteenth embodiment lies in that the instantaneous value of the load current $I_L$ is used to change the output voltage command $V_C*$ to form a virtual output impedance. The residual structures are the same as those of the eighteenth embodiment.

Referring to FIG. 21, the instantaneous value of the load current $I_L$ is supplied to the limiting circuit; 806, If the instantaneous value of the output current is larger than a predetermined positive value or smaller than a predetermined negative value, a value obtained by subtracting the predetermined value from the instantaneous value of the output current is transmitted from the limiting circuit 806. The output from the limiting circuit 806 is passed through the transfer function $G(S)$ 807 and subtracted, in the adder/subtracter 814, from the output voltage command $V_C*$, which is the output from the multiplier 811.

Similarly to the seventeenth embodiment, the nineteenth embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if the instantaneous value of the load current $I_L$ has exceeded the predetermined value set to the limiting circuit 806, the output voltage command $V_C*$ is instantaneously dropped. Therefore, the load current $I_L$ can be, at high speed, limited to the predetermined value range set to the limiting circuit 806 due to the response of the voltage control loop.

Twentieth Embodiment

Figure 22:
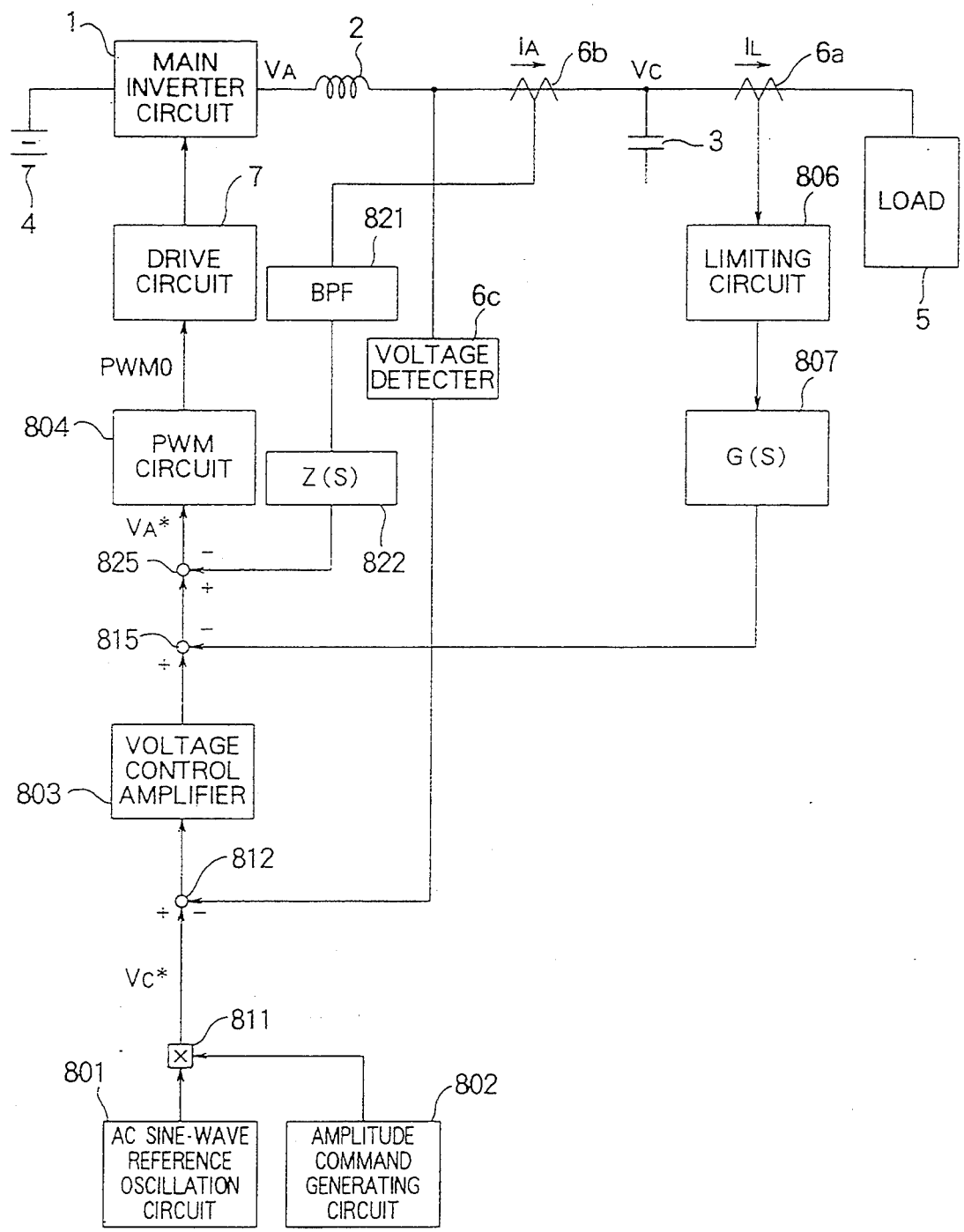

FIG. 22 illustrates a twentieth embodiment of the present invention. Referring to FIG. 22, elements corresponding to those shown in FIG. 20 are given the same reference numerals and their detailed descriptions are omitted here. The difference from the foregoing eighteenth embodiment lies in that the instantaneous value of the load current $I_L$ is used to change the PWM voltage command $V_A*$ to form a virtual output impedance. The residual structures are the same as those of the eighteenth embodiment.

Referring to FIG. 22, the instantaneous value of the load current $I_L$ is supplied to the limiting circuit 806. If the instantaneous value of the load current is larger than a predetermined positive value or smaller than a predetermined negative value, a value obtained by subtracting the predetermined value from the instantaneous value of the load current is transmitted from the limiting circuit 806. The output from the limiting circuit 806 is passed through the transfer function $G(S)$ 807 and subtracted, in the adder/subtracter 815, from the output from the voltage control amplifier 803. The output from the adder/subtracter 815 is used as the PWM voltage command $V_A*$.

Similarly to the seventeenth embodiment, the twentieth embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if the instantaneous value of the load current $I_L$ has exceeded the predetermined value set to the limiting circuit 806, the PWM voltage command $V_A*$ is instantaneously dropped. Therefore, the load current $I_L$ can instantaneously be limited to the predetermined value range set to the limiting circuit 806 due to the response of the PWM circuit 804.

Twenty-First Embodiment

Figure 23:
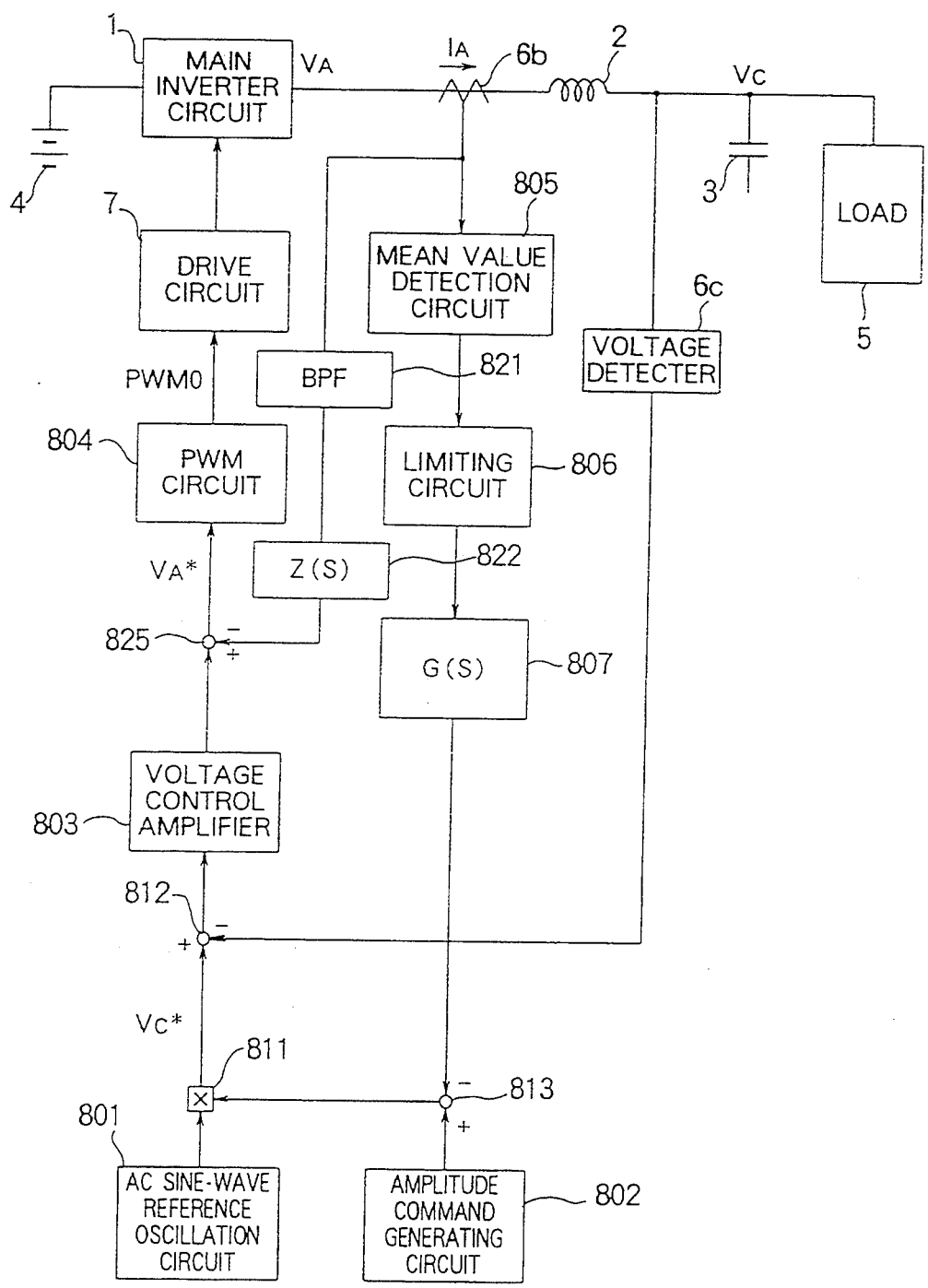

FIG. 23 illustrates a twenty-first embodiment of the present invention. Referring to FIG. 23, elements corresponding to those shown in FIG. 20 are given the same reference numerals and their detailed descriptions are omitted here. The difference from the foregoing eighteenth embodiment lies in that the instantaneous value of the inverter current $I_A$ is used to change the output voltage command to form a virtual output impedance. The residual structures are the same as those of the eighteenth embodiment.

Referring to FIG. 23, the inverter current $I_A$ is detected by the detector 6b, while a mean inverter current is detected by the mean value detection circuit 805. The limiting circuit 806 has a maximum inverter current set thereto so that the output from the limiting circuit 806 is zero if the mean inverter current, which is the output from the mean value detection circuit 805, is smaller than the predetermined value. If the mean inverter current is larger than the predetermined value, a value obtained by subtracting the predetermined value from the mean inverter current is transmitted from the limiting circuit 806.

The output from the limiting circuit 806 is passed through the transfer function G (S) 807 and subtracted, in the subtracter 813, from the output from the amplitude command generating circuit 802. Since the output from the subtracter 813 and the output from the AC sine-wave reference oscillation circuit 801 are multiplied in the multiplier 811 to obtain output voltage command $V_C*$, the output voltage command $V_C*$ is dropped if the mean inverter current is larger than the predetermined value set to the limiting circuit 806. Also the output voltage $V_C$ is dropped to follow the output voltage command $V_C*$ by the voltage control loop. If the output voltage $V_C$ has been dropped, the inverter current $I_A$ is decreased. Therefore, the converter can be protected from an excess current.

Similarly to the seventeenth embodiment, the twenty-first embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if the mean value of the inverter current $I_A$ has exceeded the predetermined value set to the limiting circuit 806, the output voltage amplitude command is dropped. Therefore, the inverter current $I_A$ can be limited in an averaged manner to be smaller than the predetermined value set to the limiting circuit 806.

Twenty-Second Embodiment

Figure 24:
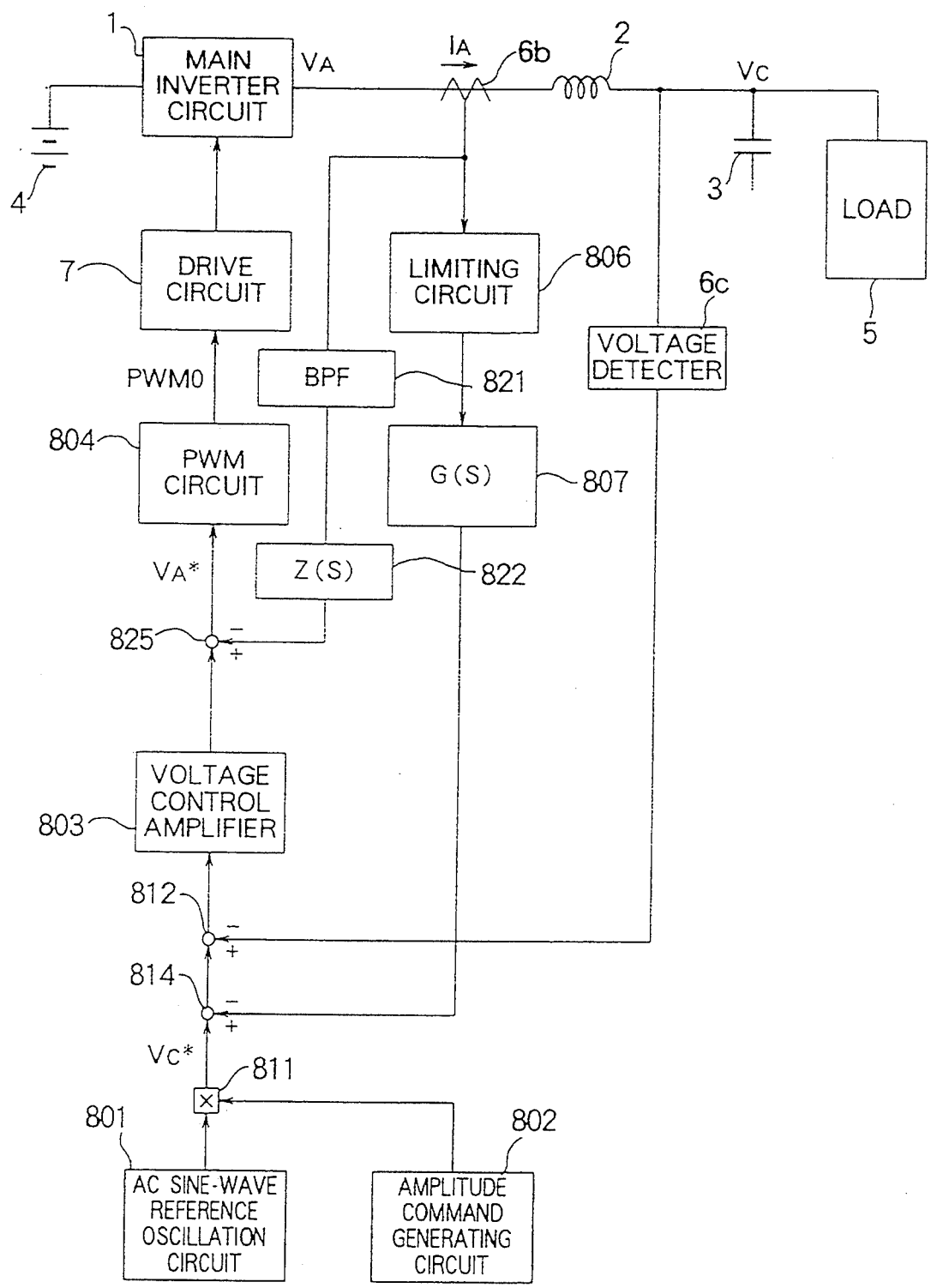

FIG. 24 illustrates a twenty-second embodiment of the present invention. Referring to FIG. 24, elements corresponding to those shown in FIG. 23 are given the same reference numerals and their detailed descriptions are omitted here. The difference from the foregoing twenty-first embodiment lies in that the instantaneous value of the inverter current $I_A$ is used to change the output voltage command $V_C*$ to form a virtual output impedance. The residual structures are the same as those of the twenty-first embodiment.

Referring to FIG. 24, the instantaneous value of the inverter current $I_A$ is supplied to the limiting circuit 806. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806. The output from the limiting circuit 806 is passed through the transfer function G (S) 807 and subtracted, in the adder/subtracter 814, from the output voltage command $V_C*$, which is the output from the multiplier 811.

Similarly to the seventeenth embodiment, the twenty-second embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if the instantaneous value of the inverter current $I_A$ has exceeded the predetermined value set to the limiting circuit 806, the output voltage amplitude command $V_C*$ is instantaneously dropped. Therefore, the inverter current $I_A$ can be, at high speed, limited to be smaller than the predetermined value set to the limiting circuit 806 due to the voltage control loop.

Twenty-Third Embodiment

Figure 25:
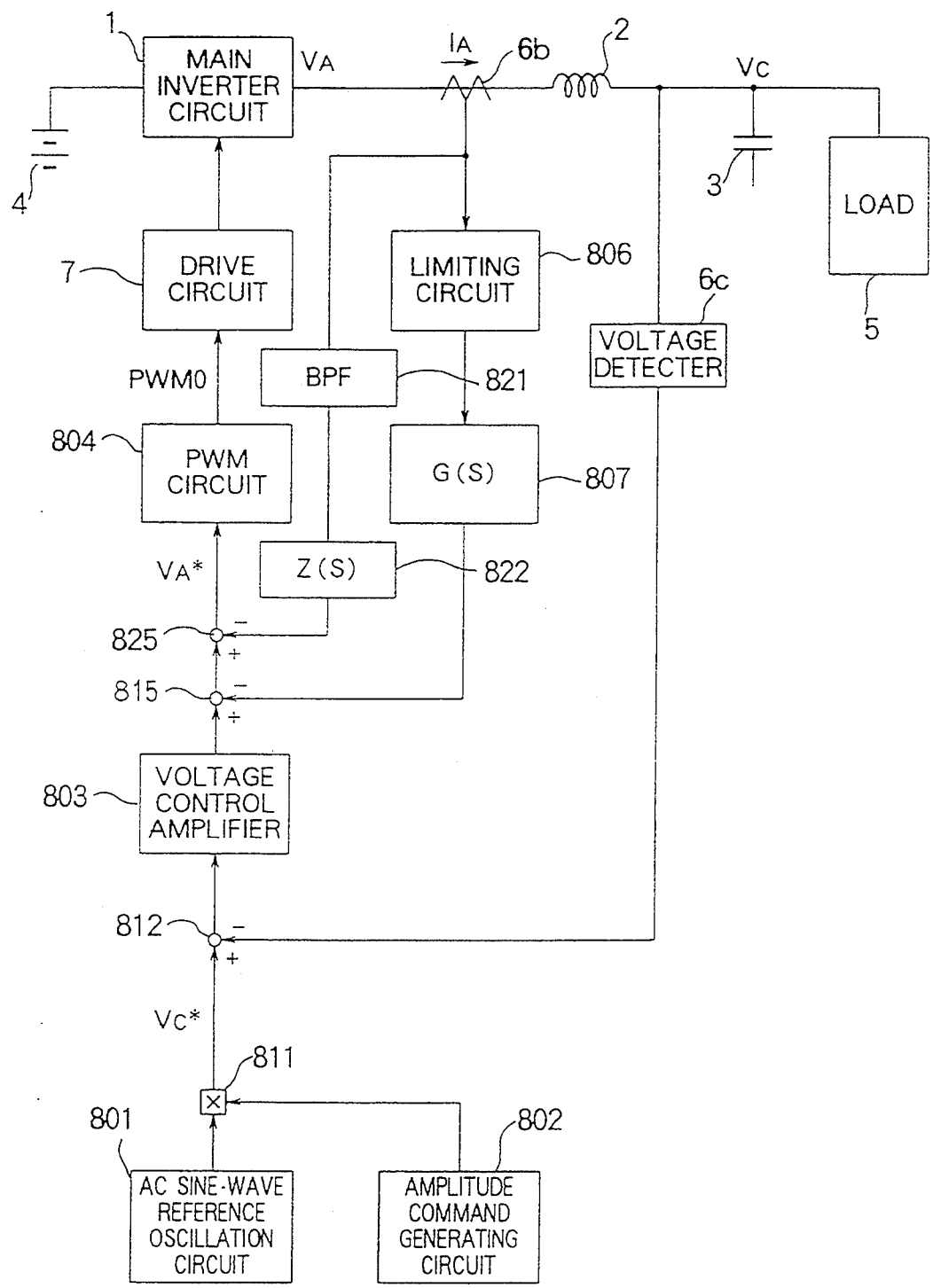

FIG. 25 illustrates a thirty-third embodiment of the present invention. Referring to FIG. 25, elements corresponding to those shown in FIG. 23 are given the same reference numerals and their detailed descriptions are omitted here. The difference from the foregoing twenty-first embodiment lies in that the instantaneous value of the inverter current $I_A$ is used to change the PWM voltage command $V_A*$ to form a virtual output impedance. The residual structures are the same as those of the twenty-first embodiment.

Referring to FIG. 25, the instantaneous value of the inverter current $I_A$ is supplied to the limiting circuit 806. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806. The output from the limiting circuit 806 is passed through the transfer function G (S) 807 and subtracted, in the adder/subtracter 815, from the output from the voltage control amplifier 803. The output from the adder/subtracter 815 is made to be the PWM voltage command $V_A*$.

Similarly to the seventeenth embodiment, the twenty-third embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if the instantaneous value of the inverter current $I_A$ has exceeded the predetermined value set to the limiting circuit 806, the PWM voltage command $V_A*$ is instantaneously dropped. Therefore, the inverter current $I_A$ can be, at high speed, limited to be smaller than the predetermined value set to the limiting circuit 806 due to the response of the PWM circuit 804.

Twenty-Fourth Embodiment

Figure 26:
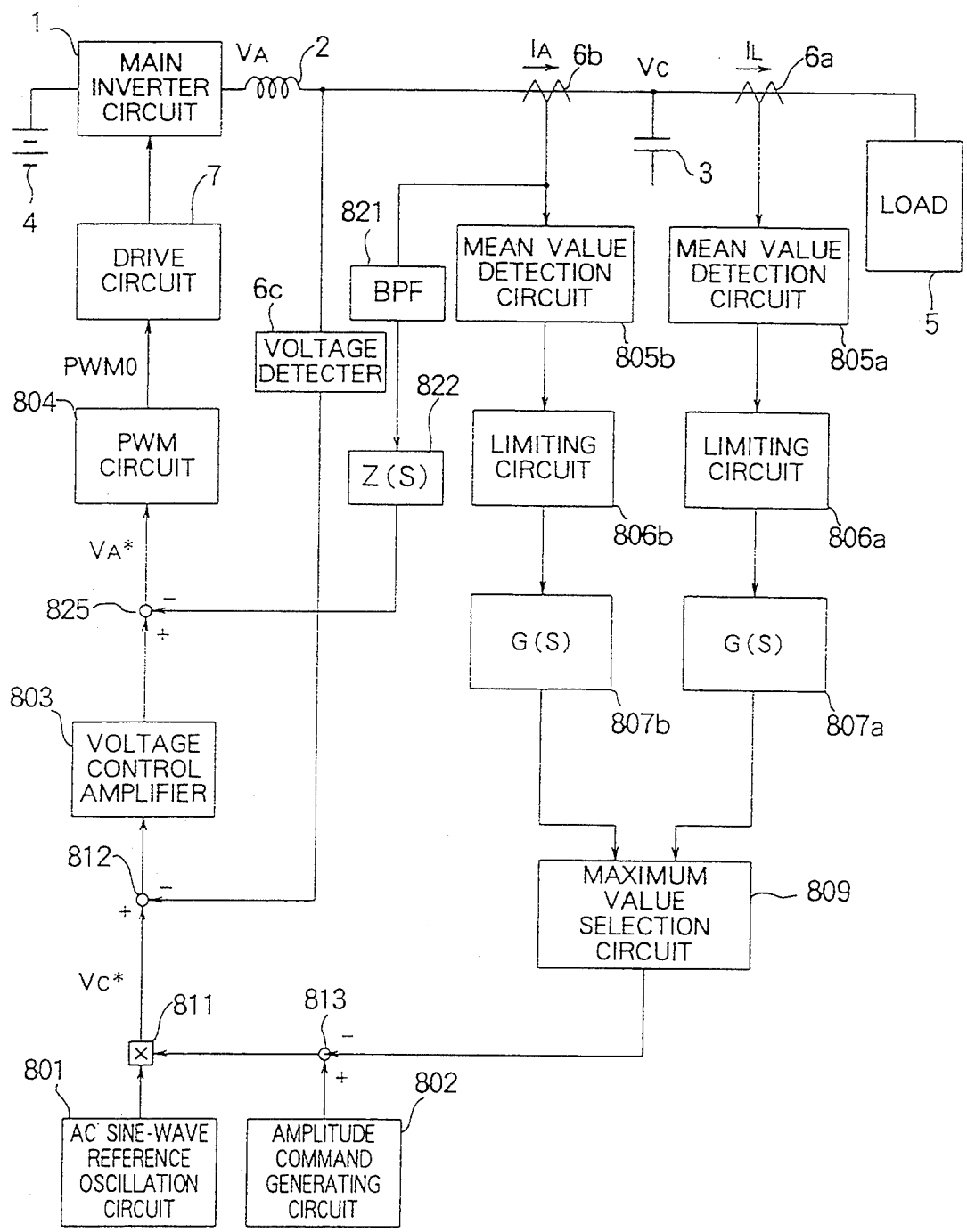

FIG. 26 illustrates a twenty-fourth embodiment of the present invention. Referring to FIG. 26, elements corresponding to those shown in FIGS. 20 or 23 are given the same reference numerals and their detailed descriptions are omitted here. As contrasted with the eighteenth embodiment arranged in such a manner that only the load current $I_L$ is limited and the twenty-first embodiment arranged in such a manner that only the inverter current $I_A$ is limited, this embodiment is arranged in such a manner that the maximum value selection circuit 809 selects either a signal for changing the output voltage amplitude command using the mean value of the load current $I_L$ and a signal for changing the output voltage amplitude command using the mean value of the inverter current $I_A$ to form a virtual output impedance. The residual arrangements are the same as those of the eighteenth embodiment or the twenty-first embodiment.

Referring to FIG. 26, the load current $I_L$ is detected by the detector 6a, while the mean value of the load electric current is detected by the average value detection circuit 805a. The limiting circuit 806a has a maximum load current set thereto. If the mean value of the load current, which is the output from the mean value detection circuit 805a, is smaller than a predetermined value, the output from the limiting circuit 806a is zero. If the mean value of the load current is larger than the predetermined value, a value obtained by subtracting the predetermined value from the mean value of the load current is transmitted from the limiting circuit 806a.

The output from the limiting circuit 806a is passed through the transfer function G (S) 807a and supplied to the maximum value selection circuit 809. On the other hand, the inverter current $I_A$ is detected by the detector 6b, while the mean inverter current is detected by a mean value detection circuit 805b. The limiting circuit 806b has a maximum inverter current set thereto. If the mean value of the inverter current, which is the output from the mean value detection circuit 805b is smaller than a predetermined value, the output from the limiting circuit 806b is zero. If the mean value of the inverter current is larger than the predetermined value, a value obtained by subtracting the predetermined value from the mean value of the inverter current is transmitted from the limiting circuit 806b. The output from the limiting circuit 806b is passed through the transfer function G (S) 807b and received by the maximum value selection circuit 809.

The maximum value selection circuit 809 selects and transmits a signal that has a larger absolute value. The output from the maximum value selection circuit 809 is, in the subtracter 813, subtracted from the output transmitted by the amplitude command generating circuit 802. The output from the adder/subtracter 813 and that from the AC sine-wave reference oscillation circuit 801 are multiplied in the multiplier 811 so that the output voltage command $V_C^*$ is obtained. Therefore, if the mean value of the load current $I_L$ is larger than the predetermined value set to the limiting circuit 806a or if the mean value of the inverter current $I_A$ is larger than the predetermined value set to the limiting circuit 806b, the output voltage command $V_C^*$ is dropped. The voltage control loop causes also the output voltage $V_C$ to be dropped to follow the output voltage command $V_C^*$. If the output voltage $V_C$ has been dropped, the load current $I_L$ or the inverter current $I_A$ is as well as decreased. As a result, the converter and the output line are protected from an excess current.

Similarly to the seventeenth embodiment, the twenty-fourth embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if the mean value of the load current $I_L$ has exceeded the predetermined value set to the limiting circuit 806a or that of the inverter current $I_A$ has exceeded the predetermined value set to the limiting circuit 806b, the load current $I_L$ and the inverter current $I_A$ can be limited in an averaged manner to be smaller than the predetermined values set to the limiting circuits 806a and 806b.

By determining the predetermined value to be set to the limiting circuit 806a as to be capable of protecting the output line and by determining the predetermined value to be set to the limiting circuit 806b as to be capable of protecting the converter, the load current $I_L$ and the inverter current $I_A$ can optimally be limited to protective current levels for the output line and the inverter, respectively.

Although the twenty-fourth embodiment is arranged in such a manner that the limiting circuit 806a and the transfer function G (S) 807a for forming the virtual output impedance using the load current $I_L$ and the limiting circuit 806b and the transfer function G (S) 807b for forming the virtual output impedance using the inverter current $I_A$ are individually disposed, the following common type structure may be employed in a case where the predetermined maximum current and the virtual output impedance have the same characteristics: the mean value of the load current $I_L$ and the inverter current $I_A$ are supplied to the maximum value selection circuit 809; and the output from the maximum value selection circuit 809 is passed through the limiting circuit and received by the transfer function G (S), that is, the limiting circuit and the transfer function G (S) are commonly disposed with respect to the load current $I_L$ and the inverter current $I_A$.

Twenty-Fifth Embodiment

Figure 27:
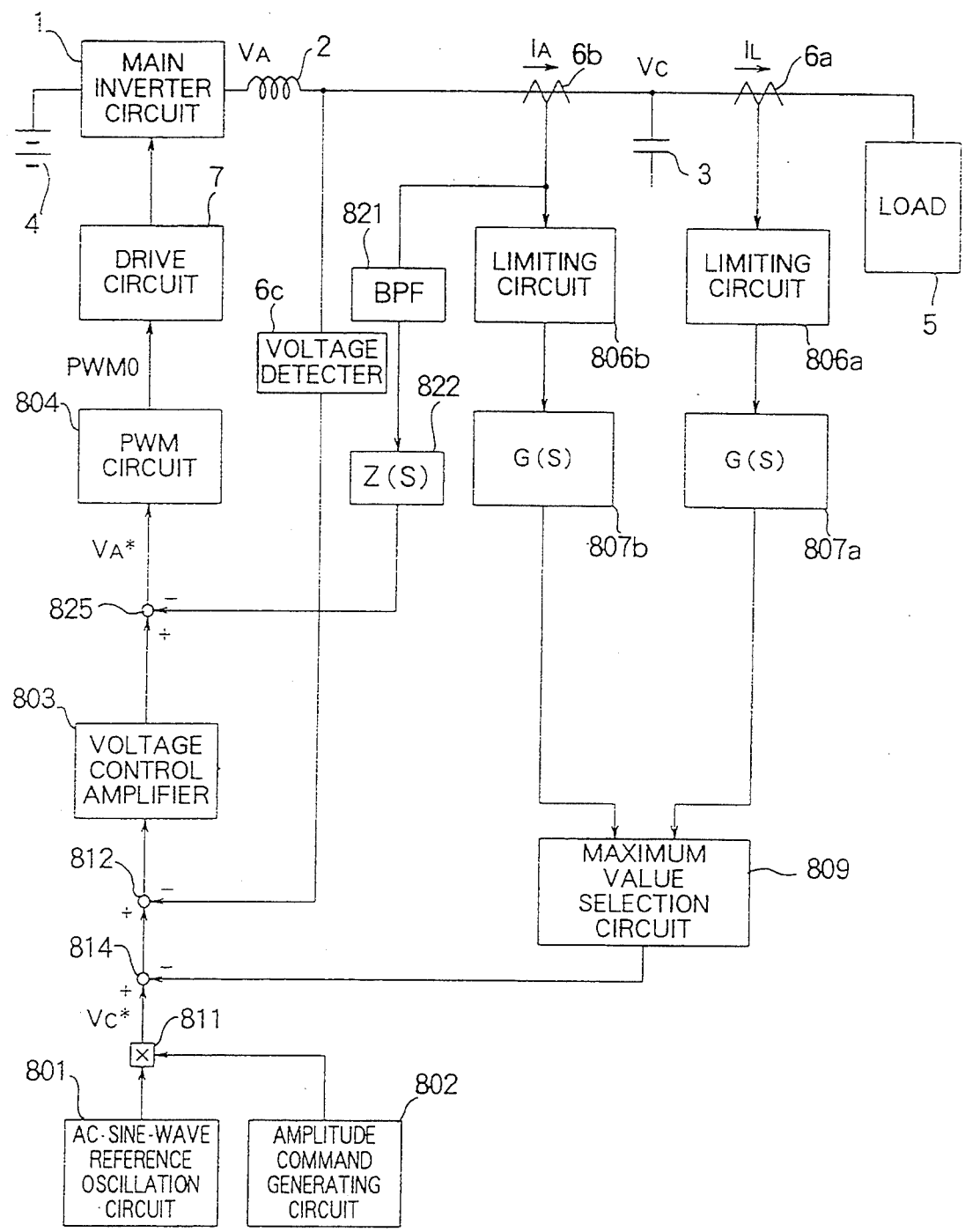

FIG. 27 illustrates a twenty-fifth embodiment of the present invention. Referring to FIG. 27, elements corresponding to those shown in FIG. 26 are given the same reference numerals and their detailed descriptions are omitted here. The difference from the foregoing first embodiment lies in that the maximum value selection circuit 809 selects either a signal for changing the output voltage command $V_C^*$ using the instantaneous value of the load current $I_L$ and a signal for changing the output voltage command $V_C^*$ using the instantaneous value of the inverter current $I_A$ to form a virtual output impedance. The residual arrangements are the same as those of the eighteenth embodiment or the twenty-fourth embodiment.

Referring to FIG. 27, the instantaneous value of the load current $I_L$ is supplied to the limiting circuit 806a. If the instantaneous value of the load current $I_L$ is larger than a predetermined positive value or smaller than a predetermined negative value, a value obtained by subtracting the predetermined value from the instantaneous value of the load current $I_L$ is transmitted from the limiting circuit 806a. The output from the limiting circuit 806a is passed through the transfer function G (S) 807a and received by the maximum value selection circuit 809. On the other hand, the instantaneous value of the inverter current $I_A$ is supplied to the limiting circuit 806b. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806b.

The output from the limiting circuit 806b is passed through the transfer function G (S) 807b and received by the maximum value selection circuit 809. The maximum value selection circuit 809 selects a signal having a larger absolute value and outputs it while faithfully restoring the polarity of the signal. The output from the maximum value selection circuit 809 is, in the adder/subtracter 814, subtracted from the output voltage commands $V_C^*$, which is the output from the multiplier 811.

Similarly to the seventeenth embodiment, the twenty-fifth embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if the instantaneous value of the load current $I_L$ has exceeded the predetermined value set to the limiting circuit 806a or that of the inverter current $I_A$ has exceeded the predetermined value set to the limiting circuit 806b, the output voltage command $V_C^*$ is instantaneously dropped. Therefore, the load current $I_L$ and the inverter current $I_A$ can be limited to be smaller than the predetermined values set to the limiting circuits 806a and 806b.

Twenty-Sixth Embodiment

Figure 28:
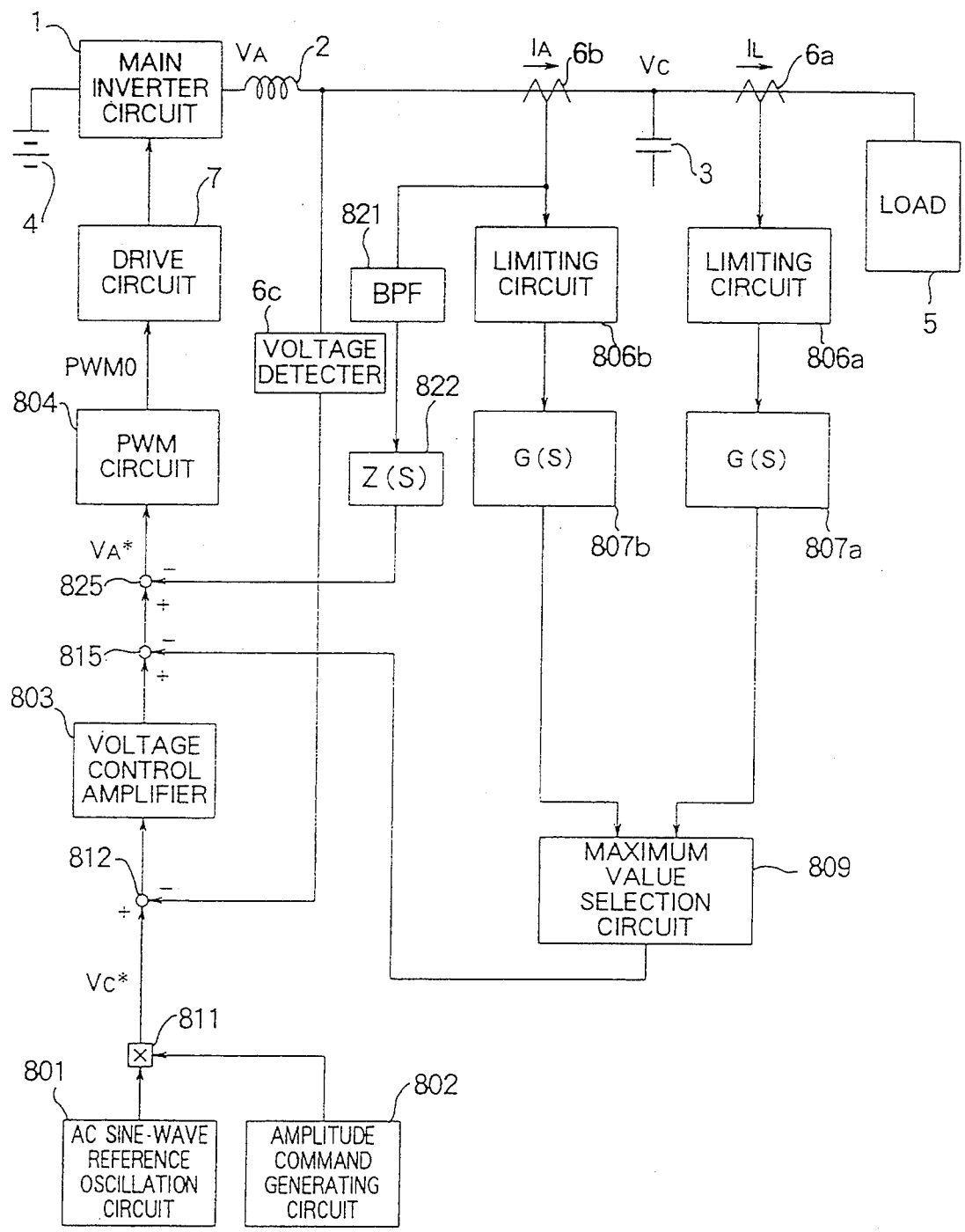

FIG. 28 illustrates a twenty-sixth embodiment of the present invention. Referring to FIG. 28, elements corresponding to those shown in FIG. 26 are given the same reference numerals and their detailed descriptions are omitted here. The difference from the foregoing twenty-fourth embodiment lies in that either a signal for changing the PWM voltage command $V_A^*$ using the instantaneous value of the load current $I_L$ or a signal for changing the PWM voltage command $V_A^*$ using the instantaneous value of the inverter current $I_A$ is selected by the maximum value selection circuit 809 to form a virtual output impedance. The residual structures are the same as those of the twenty-fourth embodiment.

Referring to FIG. 28, the instantaneous value of the load current $I_L$ is supplied to the limiting circuit. 806a. If the instantaneous value of the load current $I_L$ is larger than a predetermined positive value or smaller than a predetermined negative value, a value obtained by subtracting the predetermined value from the instantaneous value of the load current $I_L$ is transmitted from the limiting circuit 806a. The output from the limiting circuit 806a is passed through the transfer function G (S) 807a and received by the maximum value selection circuit 809. On the other hand, the instantaneous value of the inverter current $I_A$ is supplied to the limiting circuit 806b. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806b.

The output from the limiting circuit 806b is passed through the transfer function G (S) 807b and received by the maximum value selection circuit 809. The maximum value selection circuit 809 selects a signal having a larger absolute value and outputs it while faithfully restoring the polarity of the signal. The output from the maximum value selection circuit 809 is, in the adder/subtracter 815, subtracted from the output of the voltage control amplifier 803. The output from the adder/subtracter 815 is made to be the PWM voltage command $V_A^*$.

Similarly to the seventeenth embodiment, the twenty-sixth embodiment enables the necessity of special arid complicated design of the voltage control amplifier 803 to prevent the resonance of the LC filter to be eliminated. Further, transient characteristics of the output voltage in a frequency band, in which electric power is supplied, can be improved. In addition, if the instantaneous value of the load current $I_L$ has exceeded the predetermined value set to the limiting circuit 806a or that of the inverter current $I_A$ has exceeded the predetermined value set to the limiting circuit 806b, the PWM voltage command $V_A^*$ is instantaneously dropped. Therefore, the load current $I_L$ and the inverter current $I_A$ can be limited to be smaller than the predetermined values set to the limiting circuits 806a and 806b due to the response of the PWM circuit 804.

Although the sixteenth to the twenty-sixth embodiments have been described about the single-phase inverter, the foregoing arrangement may be applied to a three-phase inverter structured as shown in FIG. 2b and having transistors $S_5$ to $S_{10}$ to which the diodes $D_5$ to $D_{10}$ are inversely connected in parallel if a similar control circuit is used for each phase or at least two phases.

As contrasted with the twenty-fifth and twenty-sixth embodiments in which the limiting circuit 806a and the transfer function G (S) 807a for forming the virtual output impedance using the load current $I_L$ and the limiting circuit 806b and the transfer function G (S) 807b for forming the virtual output impedance using the inverter current $I_A$ are individually disposed, the following common type structure may be employed in a case where the predetermined maximum current and the virtual output impedance have the same characteristics: the instantaneous values of the load current $I_L$ and the inverter current $I_A$ are supplied to the maximum value selection circuit and the output from the maximum value selection circuit is passed through the limiting circuit and received by the transfer function G (S), that is, the limiting circuit and the transfer function G (S) are disposed commonly to the load current $I_L$ and the inverter current $I_A$.

Twenty-Seventh Embodiment

A twenty-seventh embodiment of the present invention will now be described. Among multi-phase AC circuits, a three-phase and three-wire system AC circuit for example is conditioned that the sum of the three phase currents is zero. Therefore, the foregoing circuit has coherency that limiting of a certain phase to a predetermined value range causes the electric currents of the residual phases to be so changed as to satisfy the foregoing condition. As a result, it is difficult to individually control the three phases.

Figure 29:
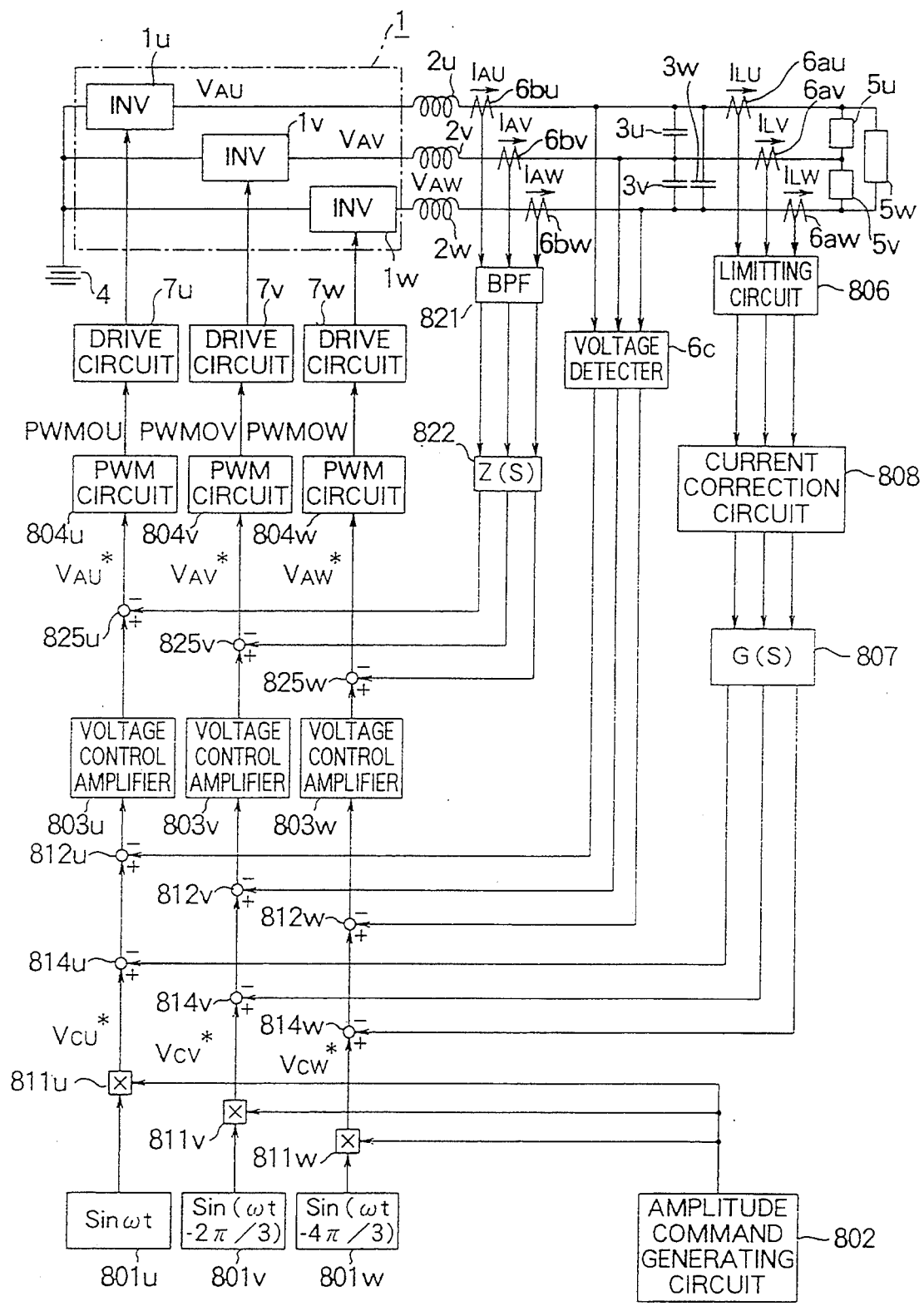

FIG. 29 illustrates the twenty-seventh embodiment of the present invention. Referring to FIG. 29, elements corresponding to those shown in FIG. 21 are given the same reference numerals and their detailed descriptions are omitted here. The difference from the foregoing second embodiment lies in that a control circuit is disposed for each phase and an electric current compensation circuit is additionally disposed so that an incoherent control is performed.

Referring to FIG. 29, a main inverter circuit 1 is formed into a three-phase structure as shown in FIG. 2b, wherein elements having suffix u are elements of a U-phase inverter, those having suffix v are elements of a V-phase inverter and those having suffix w are elements of a W-phase inverter. The instantaneous value of the load current $I_L$ for each phase is supplied to the limiting circuit 806. If the instantaneous value of the load current $I_L$ is larger than a predetermined positive value or smaller than a predetermined negative value, a value obtained by subtracting the predetermined value from the instantaneous value of the load current $I_L$ is transmitted from the limiting circuit 806 for each phase.

The output from the limiting circuit 806 is passed through the transmission function G (S) 807 and received by a current correction circuit 808. The current correction circuit 808 transmits signals so corrected as to make the sum of the supplied three-phase signals to be zero. The signals are then, in adders/subtracters 814u, 814v and 814w, subtracted for each phase from output voltage commands $V_{CU}^*$, $V_{CV}^*$ and $V_{CW}^*$, which are outputs from multipliers 811u, 811v and 811w.

The detailed operation of the current correction circuit 808 will now be described. Assumptions are made here that the detected load current values are $I_{LU}$, $I_{LV}$, $I_{LW}$, values set to the limiting circuit 806 are $\pm K$, the outputs from the limiting circuit 806 are $I_{LUM}$, $I_{LMV}$, $I_{LMW}$ and the outputs from the current correction circuit 808 are $I_{JU}$, $I_{JV}$ and $I_{JW}$. If only the U-phase current has become excessive, the outputs from the limiting circuit 806 are made as expressed Equations (1) to (3). The outputs from the current correction circuit 808 are as made as expressed by Equations (4) to (6) so that correction is so made that the sum of the signals of the three phases is made zero and they are transmitted.

If electric currents of the two phases, for example, the U phase and the V-phase, have become excessive, the outputs from the limiting circuit 806 are made as expressed by Equations (7) to (9). The outputs from the current correction circuit 808 are, at this time, made as expressed by Equations (10) to (12) so that the sum of the signals of the three phases is made zero and they are transmitted. That is, the current correction circuit 808 converts the signal into a signal with which the sum of the signals of the three phases adaptable to the three-phase and three-wire system is made to be zero.

Similarly to the seventeenth embodiment, the twenty-seventh embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if any one of the instantaneous values of the load currents $I_L$ for the respective phases has exceeded the predetermined value set to the limiting circuit 806a, the output voltage command $V_C^*$ is instantaneously dropped by the correction signal for making the sum of the signals for the three phases to be zero. Therefore, the load current $I_L$ can be, at high speed and without coherence, limited to be smaller than the predetermined values set to the limiting circuit 806 due to the response of the voltage control loop.

Twenty-Eighth Embodiment

Figure 30:
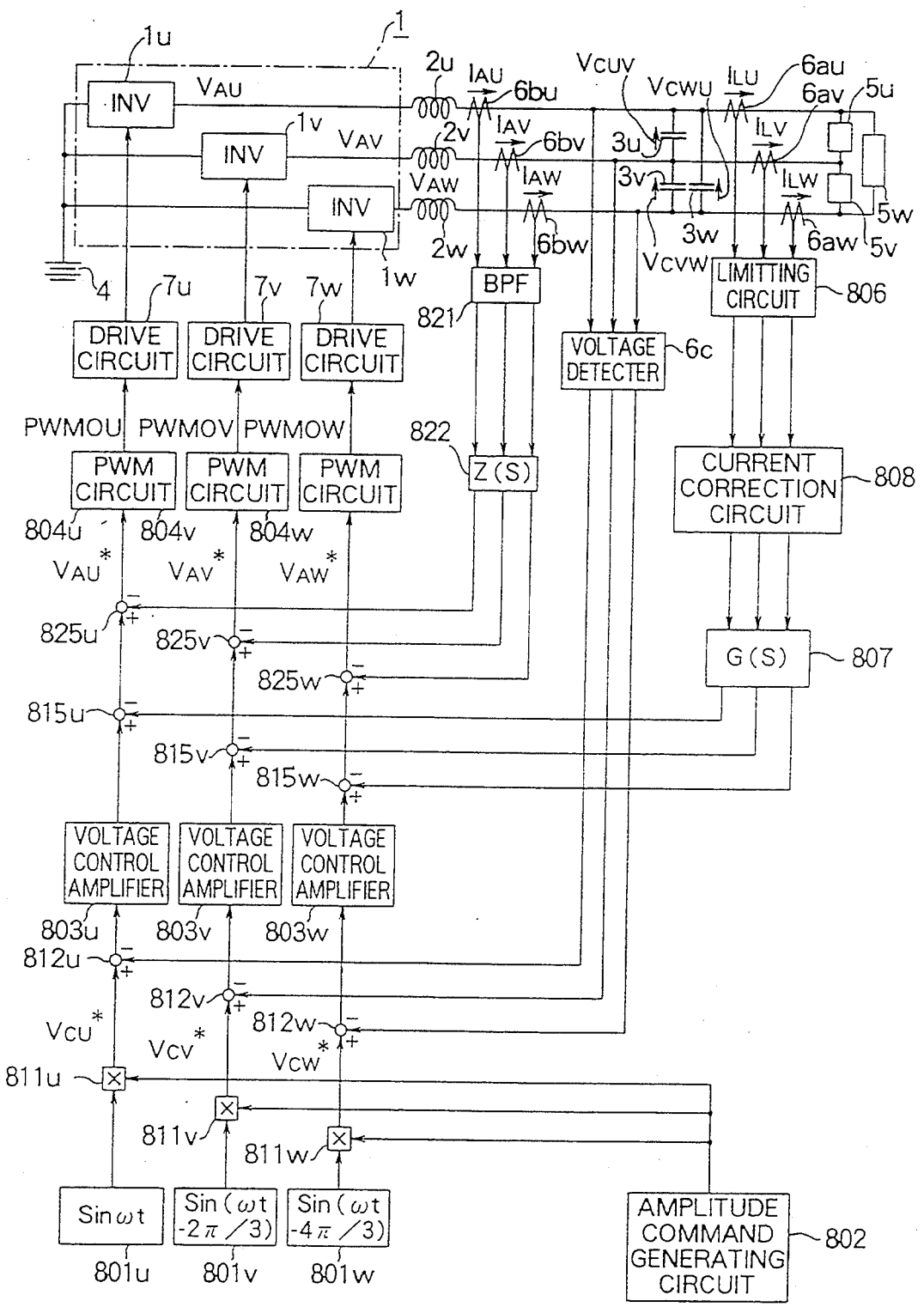

FIG. 30 illustrates a twenty-eighth embodiment of the present invention. Referring to FIG. 30, elements corresponding to those shown in FIG. 29 are given the same reference numerals and their detailed descriptions are omitted here. The difference from the foregoing twenty-seventh embodiment lies in that the instantaneous value of the load current $I_L$ is used to change the PWM voltage command to form a virtual impedance. The residual structures are the same as those of the twenty-seventh embodiment.

Referring to FIG. 30, the instantaneous value of the load current $I_L$ for each phase is supplied to the limiting circuit 806. If the instantaneous value of the load current is larger than a predetermined positive value or smaller than a predetermined negative value, a value obtained by subtracting the predetermined value from the instantaneous value of the load current is transmitted for each phase from the limiting circuit 806. The outputs from the limiting circuit 806 are passed through the transmission function G (S) 807 and supplied to the current correction circuit 808.

The current correction circuit 808 transmits signals so corrected that the sum of the supplied signals for the three phases is zero, the signals being then subtracted, in the adders/subtracters 815u, 815v and 815w, from the outputs from the voltage control amplifiers 803u, 803v and 803w. The outputs from the adders/subtracters 815u, 815v and 815w are made to be PWM voltage commands $V_{AU}^*$, $V_{AV}^*$ and $V_{AW}^*$.

Similarly to the twenty-seventh embodiment, the twenty-eighth embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if any one of the instantaneous values of the load currents $I_L$ for the respective phases has exceeded the predetermined value set to the limiting circuit 806, the PWM voltage command is instantaneously dropped by the correction signal for making the sum of the signals for the three phases to be zero. Therefore, the load current $I_L$ can be, instantaneously and without coherence, limited to be smaller than the predetermined values set to the limiting circuit 806 due to the response of the PWM circuit 804.

Twenty-Ninth Embodiment

Figure 31:
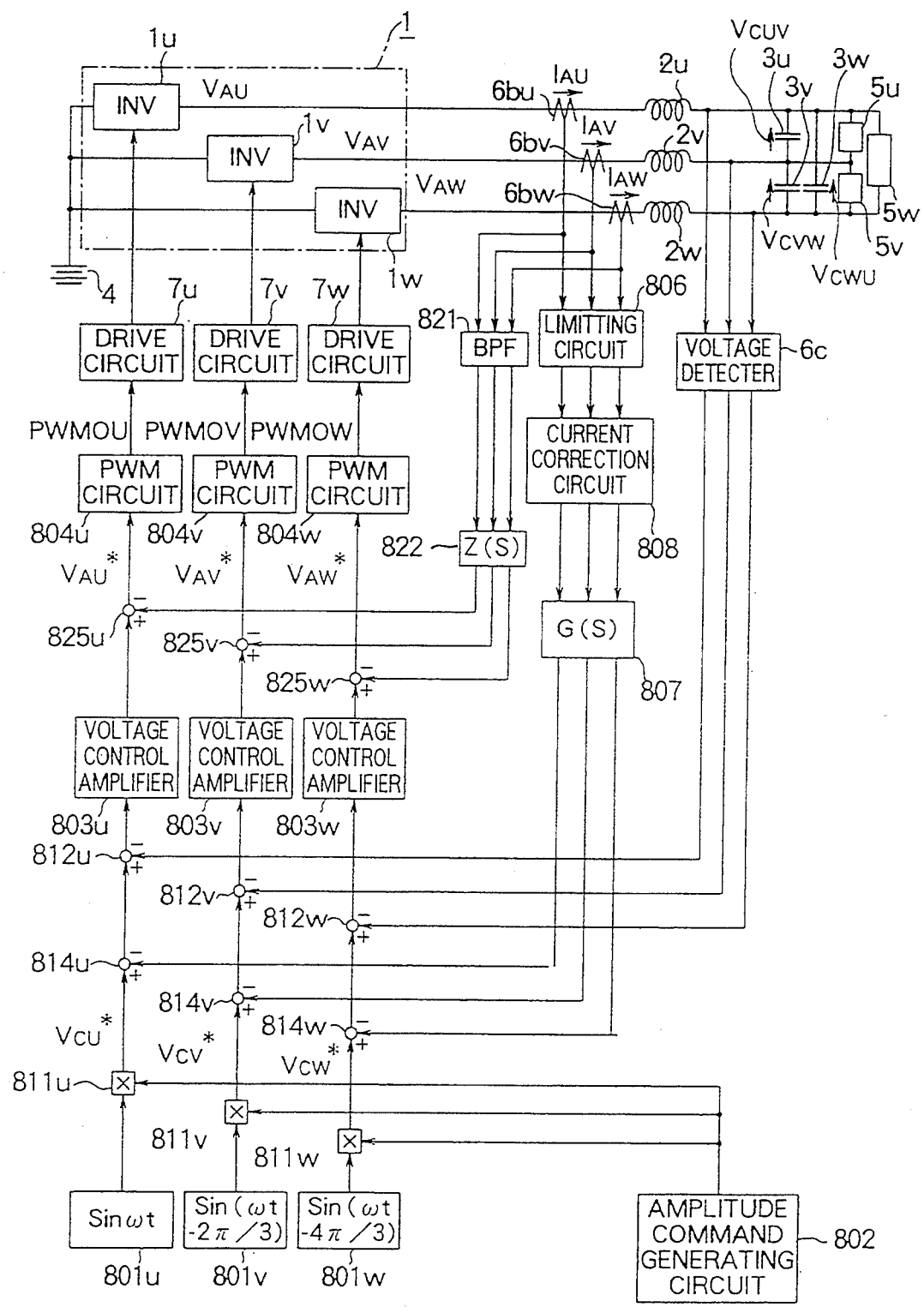

FIG. 31 illustrates a twenty-ninth embodiment of the present invention. Referring to FIG. 31, elements corresponding to those shown in FIG. 29 are given the same reference numerals and their detailed descriptions are omitted here. The difference from the foregoing twenty-seventh embodiment lies in that the instantaneous value of the inverter current $I_A$ is used to change the output voltage command to form a virtual output impedance. The residual structures are the same as those of the twenty-seventh embodiment.

Referring to FIG. 31, the instantaneous value of the load current $I_L$ for each phase is supplied to the limiting circuit 806. If the instantaneous value of the load current is larger than a predetermined positive value or smaller than a predetermined negative value, a value obtained by subtracting the predetermined value from the instantaneous value of the load current is transmitted for each phase from the limiting circuit 806. The outputs from the limiting circuit 806 are passed through the transmission function G (S) 807 and supplied to the current correction circuit 808.

The current correction circuit 808 transmits signals so corrected that the sum of the supplied signals for the three phases is zero, the signals being then subtracted for each phase, in the subtracters 814u, 814v and 814w, from output voltage commands $V_{CU}^*$, $V_{CV}^*$ and $V_{CW}^*$ which are outputs from the multipliers 811u, 811v and 811w.

Similarly to the foregoing embodiment, the twenty-ninth embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if any one of the instantaneous values of the inverter currents $I_A$ for the respective phases has exceeded the predetermined value set to the limiting circuit 806, the output voltage command is instantaneously dropped by the correction signal for making the sum of the signals for the three phases to be zero. Therefore, the load current $I_L$ can be, at high speed and without coherence, limited to be smaller than the predetermined values set to the limiting circuit 806 due to the response of the voltage control loop.

Thirtieth Embodiment

Figure 32:
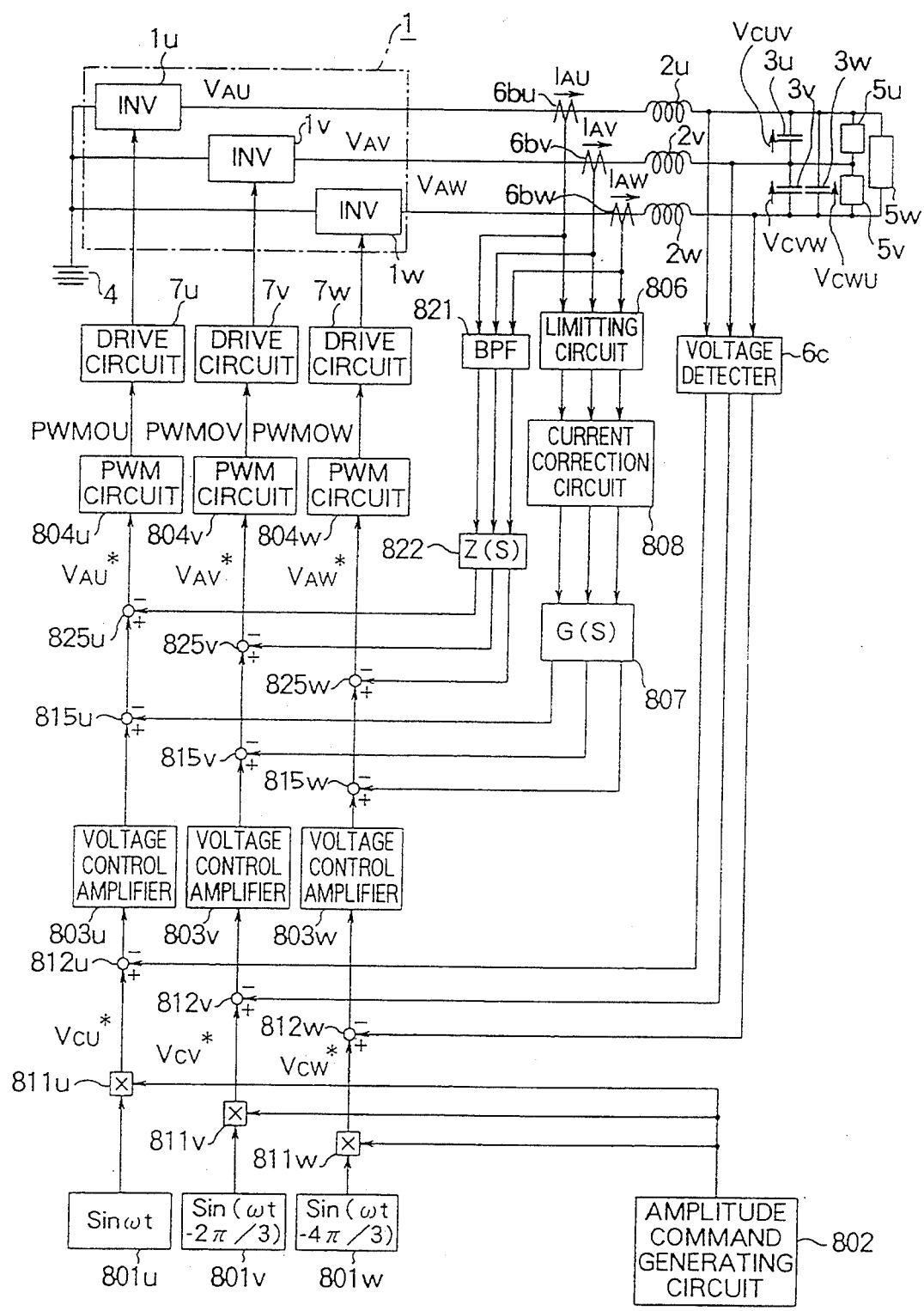

FIG. 32 illustrates a thirtieth embodiment of the present invention. Referring to FIG. 32, elements corresponding to those shown in FIG. 31 are given the same reference numerals and their detailed descriptions are omitted here. The difference from the foregoing twenty-ninth embodiment lies in that the instantaneous value of the inverter current $I_A$ is used to change the PWM voltage command to form a virtual output impedance. The residual structures are the same as those of the twenty-ninth embodiment.

Referring to FIG. 32, the instantaneous value of the inverter current $I_A$ for each phase is supplied to the limiting circuit 806. If the instantaneous value of the inverter current $I_A$ is larger than a predetermined positive value or smaller than a predetermined negative value, a value obtained by subtracting the predetermined value from the instantaneous value of the inverter current $I_A$ is transmitted for each phase from the limiting circuit 806. The outputs from the limiting circuit 806 are passed through the transmission function G (S) 807 and supplied to the current correction circuit 808.

The current correction circuit 808 transmits signals so corrected that the sum of the supplied signals for the three phases is zero, the signals being then subtracted for each phase, in the adders/subtracters 815$u$, 815$v$ and 815$w$, from outputs from the multipliers 803$u$, 803$v$ and 803$w$. The outputs from the adders/subtracters 815$u$, 815$v$ and 815$w$ are made to be PWM voltage commands $V_{AU}{}^*$, $V_{AV}{}^*$ and $V_{AW}{}^*$.

Similarly to the seventeenth embodiment, the thirtieth embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if any one of the instantaneous values of the inverter currents $I_A$ for the respective phases has exceeded the predetermined value set to the limiting circuit 806, the PWM voltage command is instantaneously dropped by the correction signal for making the sum of the signals for the three phases to be zero. Therefore, the load current $I_L$ can be, instantaneously and without coherence, limited to be smaller than the predetermined values set to the limiting circuit 806 due to the response of the PWM circuit 804.

Thirty-First Embodiment

Figure 33:
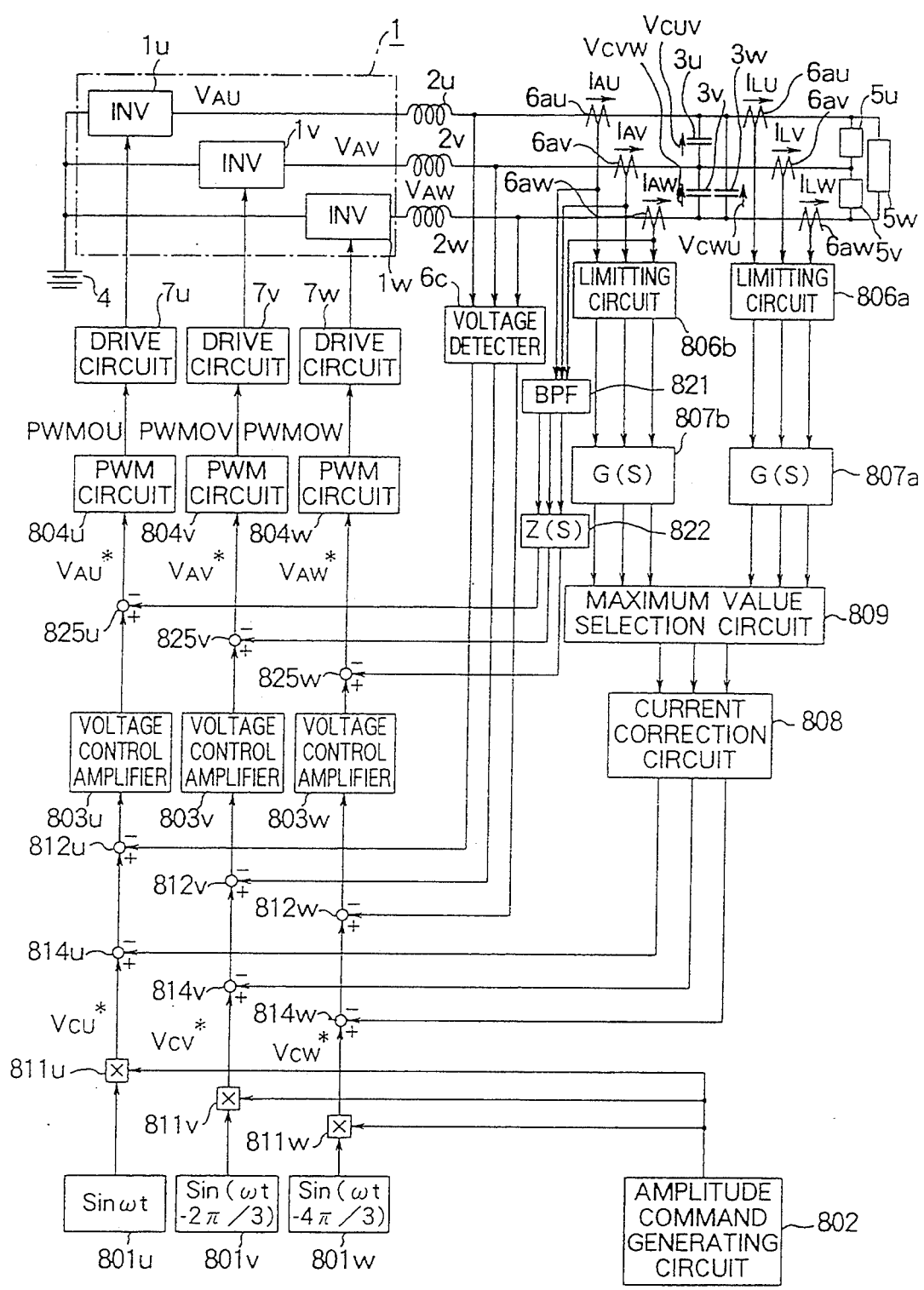

FIG. 31 illustrates a thirty-first embodiment of the present invention. Referring to FIG. 33, elements corresponding to those shown in FIGS. 29 or 31 are given the same reference numerals and their detailed descriptions are omitted here. As contrasted with the twenty-seventh embodiment arranged in such a manner that only the load current $I_L$ is limited and the twenty-ninth embodiment arranged in such a manner that only the inverter current $I_A$ is limited, this embodiment is arranged in such a manner that the maximum value selection circuit 809 selects the signal for changing the output voltage command using the load current $I_L$ or a signal for changing the output voltage command using the inverter current $I_A$ to form a virtual output impedance. The residual structures are the same as those of the twenty-seventh or the twenty-ninth embodiments.

Referring to FIG. 33, the instantaneous value of the load current $I_L$ for each phase is supplied to the limiting circuit 806$a$. If the instantaneous value of the load current is larger than a predetermined positive value or smaller than a predetermined negative value, a value obtained by subtracting the predetermined value from the instantaneous value of the load current is transmitted from the limiting circuit 806$a$. The output from the limiting circuit 806$a$ is passed through the transfer function G (S) 807$a$ and received by the maximum value selection circuit 809. On the other hand, the instantaneous value of the inverter current $I_A$ for each phase is supplied to the limiting circuit 806$b$. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806$b$.

The output from the limiting circuit 806$b$ is passed through the transfer function G (S) 807$b$ and received by the maximum value selection circuit 809. The maximum value selection circuit 809 selects and transmits a signal for each phase that has a larger absolute value while faithfully restoring the polarities of the signals. The outputs from the maximum value selection circuit 809 are supplied to the current correction circuit 808 as to be corrected so that the sum of the signals for the three phases is made to be zero. The outputs for the respective phase are then subtracted from the output voltage commands $V_{CU}{}^*$, $V_{CV}{}^*$ and $V_{CW}{}^*$ which are the outputs from the multipliers 811$u$, 811$v$ and 811$w$, the subtractions being performed in the adders/subtracters 814$u$, 814$v$ and 814$w$.

Similarly to the seventeenth embodiment, the thirty-first embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if any one of the instantaneous values of the load currents $I_L$ for the respective phases has exceeded the predetermined value set to the limiting circuit 806$b$, the output voltage command is instantaneously dropped by the correction signal for making the sum of the signals for the three phases to be zero. Therefore, the load current $I_L$ and the inverter current $I_A$ can be, at high speed and without coherence, limited to be smaller than the predetermined values set to the limiting circuit 806$a$ and 806$b$ due to the response of the voltage control loop.

Thirty Second Embodiment

Figure 34:
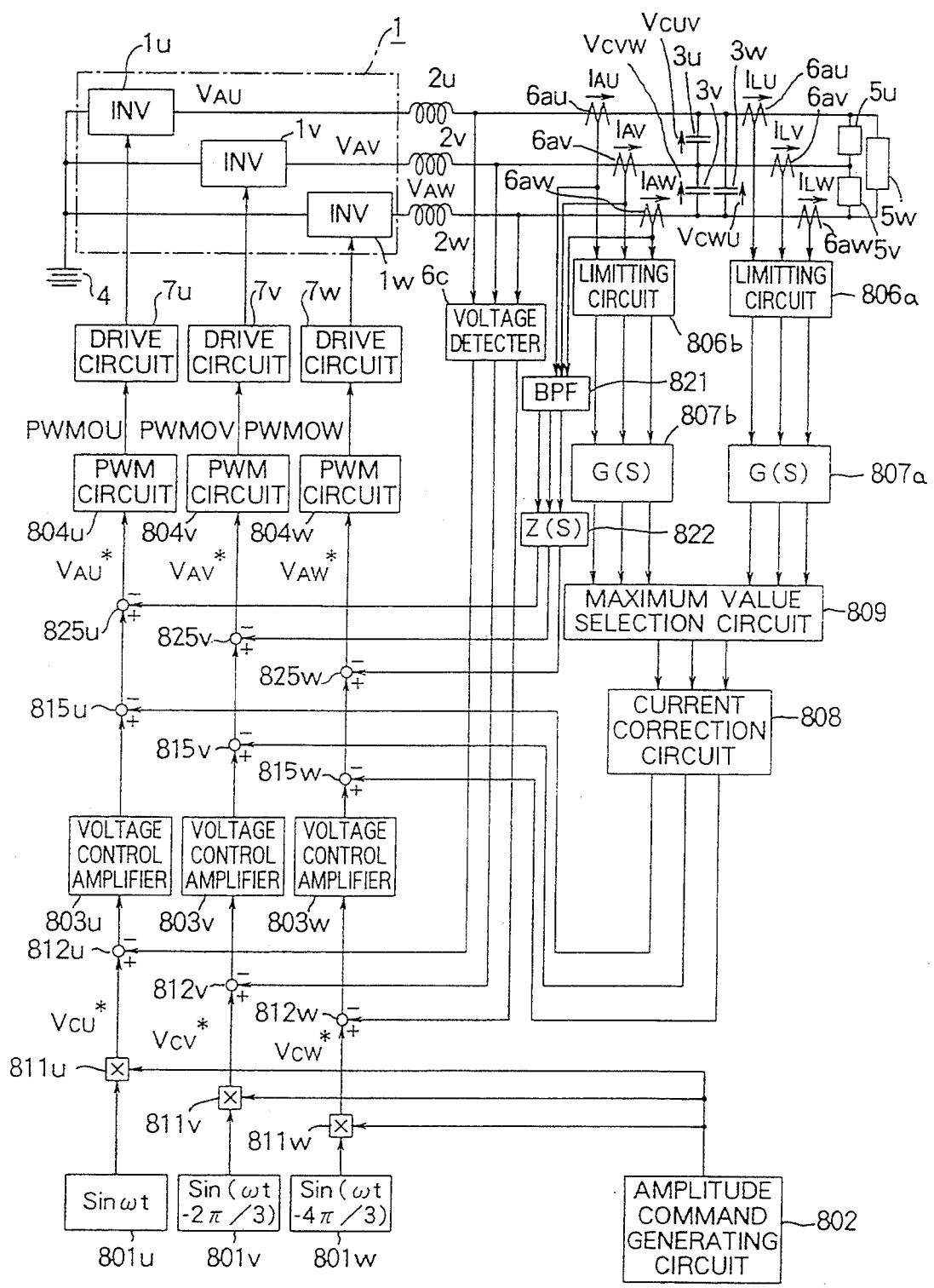

FIG. 34 illustrates a thirty-second embodiment of the present invention. Referring to FIG. 34, elements corresponding to those shown in FIG. 33 are given the same reference numerals and their detailed descriptions are omitted here. The difference from the foregoing thirty-first embodiment lies in that the selection circuit 809 selects a signal for changing the PWM voltage command using the instantaneous value of the load current $I_L$ and a signal for changing the PWM voltage command using the inverter current $I_A$ to form a virtual output impedance. The residual structures are the same as those of the thirty-first embodiment.

Referring to FIG. 34, the instantaneous value of the load current $I_L$ for each phase is supplied to the limiting circuit 806$a$. If the instantaneous value of the load current is larger than a predetermined positive value or smaller than a predetermined negative value, a value obtained by subtracting the predetermined value from the instantaneous value of the load current is transmitted from the limiting circuit 806$a$. The output from the limiting circuit 806$a$ is passed through the transfer function G (S) 807$a$ and received by the maximum value selection circuit 809. On the other hand, the instantaneous value of the inverter current $I_A$ for each phase is supplied to the limiting circuit 806b. If the instantaneous value of the inverter current $I_A$ is larger than a predetermined positive value or smaller than a predetermined negative value, a value obtained by subtracting the predetermined value from the instantaneous value of the inverter current $I_A$ is transmitted from the limiting circuit 806b.

The output from the limiting circuit 806b is passed through the transfer function G (S) 807b and received by the maximum value selection circuit 809. The maximum value selection circuit 809 selects and transmits a signal for each phase that has a larger absolute value while faithfully restoring the polarities of the signals. The outputs from the maximum value selection circuit 809 are supplied to the current correction circuit 808 as to be corrected so that the sum of the signals for the three phases is made to be zero. The outputs for the respective phase are then subtracted from the outputs from the voltage control amplifiers 803u, 803v and 803w. The outputs from the adders/subtracters 815u, 815v and 815w are made to be the PWM voltage commands $V_{AU}^*$, $V_{AV}^*$ and $V_{AW}^*$.

Similarly to the seventeenth embodiment, the thirty-second embodiment enables the necessity of special and complicated design of the voltage control amplifier 803 to prevent the resonance of the LC filter to be eliminated. Further, transient characteristics of the output voltage in a frequency band, in which electric power is supplied, can be improved. In addition, if any one of the instantaneous values of the load currents $I_L$ for the respective phases has exceeded the predetermined value set to the limiting circuit 806a, or if any one of the instantaneous values of the inverter currents $I_A$ for the respective phases has exceeded the predetermined value set to the limiting circuit 806b, the PWM voltage command is instantaneously dropped by the correction signal for making the sum of the signals for the three phases to be zero. Therefore, the load current $I_L$ and the inverter current $I_A$ can be, instantaneously and without coherence, limited to be smaller than the predetermined values set to the limiting circuit 806a and 806b due to the response of the PWM circuit 804.

Thirty-Third Embodiment

Figure 35:
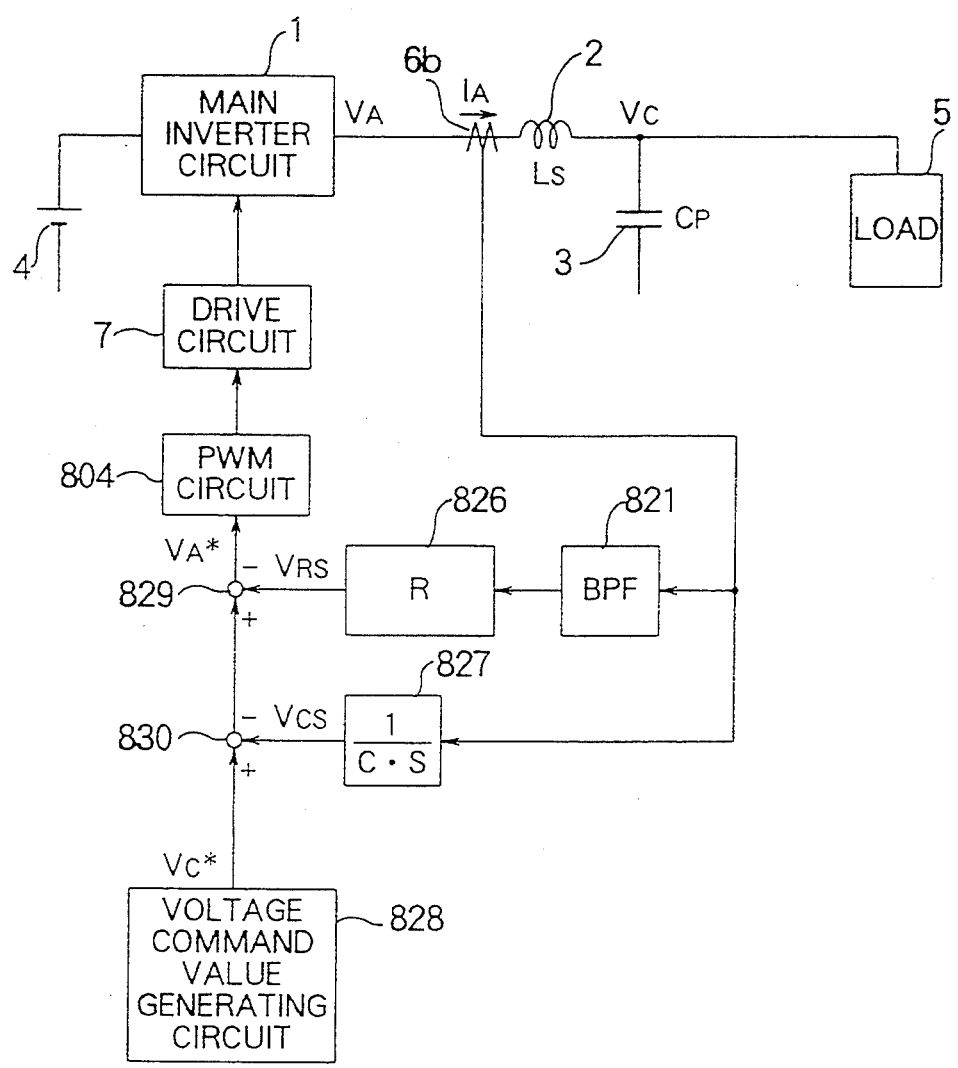

FIG. 35 illustrates a thirty-third embodiment of the present invention. Referring to FIG. 35, reference numeral 1 represents a main inverter circuit exemplified by a circuit for, with triangle-wave carriers of about 1 to 2 KHz, modulating the pulse width of a single-phase full bridge inverter arranged as shown in FIG. 2a. Reference numerals 2 and 3 respectively represent a reactor and a capacitor for a filter, 4 represents a DO power source, 5 represents a load, 7 represents a drive circuit for the main inverter circuit 1, and 6b represents a detector for detecting inverter current $I_A$.

Referring to FIG. 35, reference numerals between eight and nine hundred represent elements of a control circuit. Reference numeral 804 represents a PWM circuit, 821 represents a band pass filter (BPF) which permits only the resonant frequency band for the LC filter. Reference numeral 826 represents a proportional circuit having gain R disposed for the purpose of improving apparent damping of the LC filter similarly to the transfer function Z (S) 822 according to the sixteenth embodiment. Reference numeral 827 represents an integrator having integrating time constant C to serve as a compensating circuit for transmitting an output to compensate the voltage drop of the reactor 2 in accordance with the inverter current $I_A$. Reference numeral 828 represents a voltage command value generating circuit comprising the AC sine-wave reference oscillation circuit 801 and the amplitude command generating circuit 802 according to the foregoing embodiments and arranged to transmitting AC sine-wave reference voltage. Reference numerals 829 and 830 represent adders/subtracters.

The operation of the thus-constituted embodiment will now be described with reference to FIG. 35. In this structure, signals obtained by subtracting, in adders/subtracters 829 and 830, output $V_{RS}$ transmitted from the proportional circuit 826 and output $V_{CS}$ transmitted from the integrator 827 from output voltage command $V_C^*$ of the voltage command value generating circuit 828 are, as voltage command value $V_A^*$, supplied to the PWM circuit 804 so that switching of the main inverter circuit 1 is controlled. The inverter currents $I_A$ are detected by the detector 701 so that either of the same is passed through the band pass filter 821, which permits the band adjacent to the resonance frequency of the LC filter to pass through as to transmit signal $V_{RS}$ multiplied by R in the proportional circuit 826. The residual one is supplied to the integrator 827 having the integration time constant C so that signal $V_{CS}$ is obtained.

An assumption is made that the output $V_{CS}$ from the integrator 827 is zero to consider the operations of the proportional circuit 826 and the band pass filter 821. In this case, the PWM voltage command $V_A^*$ is dropped in proportion to the inverter current $I_A$ in a band adjacent to the resonance frequency of the LC filter. Therefore, the operation is performed such that virtual resistor R is in series connected to the reactor 2. At this time, the apparent transfer function F (S) of the LC filter is made as expressed by Equation (14) according to the sixteenth embodiment. Further, damping coefficient $\zeta$ is made as expressed by Equation (15).

As can be understood from Equation (15), if damping of the PWM voltage command VA* using the inverter current $I_A$ is not performed, R is zero and therefore $\zeta$ is made to be zero. Although a resonant LC filter is formed in this case, damping of the PWM voltage command $V_A^*$ with the inverter current $I_A$ is able to realize an arbitrary R. Therefore, selection of the proportion coefficient R that satisfies that $\zeta$ is 0.7 or more enables apparent damping of the LC filter be improved.

The operation of the integrator 827 will now be discussed.

Since the resonant frequency of the LC filter is usually determined to be a frequency several or more times the output voltage frequency to remove the ripple voltage PWM, the output from the band pass filter 821 which permits the band adjacent to the resonant frequency of the LC filter to pass through is made to be substantially zero in the vicinity of the output voltage frequency. Therefore, also the output signal VRS from the proportional circuit 826 is made to be substantially zero. Since the PWM voltage command $V_A^*$ is dropped in proportion to the integrated value of the inverter current $I_A$, the operation is performed as if a virtual capacitor C is connected to the reactor 2 in series.

Therefore, the integration time constant C of the integrator 827 is determined from the following equation $$C = 1/\{(2\pi f)^2 L_S\} \tag{16}$$

where f=frequency of the output voltage and $L_S$=inductance value of the reactor 2.

Since the frequency of the output voltage is made to be a series resonant frequency, the operation is performed when viewed from the output voltage command $V_C^*$ of the voltage command value generating circuit 828 such that the voltage drop of the reactor 2 is canceled due to the voltage drop of a virtual capacitor C having the same amplitude as that of the reactor 2 and having a phase deviated by 180° from it and therefore the voltage drop of the reactor 2 is zero.

Since inductance value $L_S$ of the reactor is usually determined to be several to 20% the virtual capacitor C is made to be about 500% to 200%. Therefore, the influence of the virtual capacitor can be ignored in a range adjacent to the resonant frequency of the LC filter. Therefore, no problem arises if the consideration of the operations of the proportional circuit 826 and the band pass filter 821 in the resonant frequency zone of the LC filter while making the output $V_{CS}$ of the integrator 827 to be zero.

As described above, the elements of the control circuit, such as the proportional circuit 826, the band pass filter 821 and the integrator 827, are operated as a virtual resistor having a value only in a range adjacent to the resonant frequency of the LC filter and a virtual capacitor that resonates with the reactor 2 at the output voltage frequency. Therefore, the block diagram shown in FIG. 35 is equivalent to a block diagram shown in FIG. 36.

Figure 36:
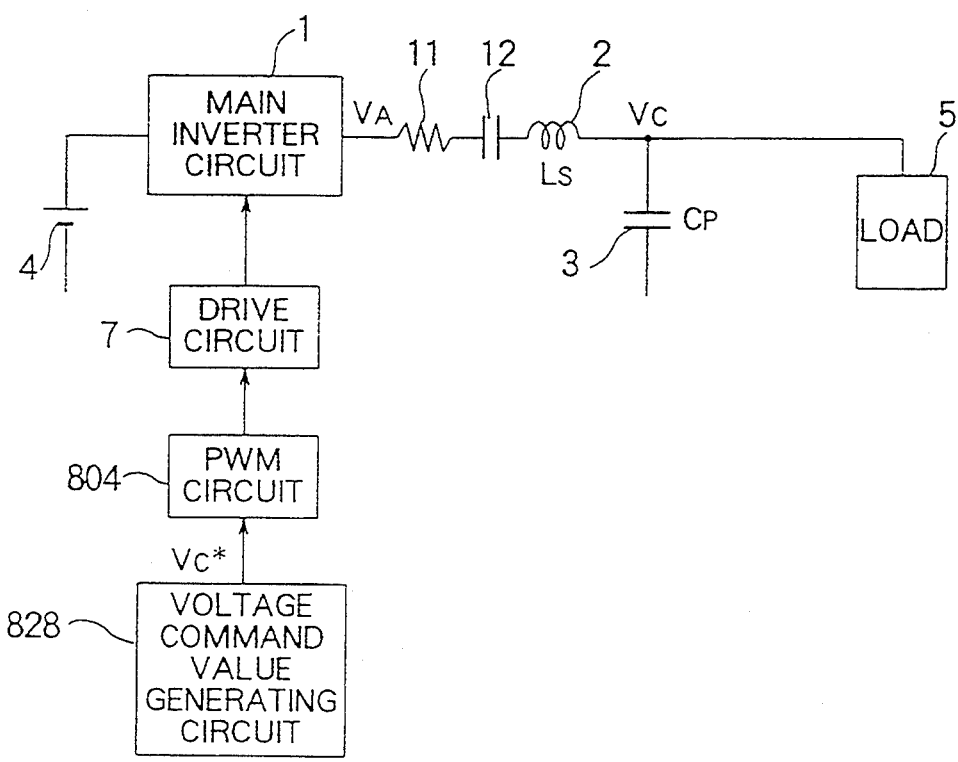
FIG. 36 is a block diagram which illustrates the principle of the operation of the thirty-third embodiment.

Referring to FIG. 36, reference numeral 11 represents a virtual resistor and 12 represents a virtual capacitor.

The principle of the foregoing control will be concluded using FIG. 36 such that the AC sine-wave reference voltage $V_C^*$ transmitted from the voltage command value generating circuit 828 is supplied to the PWM circuit 804. The main inverter circuit 1 is, via the drive circuit 7, controlled so that a desired output is transmitted. The LC filter is, by the virtual resistor 11, made to be a filter which has a high damping coefficient and which cannot therefore easily be resonated so that the ripple voltage generated due to the PWM is removed and sine wave voltage is obtained in the capacitor 3. Even if the load 5 has been changed, the series resonance of the reactor 2 and the virtual capacitor 12 makes the output impedance at the output voltage frequency to be substantially zero. Therefore, a desired AC voltage can be obtained without effect no feedback control.

Thirty-Fourth Embodiment

Figure 37:
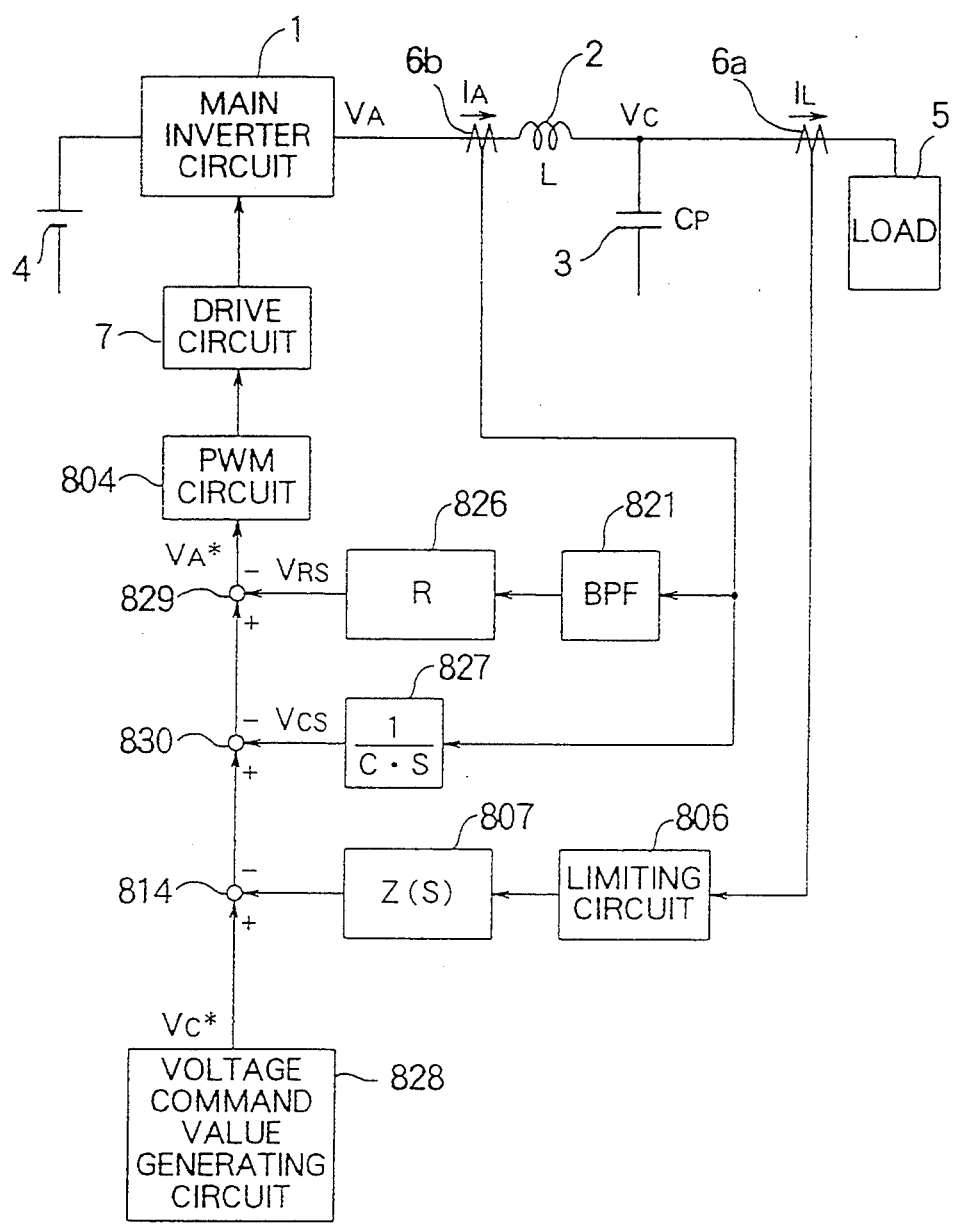
FIGS. 37 to 55 are block diagrams which respectively illustrate thirty-fourth to fifty-second embodiments.

FIG. 37 illustrates a thirty-fourth embodiment of the present invention. Referring to FIG. 37, elements corresponding to those according to the thirty-third embodiment shown in FIG. 35 are given the same reference numerals and their detailed descriptions are omitted here. The difference from the foregoing thirty-third embodiment lies in that the current detector 6a, the limiting circuit 806, the transfer function 807 and the adder/subtracter 814 similar to the second embodiment are additionally disposed. The residual structures are the same as those of the thirty-third embodiment.

Referring to FIG. 37, the load current $I_L$ is detected by the current detector 702 and received by the limiting circuit 806. The limiting circuit 806 transmits a value obtained by subtracting a predetermined value from the input signal if the input signal is larger than a predetermined positive value or smaller than a predetermined negative value. The output from the limiting circuit 806 is passed through the transfer function 807 and subtracted, in the adder/subtracter 814, from the output voltage command $V_C^*$ of the voltage command value generating circuit 828. The output $V_{RS}$ from the proportional circuit 826 and the output $V_{CS}$ from the integrator 827 are further subtracted from the output from the adder/subtracter 814 so that the PWM voltage command $V_A^*$ is obtained. Therefore, if the load current $I_L$ is made to be larger than the predetermined value set to the limiting circuit 806, the PWM voltage command $V_A^*$ is dropped. Also the inverter voltage $V_A$ is dropped by way of the PWM circuit 804 and the drive circuit 7.

If the inverter voltage $V_A$ has been dropped, also the load current $I_L$ is decreased. Therefore, the output line can be protected from excess currents. That is, when the main inverter circuit 1 is viewed from the output side thereof, the transfer function 807 is operated as to be a virtual output impedance to drop the inverter voltage $V_A$ only when the load current $I_L$ larger than the predetermined value has been passed. Therefore, if the absolute value $|Z(S)|$ of the transfer function 807 is $\infty$, an excess of the load current $I_L$ over the predetermined value due to occurrence of short circuit of a load or the like causes an output impedance $\infty$ to appear because of the response of the PWM circuit 804. As a result, the inverter voltage $V_A$ is dropped until the load current $I_L$ is made to be smaller than the predetermined value. Since $|Z(S)|$ is finite in actual, the load current $I_L$ becomes a value somewhat larger than the predetermined value. However, no practical problem arises if the value of the $|Z(S)|$ is made to be a sufficiently large value.

The transfer function 807 may be an arbitrary function if it has an adequate impedance value. If the circuit is a proportional circuit for example, it serves as a resistor. If the same is a differentiating circuit, the transfer function 807 serves as a reactor. If the same is an integrating circuit, it serves as a capacitor. If the same is a combination circuit of proportional, integrating and differentiating circuits, it serves as a circuit formed by combining a resistor, a capacitor and a reactor. Further, a circuit containing a non-linear element may be employed if it has an adequate impedance which limits the load current $I_L$.

Since the thirty-fourth embodiment is arranged in such a manner that the LC filter is, by the virtual resistor, made to be a filter which has a high damping coefficient and which cannot therefore easily be resonated and the output impedance at the output voltage frequency is substantially zero similarly to the thirty-third embodiment, a desired AC voltage can be obtained without effecting no feedback control. In addition, if the load current IL exceeds the predetermined value set to the limiting circuit 806, the PWM voltage command $V_A^*$ is dropped. Therefore, excess flow the load current $I_L$ over the predetermined value set to the control circuit can be instantaneously be prevented due to the response of the PWM circuit 804.

Thirty-Fifth Embodiment

Figure 38:
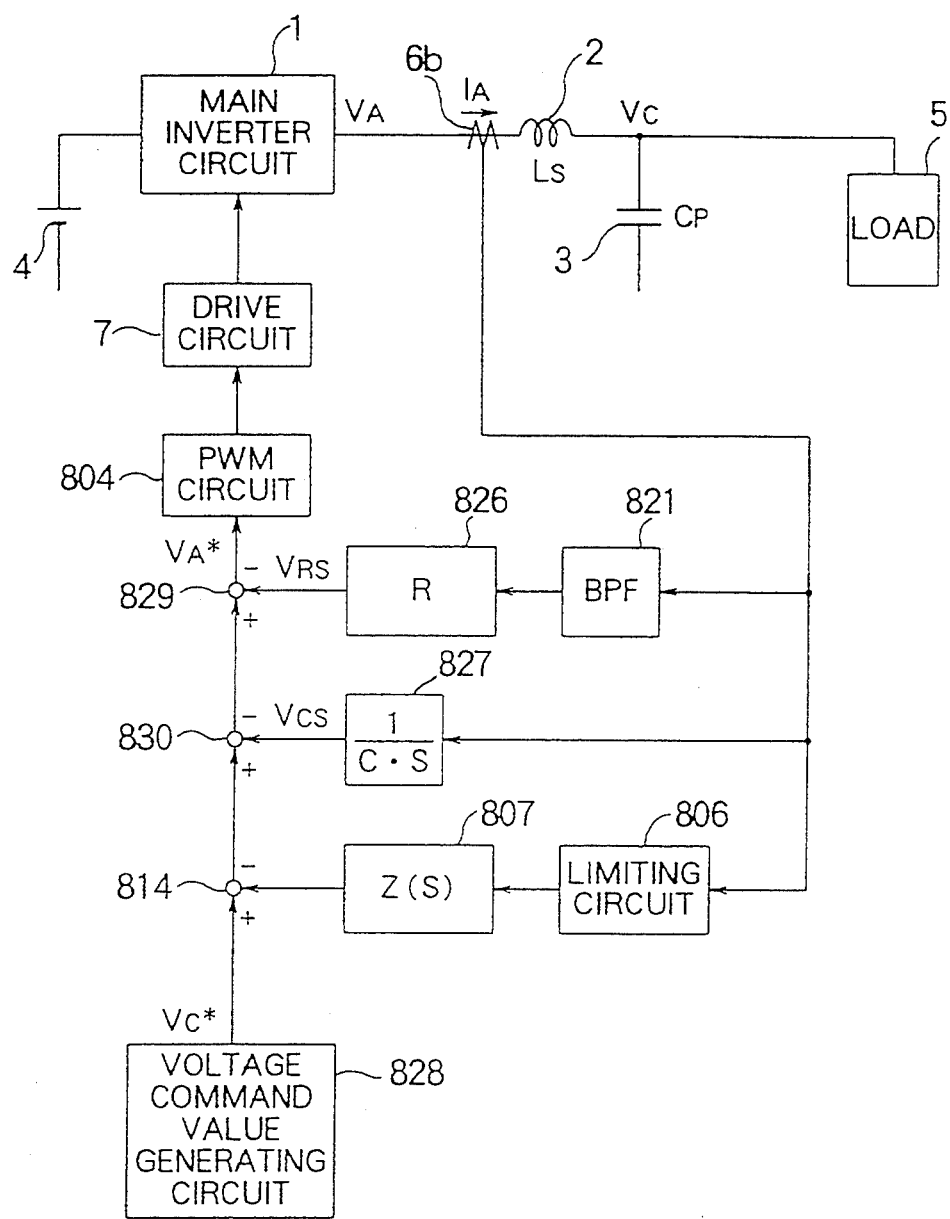

FIG. 38 illustrates a thirty-fifth embodiment of the present invention. Referring to FIG. 38, elements corresponding to those according to the thirty-third embodiment shown in FIG. 35 are given the same reference numerals and their detailed descriptions are omitted here. The difference from the foregoing thirty-third embodiment lies in that the limiting circuit 806 for inputting the inverter current $I_A$, the transfer function 807 and the adder/subtracter 814 are additionally disposed and the inverter current $I_A$ is used to change the PWM voltage command $V_A{}^*$ to form a virtual output impedance. The residual structures are the same as those of the thirty-third embodiment.

Referring to FIG. 38, the inverter current $I_A$ is detected by the current detector 701 and supplied to the limiting circuit 806. The output from the limiting circuit 806 is passed through the transfer function 807 and then subtracted, in the adder/subtracter 814, from the output voltage command $V_C{}^*$ of the voltage command value generating circuit 828. The output $V_{RS}$ from the proportional circuit 826 and the output $V_{CS}$ from the integrator 827 are further subtracted from the output from the adder/subtracter 814 so that the PWM voltage command $V_A{}^*$ is obtained. Therefore, if the inverter current $I_A$ is made to be larger than the predetermined value set to the limiting circuit 806, the PWM voltage command $V_A{}^*$ is dropped. Also the inverter voltage $V_A$ is dropped by way of the PWM circuit 804 and the drive circuit 7. If the inverter voltage $V_A$ has been dropped, also the inverter current $I_A$ is decreased so that the converter is protected from excess currents.

Since the thirty-fifth embodiment is arranged in such a manner that the LC filter is, by the virtual resistor, made to be a filter which has a high damping coefficient and which cannot therefore easily be resonated and the output impedance at the output voltage frequency is substantially zero similarly to the thirty-third embodiment, a desired AC voltage can be obtained without effecting no feedback control. In addition, if the inverter current $I_A$ exceeds the predetermined value set to the limiting circuit 806, the PWM voltage command $V_A{}^*$ is dropped. Therefore, excess flow the inverter current $I_A$ over the predetermined value set to the control circuit 806 can be instantaneously be prevented due to the response of the PWM circuit 804.

Thirty-Sixth Embodiment

Figure 39:
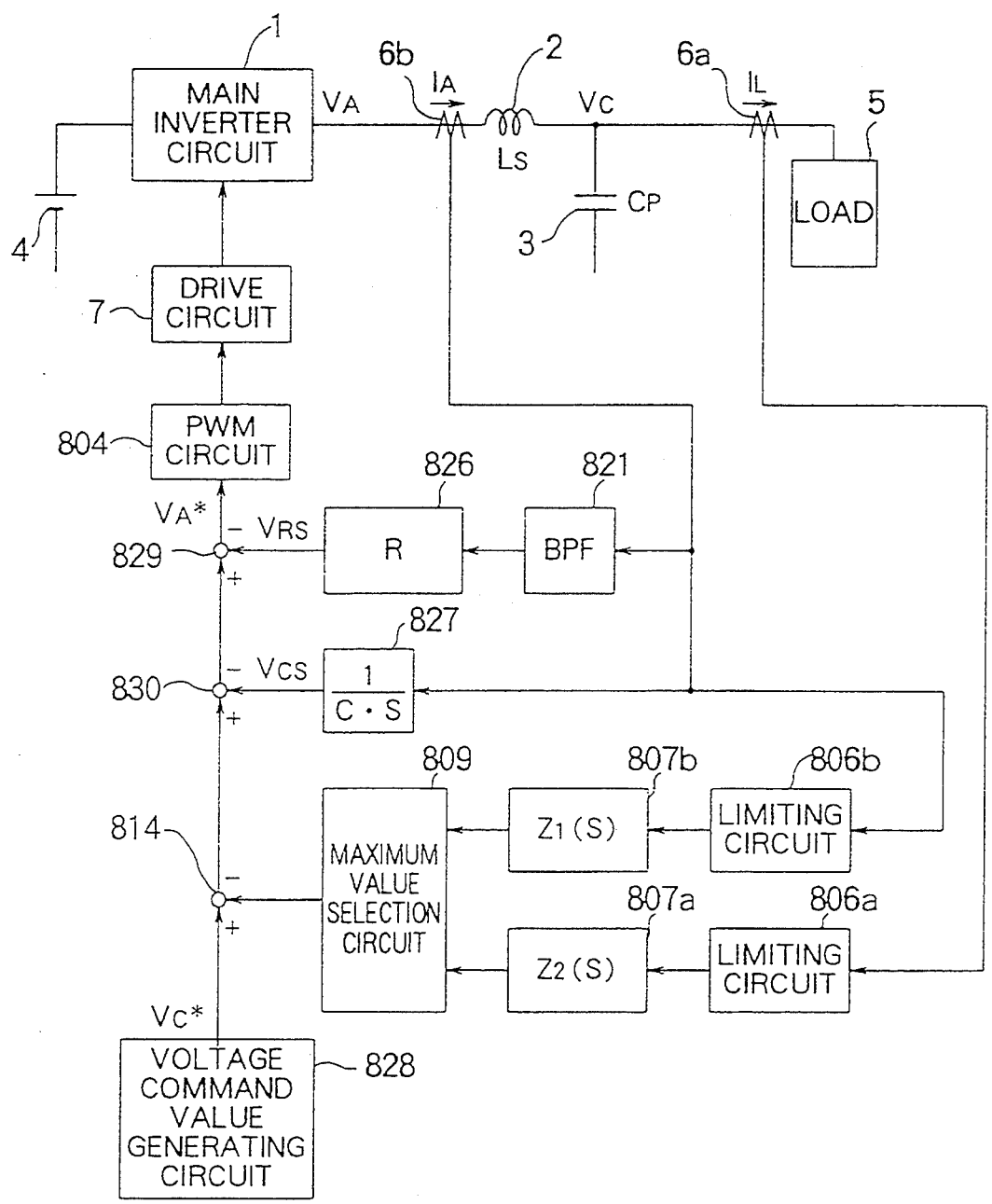

FIG. 39 illustrates a thirty-sixth embodiment of the present invention. Referring to FIG. 39, elements corresponding to those according to the thirty-fourth embodiment and the thirty-fifth embodiment respectively shown in FIGS. 37 and 38 are given the same reference numerals and their detailed descriptions are omitted here. As contrasted with the thirty-fourth embodiment arranged in such a manner that only the load current $I_L$ is limited and the thirty-fifth embodiment arranged in such a manner that only the inverter current $I_A$ is limited, this embodiment is arranged in such a manner that the maximum value selection circuit 809 selects the signal for changing the PWM voltage command $V_A{}^*$ using the load current $I_L$ Or the signal for changing the PWM voltage command $V_A{}^*$ using the inverter current IA to form a virtual output impedance. The residual structures are the same as those of the thirty-fourth embodiment or the thirty-fifth embodiment. Reference numerals 806a and 806b represent limiting circuits, 807a and 807b represent transfer functions and 814 represents an adder/subtracter. The foregoing elements are formed similarly to the eighth embodiment shown in FIG. 10.

Referring to FIG. 39, the load current $I_L$ is detected by the detector 6a. The limiting circuit 806a has a maximum output current set thereto so that the output from the limiting circuit 806a is zero if the load current $I_L$ is smaller than the predetermined value. If the load current $I_L$ is larger than the predetermined value, a value obtained by subtracting the predetermined value from the load current $I_L$ is transmitted from the limiting circuit 806a. The output from the limiting circuit 806a is passed through the transfer function 807b and supplied to the maximum value selection circuit 809.

On the other hand, the inverter current $I_A$ is detected by the current detector 6b. The limiting circuit 806b has a maximum inverter current set thereto. If the inverter current $I_A$ is smaller than the predetermined value, the output from the limiting circuit 806b is made to be zero. If the inverter current $I_A$ is larger than the predetermined value, a value obtained by subtracting the predetermined value from the inverter current $I_A$ is transmitted from the limiting circuit 806b. The output from the limiting circuit 806b is passed through the transfer function 807b and received by the maximum value selection circuit 809.

The maximum value selection circuit 809 selects and transmits a signal having a larger absolute value. The output from the maximum value selection circuit 809 is, in the adder/subtracter 814, subtracted from the output voltage command $V_C{}^*$ of the voltage command value generating circuit 828. The output $V_{RS}$ from the proportional circuit 826 and the output $V_{CS}$ from the integrator 827 are further subtracted from the output from the adder/subtracter 814 so that the PWM voltage command $V_A{}^*$ is obtained. Therefore, if the load current $I_L$ is made to be larger than the predetermined value set to the limiting circuit 806a, or if the inverter current $I_A$ is larger than the predetermined value set to the limiting circuit 806b, the PWM voltage command $V_A{}^*$ is dropped. Also the inverter voltage $V_A$ is dropped by way of the PWM circuit 804 and the drive circuit 7. If the inverter voltage $V_A$ has been dropped, also the load current $I_L$ and the inverter current $I_A$ are decreased so that the output line and the converter are protected to excess currents.

Since the thirty-sixth embodiment is arranged in such a manner that the LC filter is, by the virtual resistor, made to be a filter which has a high damping coefficient and which cannot therefore easily be resonated and the output impedance at the output voltage frequency is substantially zero similarly to the thirty-third embodiment, a desired AC voltage can be obtained without effecting no feedback control. In addition, if the load current $I_L$ has exceeded the predetermined value set to the limiting circuit 806a or if the inverter current $I_A$ exceeds the predetermined value set to the limiting circuit 806b, the PWM voltage command $V_A{}^*$ is dropped. Therefore, excess flows the load current $I_L$ and the inverter current $I_A$ over the predetermined values respectively set to the control circuit 806a and 806b can be instantaneously be prevented due to the response of the PWM circuit 804.

If the predetermined value to be set to the limiting circuit 806a is so determined as to be capable of protecting the output line and if the predetermined value to be set to the limiting circuit 806b is so determined as to be capable of protecting the converter, the load current $I_L$ can be limited to a current range in which the output line can be protected and the inverter current $I_A$ can be limited to a current range in which the converter can be protected.

Thirty-Seventh Embodiment

Figure 40:
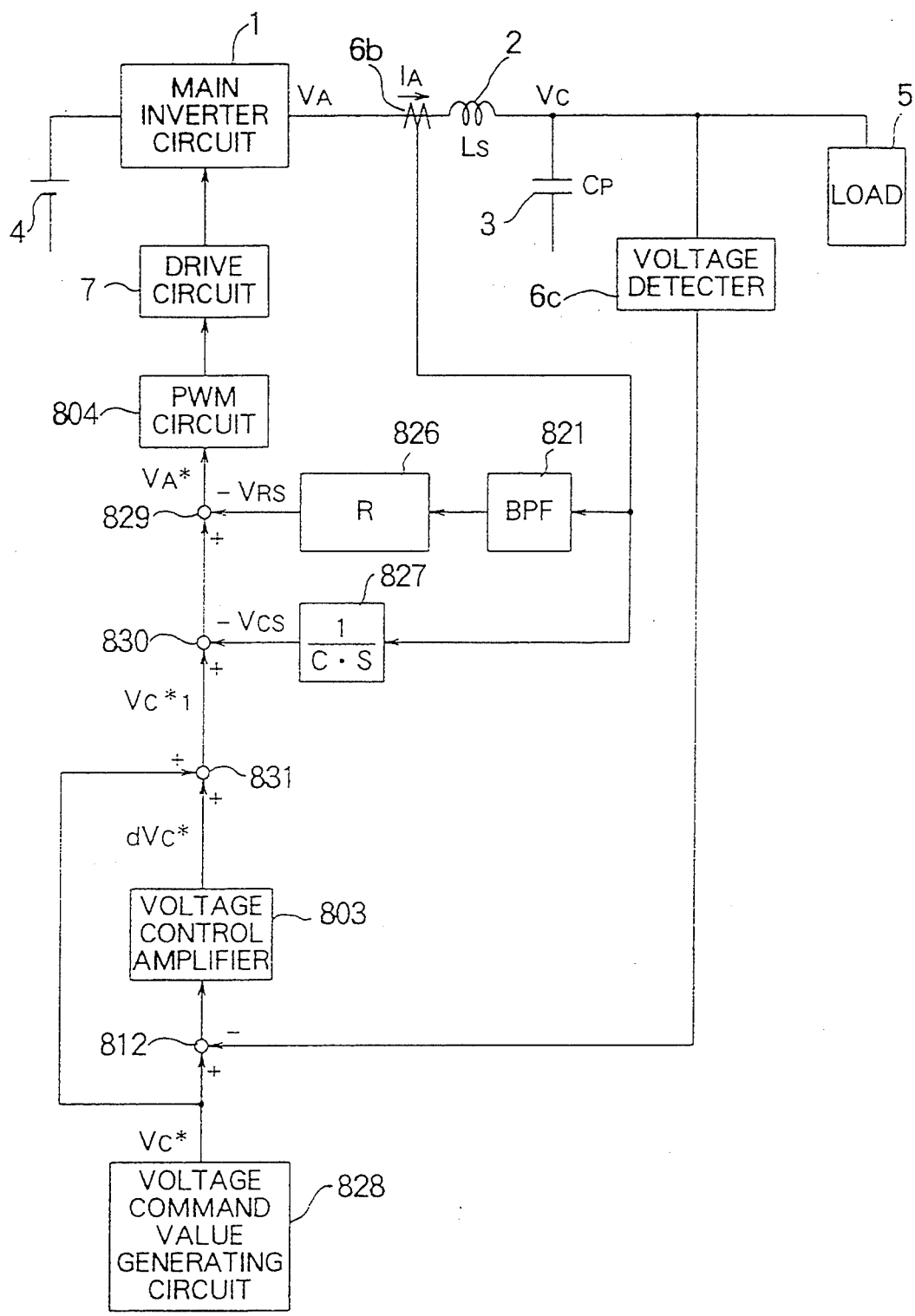

FIG. 40 illustrates a thirty-seventh embodiment of the present invention. Referring to FIG. 40, elements corresponding to those according to the thirty-third embodiment shown in FIG. 35 are given the same reference numerals and their detailed descriptions are omitted here. The difference from the foregoing thirty-third embodiment lies in that the voltage detector 6c, the voltage control amplifier 803, the adder/subtracter 812 and an adder 831 are additionally disposed. The residual structures are the same as those of the tenth embodiment.

Referring to FIG. 40, the output voltage $V_C$ is detected by the voltage detector 6c, and the deviation between the output voltage command $V_C^*$ of the voltage command value generating circuit 828 and output voltage $V_C$ is calculated by the adder/subtracter 812. The voltage control amplifier 803 is operated to make the foregoing voltage deviation to be zero. The voltage control amplifier 803 transmits correction $dV_C^*$ of the output voltage command $V_C^*$ and the correction $dV_C^*$ and the output voltage command $V_C^*$ are added so that output voltage command $V_{C1}^*$ is obtained.

The output $V_{RS}$ from the proportional circuit 826 and the output $V_{CS}$ from the integrator 827 are further subtracted from the output from the adder 831 so that the PWM voltage command $V_A^*$ is obtained. Therefore, if a slight deviation of the transfer function is present from the PWM voltage command $V_A^*$ to the inverter voltage VA though it is substantially 1, the voltage control amplifier 803 transmits the correction $dV_C^*$ of the output voltage command $V_C^*$ with which the voltage deviation is made to be zero.

Since the thirty-seventh embodiment is arranged in such a manner that the LC filter is, by the virtual resistor, made to be a filter which has a high damping coefficient and which cannot therefore easily be resonated, the output impedance at the output voltage frequency is substantially zero similarly to the thirty-third embodiment and the voltage control amplifier 803 for transmitting the correction of the output voltage command is disposed, the output voltage can precisely be controlled.

Thirty-Eighth Embodiment

Figure 41:
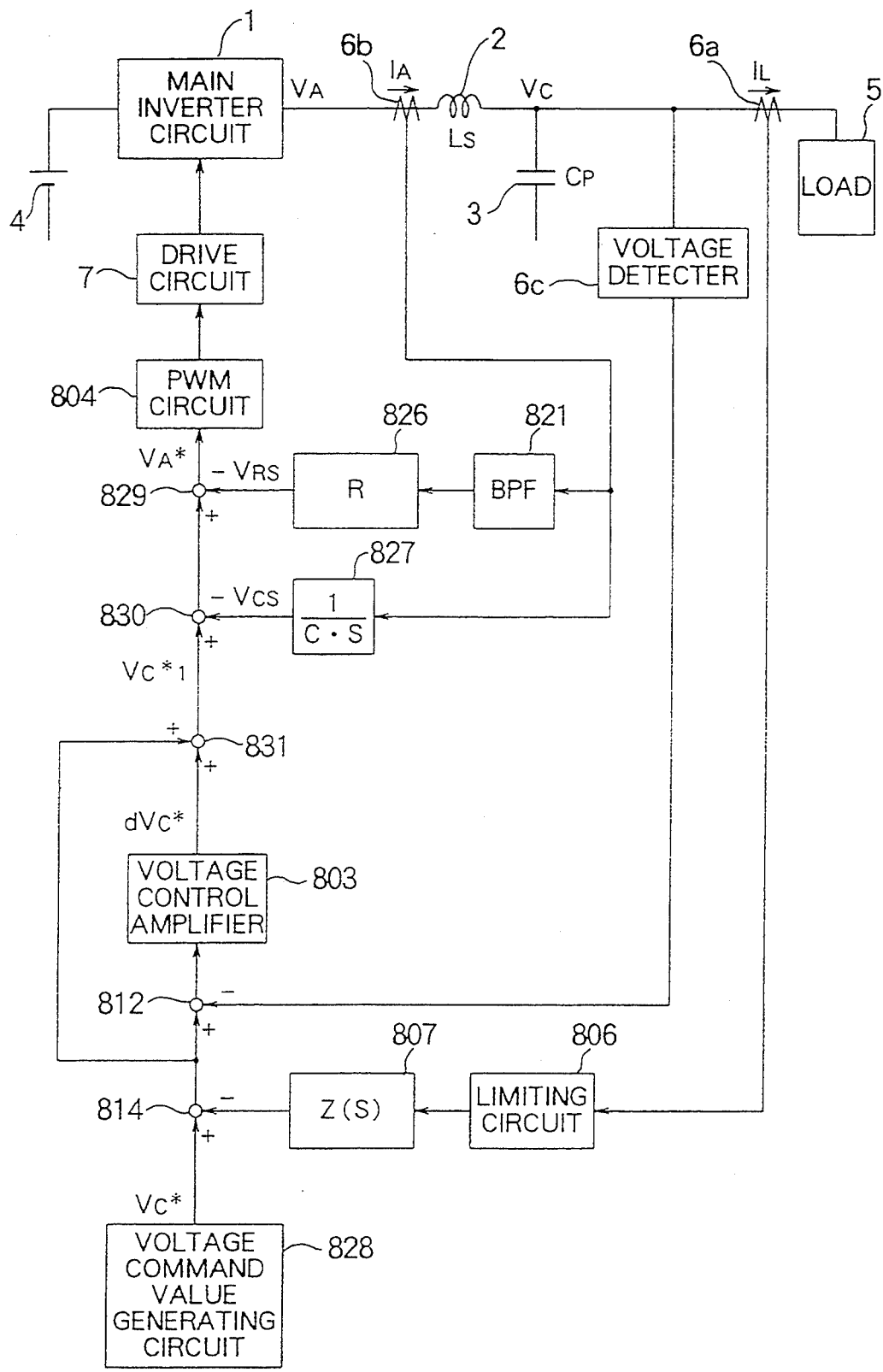

FIG. 41 illustrates a thirty-eighth embodiment of the present invention. Referring to FIG. 41, elements corresponding to those according to the thirty-seventh embodiment shown in FIG. 40 are given the same reference numerals and their detailed descriptions are omitted here. The difference from the foregoing thirty-seventh embodiment lies in that the current detector 6a, the limiting circuit 806, the transfer function 807 and the adder/subtracter 814 are added and the output voltage command $V_C^*$ is changed with the load current $I_L$ to form a virtual output impedance. The residual structures are the same as those of the thirty-seventh embodiment.

Referring to FIG. 41, the load current $I_L$ is detected by the current detector 6a and received by the limiting circuit 806. The output from the limiting circuit 806 is passed through the transfer function 807 and, in the adder/subtracter 814, subtracted from the output voltage command $V_C^*$ of the voltage command value generating circuit 828. In order to make the output from the adder/subtracter 814 and the output voltage command $V_C$ coincide with each other, the voltage control amplifier 803 is operated. Therefore, if the load current $I_L$ exceeds the predetermined value set to the limiting circuit L806, the output voltage command $V_C^*$ is dropped. The response of the voltage control system causes the output voltage $V_C$ to be also dropped. If the output voltage $V_C$ is dropped, also the load current $I_L$ is decreased. Therefore, the output line can be protected from excess currents.

Since the thirty-eighth embodiment is arranged in such a manner that the LC filter is, by the virtual resistor, made to be a filter which has a high damping coefficient and which cannot therefore easily be resonated, the output impedance at the output voltage frequency is substantially zero similarly to the thirty-seventh embodiment and the voltage control amplifier 803 for transmitting the correction of the output voltage command is disposed, the output voltage can precisely be controlled. Since the output voltage command $V_C^*$ is dropped if the load current $I_L$ has exceeded the predetermined value set to the limiting circuit 806, the excess flow of the load current $I_L$ over the predetermined value set to the limiting circuit 806 can be controlled at high speed due to the response of the voltage control system.

Thirty-Ninth Embodiment

Figure 42:
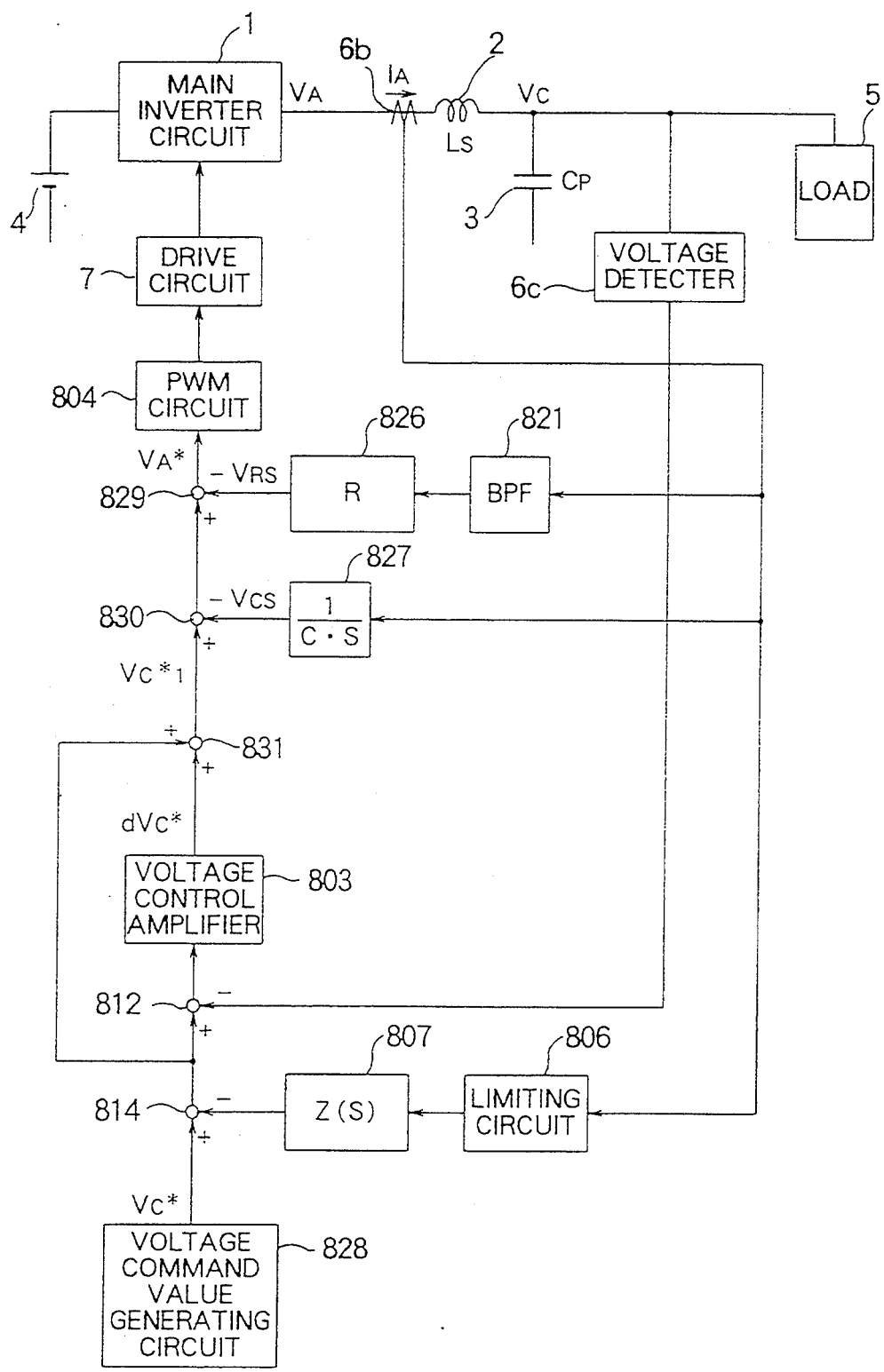

FIG. 42 illustrates a thirty-ninth embodiment of the present invention. Referring to FIG. 42, elements corresponding to those according to the thirty-seventh embodiment shown in FIG. 40 are given the same reference numerals and their detailed descriptions are omitted here. The difference from the foregoing thirty-seventh embodiment lies in that the limiting circuit 806, the transfer function 807 and the adder/subtracter 814 are added and the output voltage command $V_C^*$ is changed with the inverter current $I_A$ to form a virtual output impedance. The residual structures are the same as those of the thirty-seventh embodiment.

Referring to FIG. 42, the inverter current $I_A$ is detected by the current detector 6b and received by the limiting circuit 806. The output from the limiting circuit 806 is passed through the transfer function 807 and, in an adder/subtracter 906, subtracted from the output voltage command $V_C^*$ of the voltage command value generating circuit 828. In order to make the output from the adder/subtracter 906 and the output voltage command $V_C$ coincide with each other, the voltage control amplifier 803 is operated. Therefore, if the inverter current $I_A$ exceeds the predetermined value set to the limiting circuit 806, the output voltage command $V_C^*$ is dropped. The response of the voltage control system causes the output voltage $V_C$ to be also dropped. If the output voltage $V_C$ is dropped, also the inverter current $I_A$ is decreased. Therefore, the converter can be protected from excess currents.

Since the thirty-ninth embodiment is arranged in such a manner that the LC filter is, by the virtual resistor, made to be a filter which has a high damping coefficient and which cannot therefore easily be resonated, the output impedance at the output voltage frequency is substantially zero similarly to the thirty-seventh embodiment and the voltage control amplifier 803 for transmitting the correction of the output voltage command is disposed, the output voltage can precisely be controlled. Since the output voltage command $V_C^*$ is dropped if the inverter current $I_A$ has exceeded the predetermined value set to the limiting circuit 806, the excess flow of the inverter current $I_A$ over the predetermined value set to the limiting circuit 806 can be controlled at high speed due to the response of the voltage control system.

Fortieth Embodiment

Figure 43:
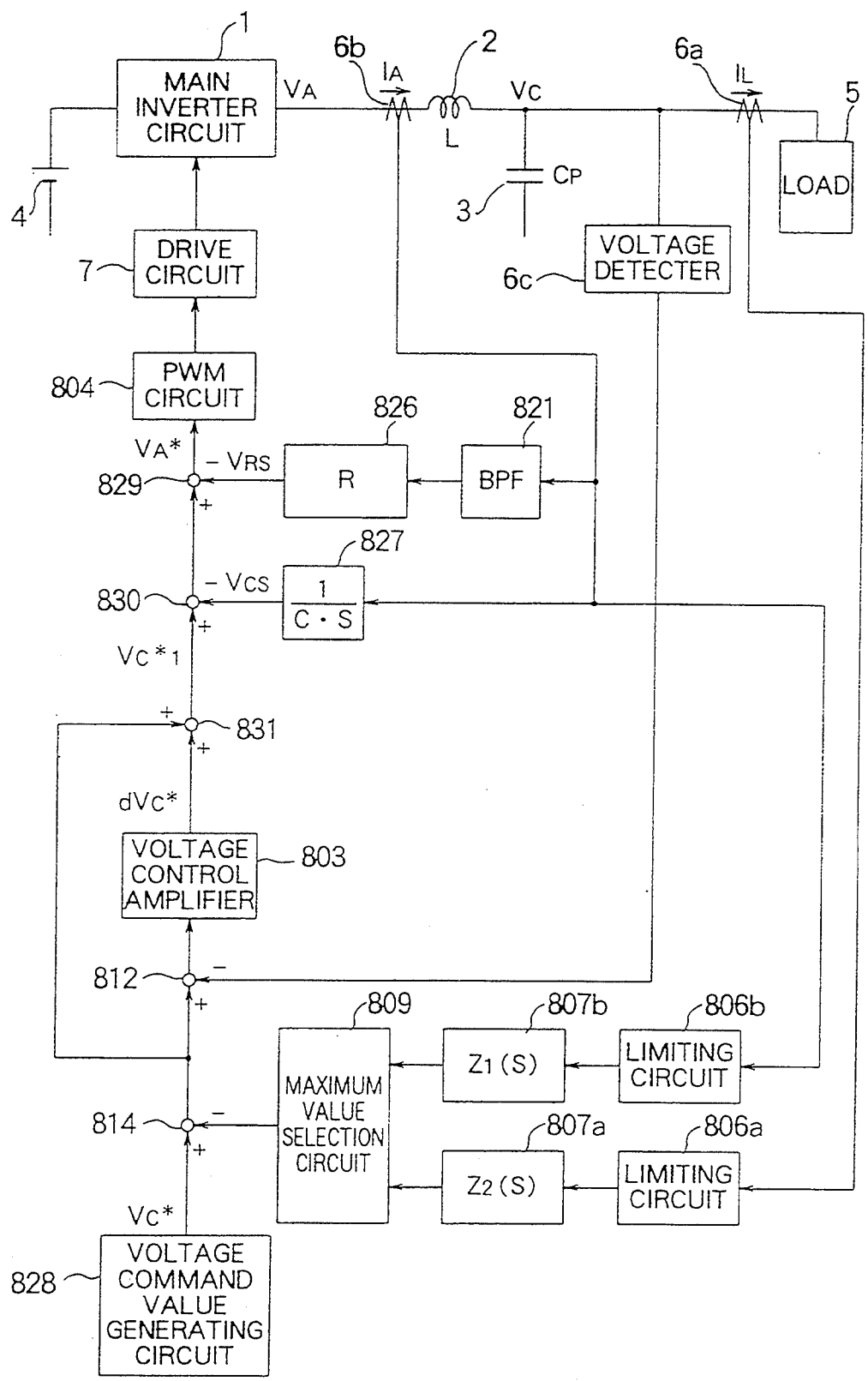

FIG. 43 illustrates a fortieth embodiment of the present invention. Referring to FIG. 43, elements corresponding to those according to the thirty-eighth embodiment and the thirty-ninth embodiment respectively shown in FIGS. 41 and 42 are given the same reference numerals and their detailed descriptions are omitted here. As contrasted with the thirty-eighth embodiment arranged in such a manner that only the load current $I_L$ is limited and the thirty-ninth embodiment arranged in such a manner that only the inverter current $I_A$ is limited, this embodiment is arranged in such a manner that the maximum value selection circuit 809 selects the signal for changing the output voltage command $V_C^*$ using the load current $I_L$ or the signal for changing output voltage command $V_C^*$ using the inverter current $I_A$ to form a virtual output impedance. The residual structures are the same as those of the thirty-eighth embodiment or the thirty-ninth embodiment.

Referring to FIG. 43, the load current $I_L$ is detected by the detector 6a. The limiting circuit 806b has a maximum output current set thereto so that the output from the limiting circuit 806b is zero if the load current $I_L$ is smaller than the predetermined value. If the load current $I_L$ is larger than the predetermined value, a value obtained by subtracting the predetermined value from the load current $I_L$ is transmitted from the limiting circuit 806b. The output from the limiting circuit 806b is passed through the transfer function 807b and supplied to the maximum value selection circuit 809.

On the other hand, the inverter current $I_A$ is detected by the current detector 6b. The limiting circuit 806a has a maximum inverter current set thereto. If the inverter current $I_A$ is smaller than the predetermined value, the output from the limiting circuit 806a is made to be zero. If the inverter current $I_A$ is larger than the predetermined value, a value obtained by subtracting the predetermined value from the inverter current $I_A$ is transmitted from the limiting circuit 806a. The output from the limiting circuit 806a is passed through the transfer function 807b and received by the maximum value selection circuit 809.

The maximum value selection circuit 809 selects and transmits a signal having a larger absolute value. The output from the maximum value selection circuit 809 is, in the adder/subtracter 814, subtracted from the output voltage command $V_C^*$ of the voltage command value generating circuit 828. Since the voltage control amplifier 803 is operated in such a manner that the output from the adder/subtracter 814 and the output voltage $V_C$ coincide with each other, the output voltage command $V_C^*$ is dropped if the load current $I_L$ is larger than the predetermined value set to the limiting circuit 806a or the inverter current $I_A$ is larger than a predetermined value set to the limiting circuit 806b. The response of the voltage control system causes the output voltage $V_C$ to also be dropped. If the output voltage VC has been dropped, the load current $I_L$ and the inverter current $I_A$ are decreased so that the output line and the converter are protected from excess currents.

Since the fortieth embodiment is arranged in such a manner that the LC filter is, by the virtual resistor, made to be a filter which has a high damping coefficient and which cannot therefore easily be resonated, the output impedance at the output voltage frequency is substantially zero similarly to the thirty-seventh embodiment and the voltage control amplifier 803 for transmitting the correction of the output voltage command is disposed, the output voltage can precisely be controlled. Since the output voltage command $V_C^*$ is dropped if the load current $I_L$ has exceeded the predetermined value set to the limiting circuit 806a or if the inverter current $I_A$ has exceeded the predetermined value set to the limiting circuit 806b, the excess flows of the load current $I_L$ and the inverter current $I_A$ over the predetermined values set to the limiting circuits 806a and 806b can be controlled at high speed due to the response of the voltage control system.

If the predetermined value to be set to the limiting circuit 807b is so determined as to be capable of protecting the output line and if the predetermined value to be set to the limiting circuit 807b is so determined as to be capable of protecting the converter, the load current $I_L$ can be limited to a current range in which the output line can be protected and the inverter current $I_A$ can be limited to a current range in which the converter can be protected.

Forty-First Embodiment

Figure 44:
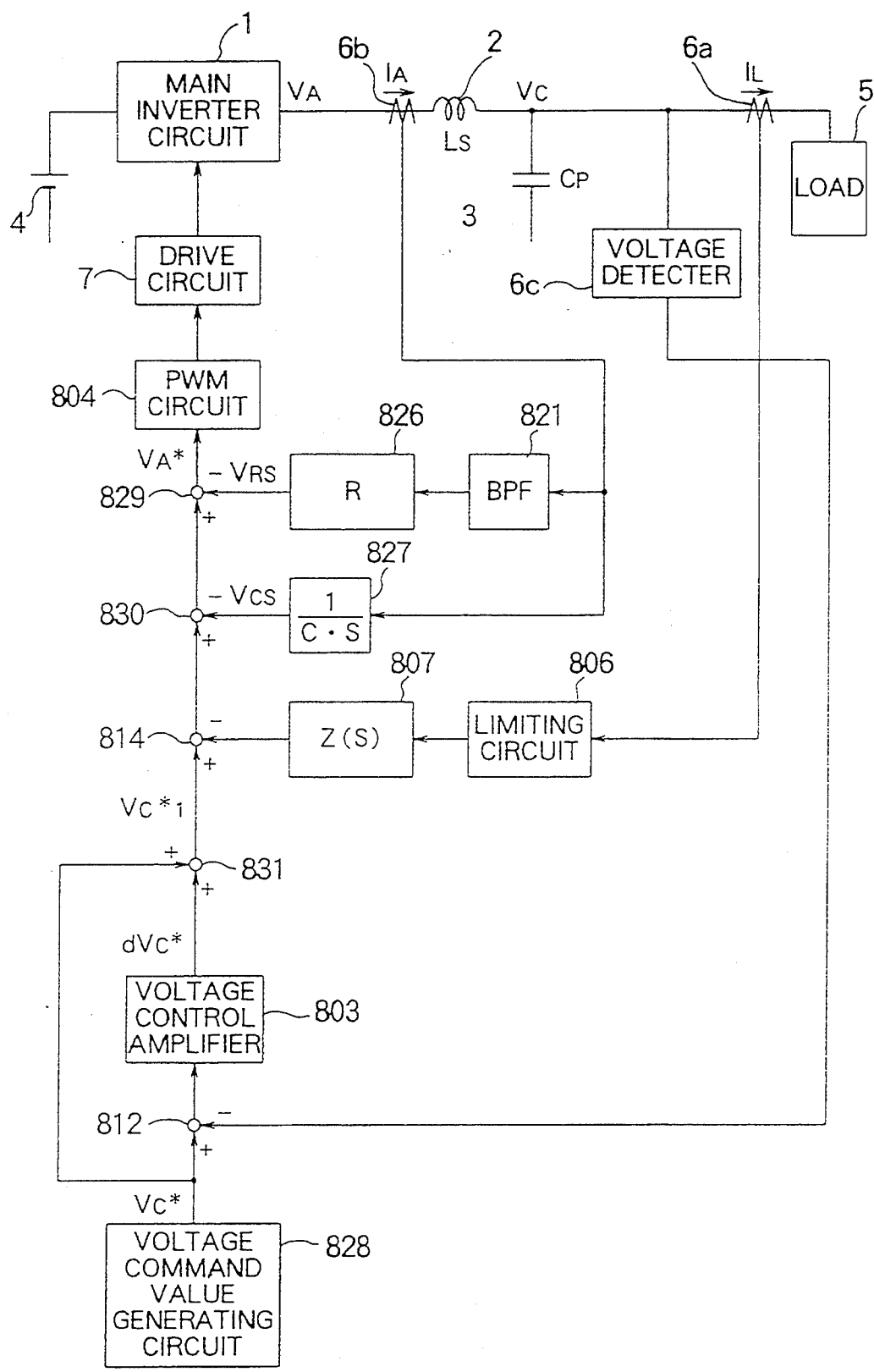

FIG. 44 illustrates a forty-first embodiment of the present invention. Referring to FIG. 44, elements corresponding to those according to the thirty-seventh embodiment shown in FIG. 40 are given the same reference numerals and their detailed descriptions are omitted here. The difference from the foregoing thirty-seventh embodiment lies in that the current detector 6a, the limiting circuit 806a, the transfer function 807 and the adder/subtracter 814 are added and the PWM voltage command $V_A^*$ is changed with the load current $I_L$ to form a virtual output impedance. The residual structures are the same as those of the thirty-seventh embodiment.

Referring to FIG. 44, the load current $I_L$ is detected by the current detector 6a and received by the limiting circuit 806. The output from the limiting circuit 806 is passed through the transfer function 807 and, in the adder/subtracter 814, subtracted from the output voltage command value $V_{C1}^*$ corrected by the voltage control amplifier 803. The output $V_{RS}$ from the proportional circuit 826 and the output $V_{CS}$ from the integrator 827 are further subtracted from the output from the adder/subtracter 814 so that the PWM voltage command $V_A^*$ is obtained. Therefore, if the load current $I_L$ exceeds the predetermined value set to the limiting circuit 806, the PWM voltage command $V_A^*$ is dropped. Also the inverter voltage $V_A$ is dropped by way of the PWM circuit 804 and the drive circuit 7. If the inverter voltage $V_A$ has been dropped, also the load current $I_L$ is decreased. Therefore, the output line can be protected from excess currents.

Since the forty-first embodiment is arranged in such a manner that the LC filter is, by the virtual resistor, made to be a filter which has a high damping coefficient and which cannot therefore easily be resonated, the output impedance at the output voltage frequency is substantially zero similarly to the thirty-seventh embodiment and the voltage control amplifier 803 for transmitting the correction of the output voltage command is disposed, the output voltage can precisely be controlled. Since the PWM voltage command $V_A^*$ is dropped if the load current $I_L$ has exceeded the predetermined value set to the limiting circuit 806. The excess flow of the load current $I_L$ over the predetermined value set to the limiting circuit 806 can instantaneously be prevented due to the response of the PWM circuit 804.

Forty-Second Embodiment

Figure 45:
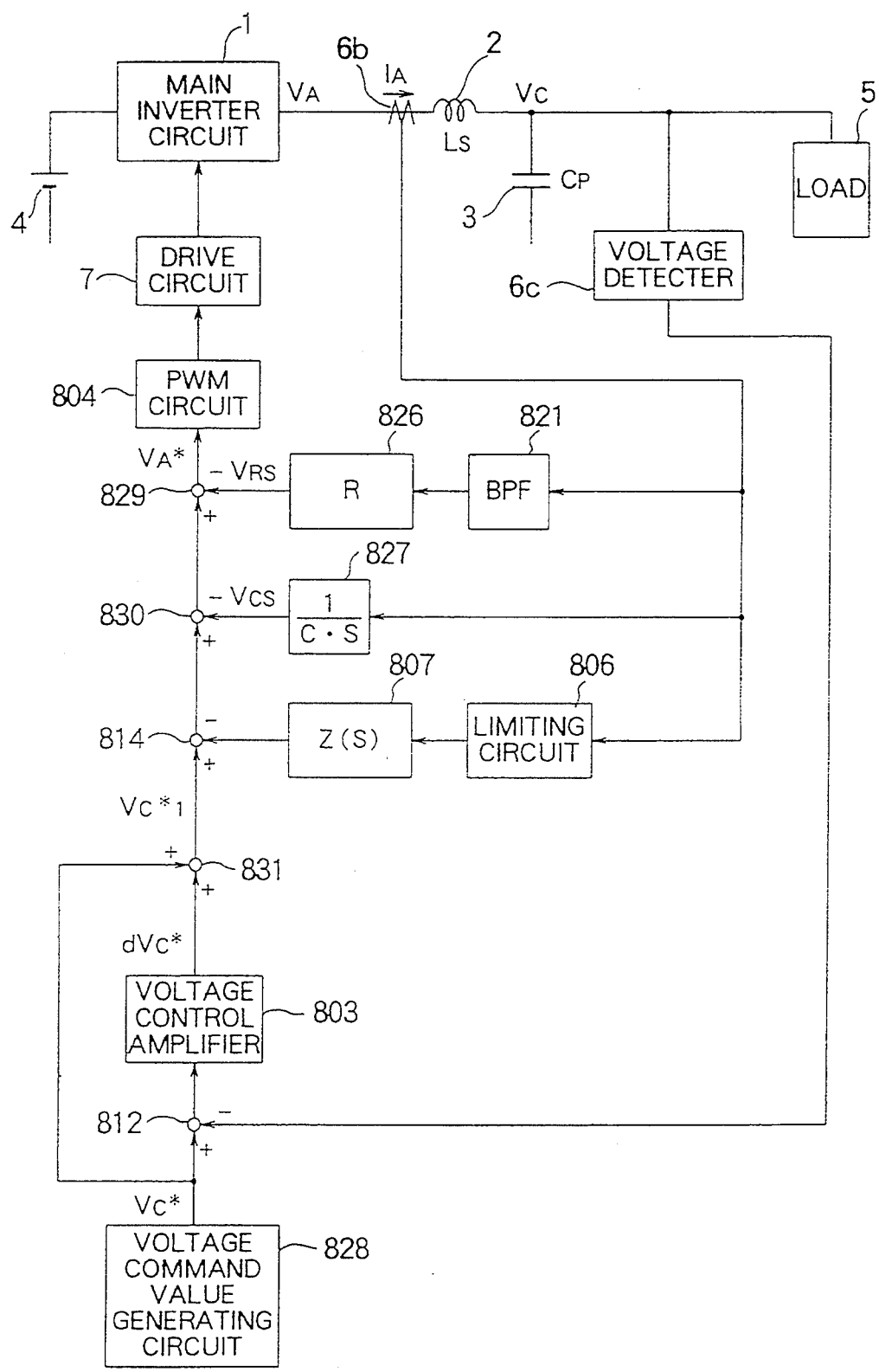

FIG. 45 illustrates a forty-second embodiment of the present invention. Referring to FIG. 45, elements corresponding to those according to the thirty-seventh embodiment shown in FIG. 40 are given the same reference numerals and their detailed descriptions are omitted here. The difference from the foregoing thirty-seventh embodiment lies in that the limiting circuit 806, the transfer function 807 and the adder/subtracter 814 are added and the PWM voltage command $V_A^*$ is changed with the inverter current $I_A$ to form a virtual output impedance. The residual structures are the same as those of the thirty-seventh embodiment.

Referring to FIG. 45, the inverter current $I_A$ is detected by the current detector 6b and received by the limiting circuit 806. The output from the limiting circuit 806 is passed through the transfer function 807 and, in the adder/subtracter 814, subtracted from the output voltage command value $V_{C1}^*$ corrected by the voltage control amplifier 803. The output $V_{RS}$ from the proportional circuit 826 and the output $V_{CS}$ from the integrator 827 are further subtracted from the output from the adder/subtracter 814 so that the PWM voltage command $V_A^*$ is obtained. Therefore, if the inverter current $I_A$ exceeds the predetermined value set to the limiting circuit 806, the PWM voltage command $V_A^*$ is dropped. Also the inverter voltage $V_A$ is dropped by way of the PWM circuit 804 and the drive circuit 7. If the inverter voltage $V_A$ has been dropped, also the inverter current $I_A$ is decreased. Therefore, the converter can be protected from excess currents.

Since the forty-second embodiment is arranged in such a manner that the LC filter is, by the virtual resistor, made to be a filter which has a high damping coefficient and which cannot therefore easily be resonated, the output impedance at the output voltage frequency is substantially zero similarly to the thirty-seventh embodiment and the voltage control amplifier 803 for transmitting the correction of the output voltage command is disposed, the output voltage can precisely be controlled. Since the PWM voltage command $V_A^*$ is dropped if the inverter current $I_A$ has exceeded the predetermined value set to the limiting circuit 806. The excess flow of the inverter current $I_A$ over the predetermined value set to the limiting circuit 806 can instantaneously be prevented due to the response of the PWM circuit 804.

Forty-Third Embodiment

Figure 46:
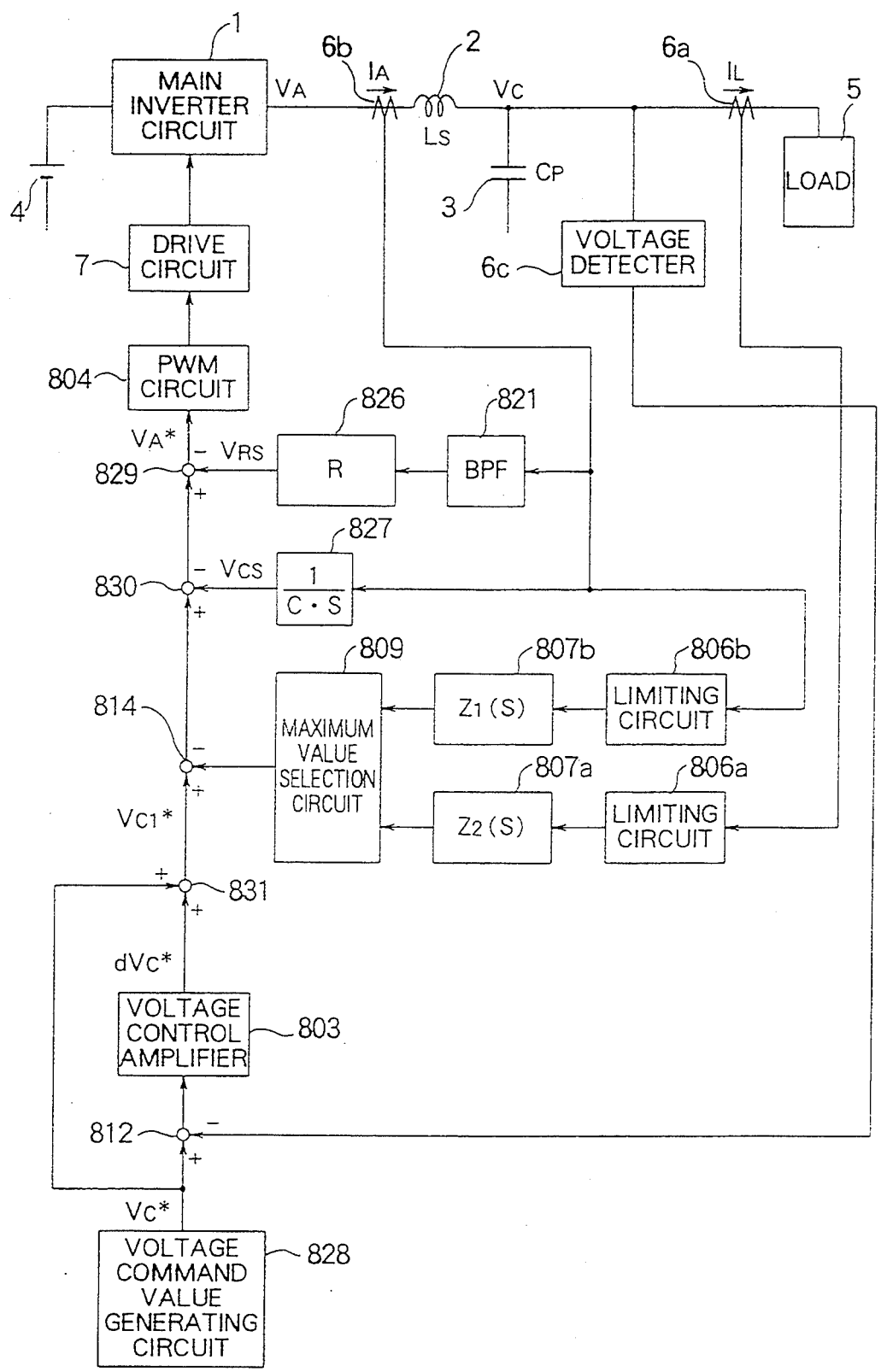

FIG. 46 illustrates a forty-third embodiment of the present invention. Referring to FIG. 46, elements corresponding to those according to the forty-first embodiment and the forty-second embodiment respectively shown in FIGS. 44 and 45 are given the same reference numerals and their detailed descriptions are omitted here. As contrasted with the forty-first embodiment arranged in such a manner that only the load current $I_L$ is limited and the forty-second embodiment arranged in such a manner that only the inverter current $I_A$ is limited, this embodiment is arranged in such a manner that the maximum value selection circuit 809 selects the signal for changing the PWM voltage command $V_A^*$ using the load current $I_L$ or the signal for changing the PWM voltage command $V_A^*$ using the inverter current $I_A$ to form a virtual output impedance. The residual structures are the same as those of the forty-first embodiment and the forty-second embodiment.

Referring to FIG. 46, the load current $I_L$ is detected by the detector 6a. The limiting circuit 806a has a maximum output current set thereto so that the output from the limiting circuit 806a is zero if the load current $I_L$ is smaller than the predetermined value. If the load current $I_L$ is larger than the predetermined value, a value obtained by subtracting the predetermined value from the load current $I_L$ is transmitted from the limiting circuit 806a. The output from the limiting circuit 806a is passed through the transfer function 807a and supplied to the maximum value selection circuit 809.

On the other hand, the inverter current $I_A$ is detected by the current detector 6b. The limiting circuit 806b has a maximum inverter current set thereto. If the inverter current $I_A$ is smaller than the predetermined value, the output from the limiting circuit 806b is made to be zero. If the inverter current $I_A$ is larger than the predetermined value, a value obtained by subtracting the predetermined value from the inverter current $I_A$ is transmitted from the limiting circuit 806b. The output from the limiting circuit 806b is passed through the transfer function 807b and received by the maximum value selection circuit 809.

The maximum value selection circuit 809 selects and transmits a signal having a larger absolute value. The output from the maximum value selection circuit 809 is, in the adder/subtracter 814, subtracted from the output voltage command value $V_{C1}^*$ corrected by the voltage control amplifier 803. Since output $V_{RS}$ from the proportional circuit 826 and the output $V_{CS}$ from the integrator 827 are further subtracted from the output transmitted by the adder/subtracter 814 to obtain the PWM voltage command $V_A^*$, the PWM voltage command $V_A^*$ is dropped if the inverter current $I_A$ is larger than the predetermined value set to the limiting circuit 806b. Also the inverter current $I_A$ is dropped by way of the PWM modulation circuit 804 and the drive circuit 7. If the inverter voltage $V_A$ has been dropped, the load current $I_L$ and the inverter current $I_A$ are decreased so that the output line and the converter are protected from excess currents.

Since the forty-third embodiment is arranged in such a manner that the LC filter is, by the virtual resistor, made to be a filter which has a high damping coefficient and which cannot therefore easily be resonated, the output impedance at the output voltage frequency is substantially zero similarly to the thirty-seventh embodiment and the voltage control amplifier 803 for transmitting the correction of the output voltage command is disposed, the output voltage can precisely be controlled. Since the output voltage command $V_C^*$ is dropped if the load current $I_L$ has exceeded the predetermined value set to the limiting circuit 806a or if the inverter current $I_A$ has exceeded the predetermined value set to the limiting circuit 806b, the excess flows of the load current $I_L$ and the inverter current $I_A$ over the predetermined values set to the limiting circuits 807a and 807b can instantaneously be controlled due to the response of the PWM circuit 804.

If the predetermined value to be set to the limiting circuit 807a is so determined as to be capable of protecting the output line and if the predetermined value to be set to the limiting circuit 807b is so determined as to be capable of protecting the converter, the load current $I_L$ can be limited to a current range in which the output line can be protected and the inverter current $I_A$ can be limited to a current range in which the converter can be protected.

Although the thirty-third to the forty-third embodiments have been described about the single-phase inverter, the foregoing arrangement may be applied to a three-phase inverter structured as shown in FIG. 2b if a similar control circuit is used for each phase or at least two phases.

Although the thirty-sixth, fortieth and the forty-third embodiments are each arranged in such a manner that the limiting circuit 806a and the transfer function 807a for forming the virtual output impedance using the load current $I_L$ and the limiting circuit 806b and the transfer function 807b for forming the virtual output impedance using the inverter current $I_A$ are individually disposed, the following common type structure may be employed in a case where the predetermined maximum current and the virtual output impedance have the same characteristics: the load current $I_L$ and the inverter current $I_A$ are supplied to the maximum value selection circuit 809; and the output from the maximum value selection circuit 809 is passed through the limiting circuit 806 and received by the transfer function 807, that is, the limiting circuit and the transfer function Z (S) are commonly disposed with respect to the load current $I_L$ and the inverter current $I_A$.

Forty-Fourth Embodiment

A forty-fourth embodiment of the present invention will now be described. Among multi-phase AC circuits, a three-phase and three-wire system AC circuit is conditioned that the sum of the three phase currents is zero. Therefore, the foregoing circuit has coherency that limiting of a certain phase to a predetermined value range causes the electric currents of the residual phases to be so changed as to satisfy the foregoing condition. As a result, it is difficult to individually control the three phases.

Figure 47:
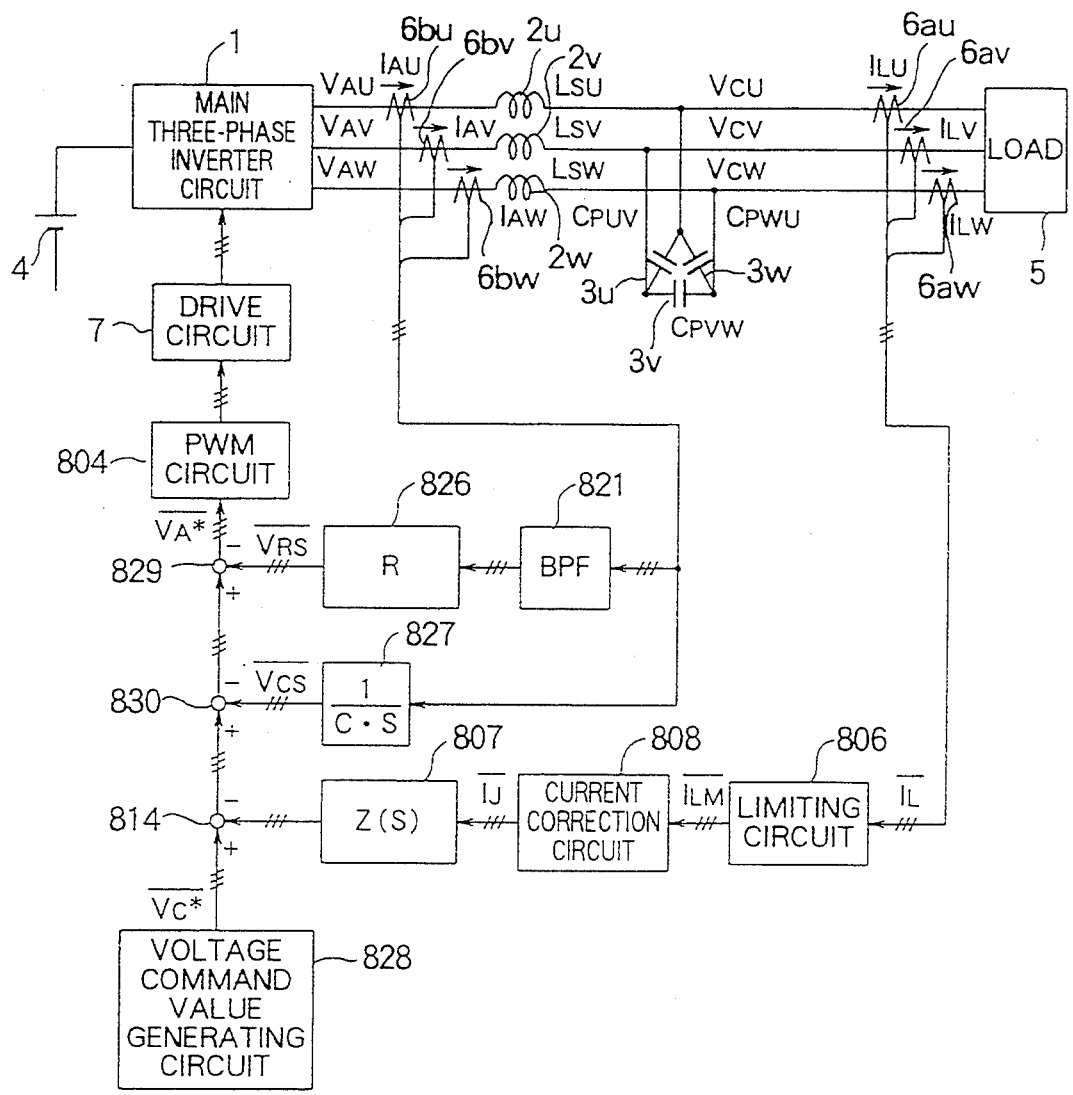

FIG. 47 illustrates the forty-fourth embodiment of the present invention. Referring to FIG. 47, elements corresponding to those shown in FIG. 37 are given the same reference numerals and their detailed descriptions are omitted here. The difference from the foregoing thirty-fourth embodiment lies in that a control circuit is disposed for each phase and an electric current compensation circuit 803 is additionally disposed so that an incoherent control is performed.

Referring to FIG. 47, elements having suffix u are elements of a U-phase inverter, those having suffix v are elements of a V-phase inverter and those having suffix w are elements of a W-phase inverter. FIG. 47 is a single-line diagram of a three-phase inverter, wherein top bars disposed above characters represent matrices representing three-phase signals such that voltage V is expressed by a column matrix as the following equation:

$$V = \text{col}\,[V_u, V_v, V_w]$$

Referring to FIG. 47, load current $\overline{I_L}$ for each phase is supplied to the limiting circuit 806. If the load current $\overline{I_L}$ is larger than a predetermined positive value or a predetermined negative value, a value obtained by subtracting a predetermined value from the load current $\overline{I_L}$ for each phase is transmitted from the limiting circuit 806. The output from the limiting circuit 806 is supplied to the current correction circuit 808. The current correction circuit 808 transmits a signal so corrected as to make the sum of the supplied signals for the three phases to be zero, the signal being passed through the transfer function 807 and, in the adder/subtracter 814, subtracted from output voltage command $\overline{V_C^*}$ for each phase.

Then, output $\overline{V_{RS}}$ from the proportional circuit 826 and output $\overline{V_{CS}}$ from the integrator 827 are further subtracted from the output from the adder/subtracter 814 so that PWM voltage command $\overline{V_A^*}$ is obtained. Therefore, if any one of the instantaneous values of the load current $\overline{I_L}$ is larger than a predetermined value set to the limiting circuit 806, the PWM voltage command $\overline{V_A^*}$ is dropped with a correction signal with which the signals for the three phases are made to be zero. Also the inverter voltage $\overline{V_A}$ is dropped by way of the PWM circuit 804 and the drive circuit 7. If the inverter voltage $\overline{V_A}$ has been dropped, also the load current $\overline{I_L}$ is decreased. As a result, the output line can be protected from excess currents.

The detailed operation of the current correction circuit 808 will now be described. Assumptions are made here that the detected load current values are $I_{LU}$, $I_{LV}$, $I_{LW}$, values set to the limiting circuit 806 are $\pm K$, the outputs from the limiting circuit 806 are $I_{LUM}$, $I_{LMV}$, $I_{LMW}$ and the outputs from the current correction circuit 808 are $I_{JU}$, $I_{JV}$ and $I_{JW}$. If only the U-phase current has become excessive, the outputs from the limiting circuit 806 are made as expressed by Equations (1) to (3). The outputs from the current correction circuit 808 are made as expressed by Equations (4) to (6) so that the sum of the signals of the three phases is made zero and they are transmitted.

If electric currents of the two phases, for example, the U phase and the V-phase, have become excessive, the outputs from the limiting circuit 806 are made as expressed by Equations (7) to (9). The outputs from the current correction circuit 808 are made as expressed by Equations (10) to (12) so that the sum of the signals of the three phases is made zero and they are transmitted. That is, the current correction circuit 808 converts the signal into a signal with which the sum of the signals of the three phases adaptable to the three-phase and three-wire system is made to be zero.

Since the forty-fourth embodiment is arranged in such a manner that the LC filter is, by the virtual resistor, made to be a filter which has a high damping coefficient and which cannot therefore easily be resonated and the output impedance at the output voltage frequency is substantially zero similarly to the thirty-fourth embodiment, the output voltage can precisely be controlled. Since the PWM voltage command $\overline{V_A^*}$ is dropped with the correction signal with which the sum of the signals for the three phases is made to be zero if any one of the instantaneous values of the load current $\overline{I_L}$ has exceeded the desired value set to the limiting circuit 806. Therefore, the load current $\overline{I_L}$ can instantaneously be limited to be smaller than the predetermined value set to the limiting circuit 806 due to the response of the PWM circuit while preventing coherence.

Forty-Fifth Embodiment

Figure 48:
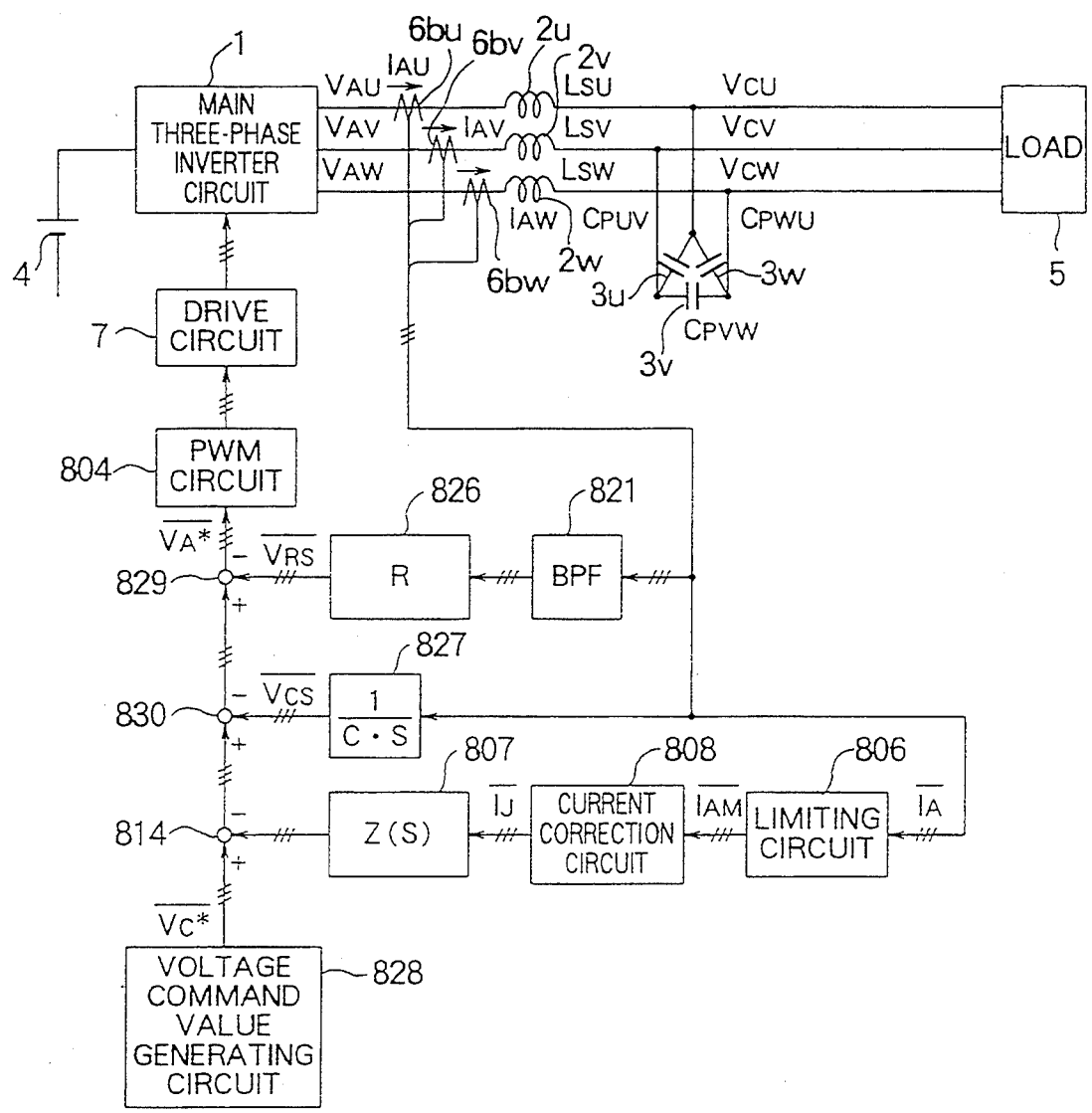

FIG. 48 illustrates a forty-fifth embodiment of the present invention. Referring to FIG. 48, elements corresponding to those according to the forty-fourth embodiment shown in FIG. 47 are given the same reference numerals and their detailed descriptions are omitted here. The difference from the foregoing forty-fourth embodiment lies in that inverter current $\overline{I_A}$ is used in place of load current $\overline{I_L}$ to change the PWM voltage command $\overline{V_A}^*$ to form the virtual output impedance. The residual structures are the same as those of the thirty-third embodiment.

Referring to FIG. 48, the inverter current $\overline{I_A}$ for each phase is supplied to the limiting circuit 806. If the inverter current $\overline{I_A}$ is larger than a predetermined positive value or smaller than a predetermined negative value, a value obtained by subtracting the predetermined value from the inverter current $\overline{I_A}$ for each phase is transmitted from the limiting circuit 806. The output from the limiting circuit 806 is received by the current correction circuit 808. The current correction circuit 808 transmits a signal so corrected as to make the sum of the supplied signals for the three phases to be zero. The signals are then passed through the transfer function 807 and, for each phase, subtracted from the output voltage command $\overline{V_C}^*$ in the adder/subtracter 814.

Then, output $\overline{V_{RS}}$ from the proportional circuit 826 and output $\overline{V_{CS}}$ from the integrator 827 are further subtracted from the output from the adder/subtracter 814 so that PWM voltage command $\overline{V_A}^*$ is obtained. Therefore, if any one of the instantaneous values of the inverter current $\overline{I_A}$ is larger than a predetermined value set to the limiting circuit 806, the PWM voltage command $\overline{V_A}^*$ is dropped with a correction signal with which the signals for the three phases are made to be zero. Also the inverter voltage $\overline{V_A}$ is dropped by way of the PWM circuit 801 and the drive circuit 6. If the inverter voltage $\overline{V_A}$ has been dropped, also the inverter current $\overline{I_A}$ is decreased. As a result, the converter can be protected from excess currents.

Since the forty-fifth embodiment is arranged in such a manner that the LC filter is, by the virtual resistor, made to be a filter which has a high damping coefficient and which cannot therefore easily be resonated and the output impedance at the output voltage frequency is substantially zero similarly to the thirty-fourth embodiment, a desired AC voltage can be obtained without effecting no feedback control. In addition, if any one of the instantaneous values of the inverter current $\overline{I_A}$ for the respective phases exceeds the predetermined value set to the limiting circuit 806, the PWM voltage command $\overline{V_A}^*$ is dropped. Therefore, the inverter current $\overline{I_A}$ can instantaneously be limited to be smaller than the predetermined value set to the limiting circuit 806 without coherence due to the response of the PWM circuit 804.

Forty-Sixth Embodiment

Figure 49:
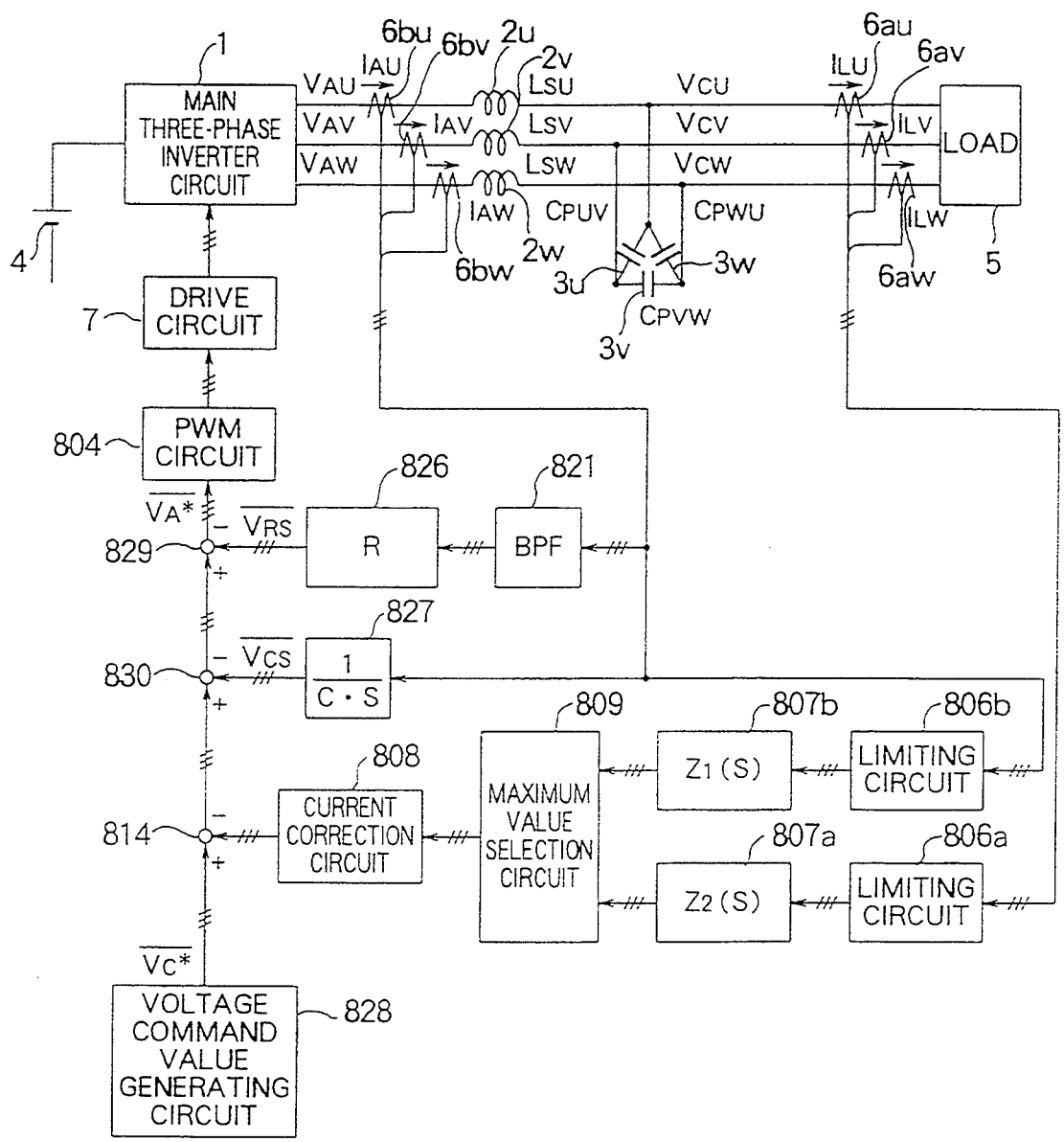

FIG. 49 illustrates a forty-sixth embodiment. Referring to FIG. 49, elements corresponding to those according to the forty-fourth and forty-fifth embodiments respectively shown in FIGS. 47 and 48 are given the same reference numerals and their descriptions are omitted here. As contrasted with the forty-fourth embodiment arranged in such a manner that only the load current $\overline{I_L}$ is limited and the forty-fifth embodiment arranged in such a manner that only inverter current $\overline{I_A}$ is limited, this embodiment is arranged in such a manner that the maximum value selection circuit 809 selects the signal for changing PWM voltage command $\overline{V_A}^*$ using the load current $\overline{I_L}$ and a signal for changing the PWM voltage command $\overline{V_A}^*$ using the inverter current $\overline{I_A}$ to form a virtual output impedance. The residual structures are the same as those of the forty-fourth and forty-fifth embodiments.

Referring to FIG. 43, the load current $\overline{I_L}$ is detected by the detector 6a. The limiting circuit 806a has a maximum output current set thereto so that the output from the limiting circuit 806a is zero if the load current $\overline{I_L}$ is smaller than the predetermined value. If the load current $\overline{I_L}$ is larger than the predetermined value, a value obtained by subtracting the predetermined value from the load current $\overline{I_L}$ is transmitted from the limiting circuit 806a. The output from the limiting circuit 806a is passed through the transfer function 807a and supplied to the maximum value selection circuit 809.

On the other hand, the inverter current $\overline{I_A}$ is detected by the current detector 6b. The limiting circuit 806b has a maximum inverter current set thereto. If the inverter current $\overline{I_A}$ is smaller than the predetermined value, the output from the limiting circuit 806b is made to be zero. If the inverter current $\overline{I_A}$ is larger than the predetermined value, a value obtained by subtracting the predetermined value from the inverter current $\overline{I_A}$ is transmitted from the limiting circuit 806b. The output from the limiting circuit 806b is passed through the transfer function 807b and received by the maximum value selection circuit 809.

The maximum value selection circuit 809 selects and transmits a signal having a larger absolute value. The output from the maximum value selection circuit 809 is received by the current correction circuit 808. The current correction circuit 808 transmits a signal so corrected that the sum of the supplied signals for the three phases are made to be zero, and the signals for the respective phases are subtracted from the output voltage command $\overline{V_C}^*$ in the adder/subtracter 814.

Then, output $\overline{V_{RS}}$ from the proportional circuit 826 and output $\overline{V_{CS}}$ from the integrator 827 are further subtracted from the output from the adder/subtracter 814 so that PWM voltage command $\overline{V_A}^*$ is obtained. Therefore, if any one of the instantaneous values of the load current $\overline{I_L}$ for the respective phases is larger than a predetermined value set to the limiting circuit 806a, or if any one of the instantaneous values of the inverter current $\overline{I_A}$ for the respective phase is larger than a predetermined value set to the limiting circuit 806b, the PWM voltage command $\overline{V_A}^*$ is dropped with a correction signal with which the signals for the three phases are made to be zero. Also the inverter voltage $\overline{V_A}$ is dropped by way of the PWM circuit 804 and the drive circuit 7. If the inverter voltage $\overline{V_A}$ has been dropped, also the load current $\overline{I_L}$ and the inverter current $\overline{I_A}$ are decreased. As a result, the output line and the converter can be protected from excess currents.

Since the forty-sixth embodiment is arranged in such a manner that the LC filter is, by the virtual resistor, made to be a filter which has a high damping coefficient and which cannot therefore easily be resonated and the output impedance at the output voltage frequency is substantially zero similarly to the thirty-fourth embodiment, a desired AC voltage can be obtained without effecting no feedback control. In addition, if any one of the instantaneous values of the inverter current $\overline{I_A}$ for the respective phases exceeds the predetermined value set to the limiting circuit 806, the PWM voltage command $\overline{V_A}^*$ is dropped. Therefore, the inverter current $\overline{I_A}$ can instantaneously be limited to be smaller than the predetermined value set to the limiting circuit 806 without coherence due to the response of the PWM circuit 804.

If the predetermined value to be set to the limiting circuit 806a is so determined as to be capable of protecting the output line and if the predetermined value to be set to the limiting circuit 806b is so determined as to be capable of protecting the converter, the load current $\overline{I_L}$ can be limited to a current range in which the output line can be protected and the inverter current $\overline{I_A}$ can be limited to a current range in which the converter can be protected.

Forty-Seventh Embodiment

Figure 50:
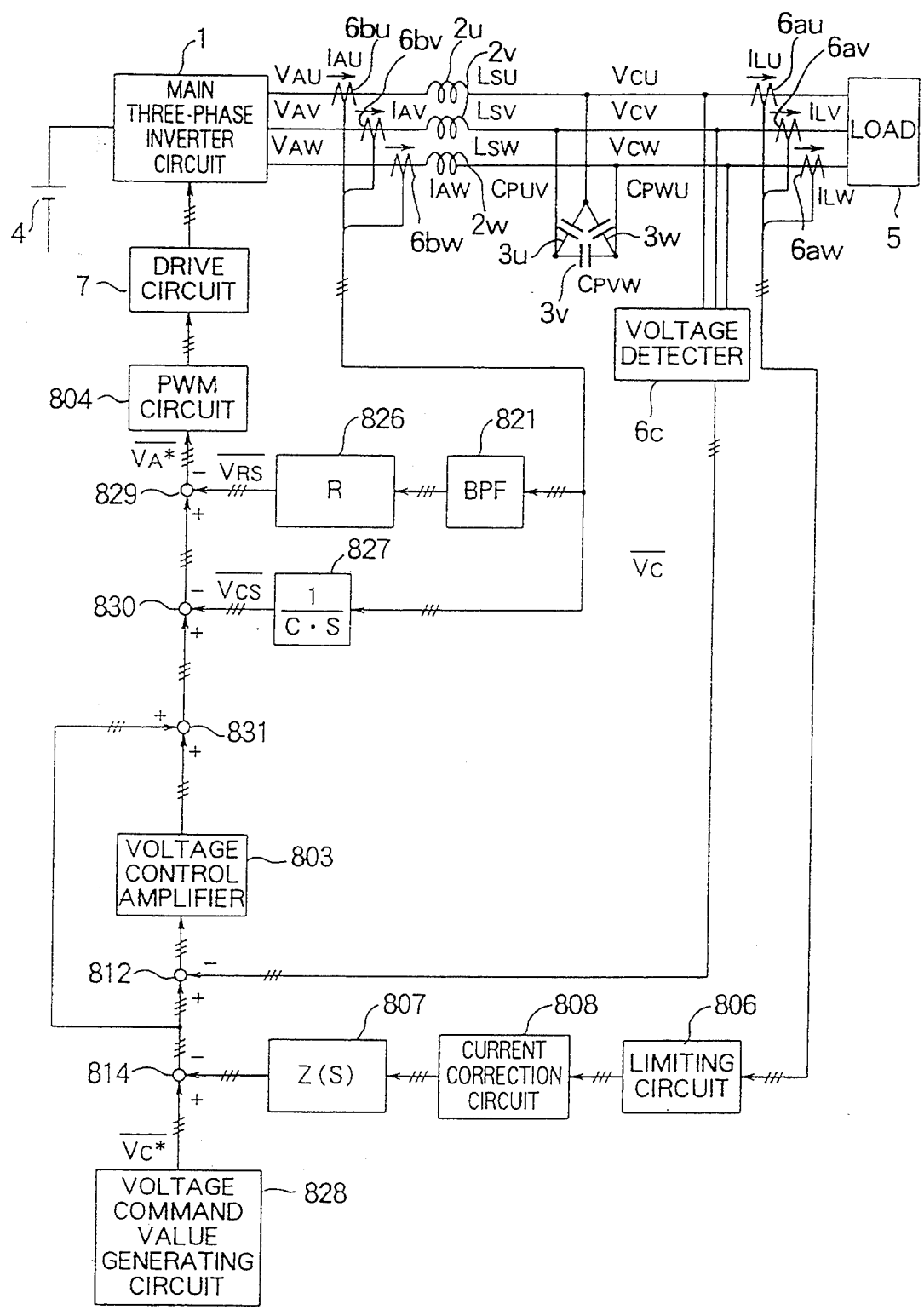

FIG. 50 illustrates a forty-seventh embodiment of the present invention. Referring to FIG. 50, elements corresponding to those according to the thirty-eighth embodiment shown in FIG. 41 are given the same reference numerals and their detailed descriptions are omitted here. The difference from the foregoing thirty-eighth embodiment lies in that a control circuit is disposed for each phase and the current correction circuit 808 is added to perform non-coherent control. The residual structures are the same as those of the thirty-third embodiment.

Referring to FIG. 50, the load current $\overline{I_L}$ for each phase is supplied to the limiting circuit 806. If the load current $\overline{I_L}$ is larger than a predetermined positive value or smaller than a predetermined negative value, a value obtained by subtracting the predetermined value from the load current $\overline{I_L}$ for each phase is transmitted from the limiting circuit 806. The output from the limiting circuit 806 is received by the current correction circuit 808. The current correction circuit 808 transmits a signal so corrected as to make the sum of the supplied signals for the three phases to be zero. The signals are then passed through the transfer function 807 and, for each phase, Subtracted from the output voltage command $\overline{V_C^*}$ in the adder/subtracter 814.

Since the voltage control amplifier 803 is operated as to make the output from the adder/subtracter 814 and the output voltage $\overline{V_C}$ coincide with each other, the output voltage command $\overline{V_C^*}$ is dropped with a correction signal with which the sum of the signals for the three phases are made to be zero if the load current $\overline{I_L}$ has exceeded a predetermined value set to the limiting circuit 806. The response of the voltage control system causes the output voltage $\overline{V_C}$ to follow. If the output voltage $\overline{V_C}$ has been dropped, also the load current $\overline{I_L}$ is decreased so that the output line is protected from excess currents.

Since the forty-seventh embodiment is arranged in such a manner that the LC filter is, by the virtual resistor, made to be a filter which has a high damping coefficient and which cannot therefore easily be resonated, the output impedance at the output voltage frequency is substantially zero and the voltage control amplifier 803 for transmitting the correction of the output voltage command is disposed similarly to the thirty-eighth embodiment, the output voltage can precisely be controlled. In addition, if any one of the instantaneous values of the load current $\overline{I_L}$ for the respective phases exceeds the predetermined value set to the limiting circuit 806, the output voltage command $\overline{V_C^*}$ is dropped with a correction signal which makes the sum of the signals for the three phases to be zero. The excess flow of the load current $\overline{I_L}$ can be limited at high speed without preventing coherence due to the response of the voltage control system.

Forty-Eighth Embodiment

Figure 51:
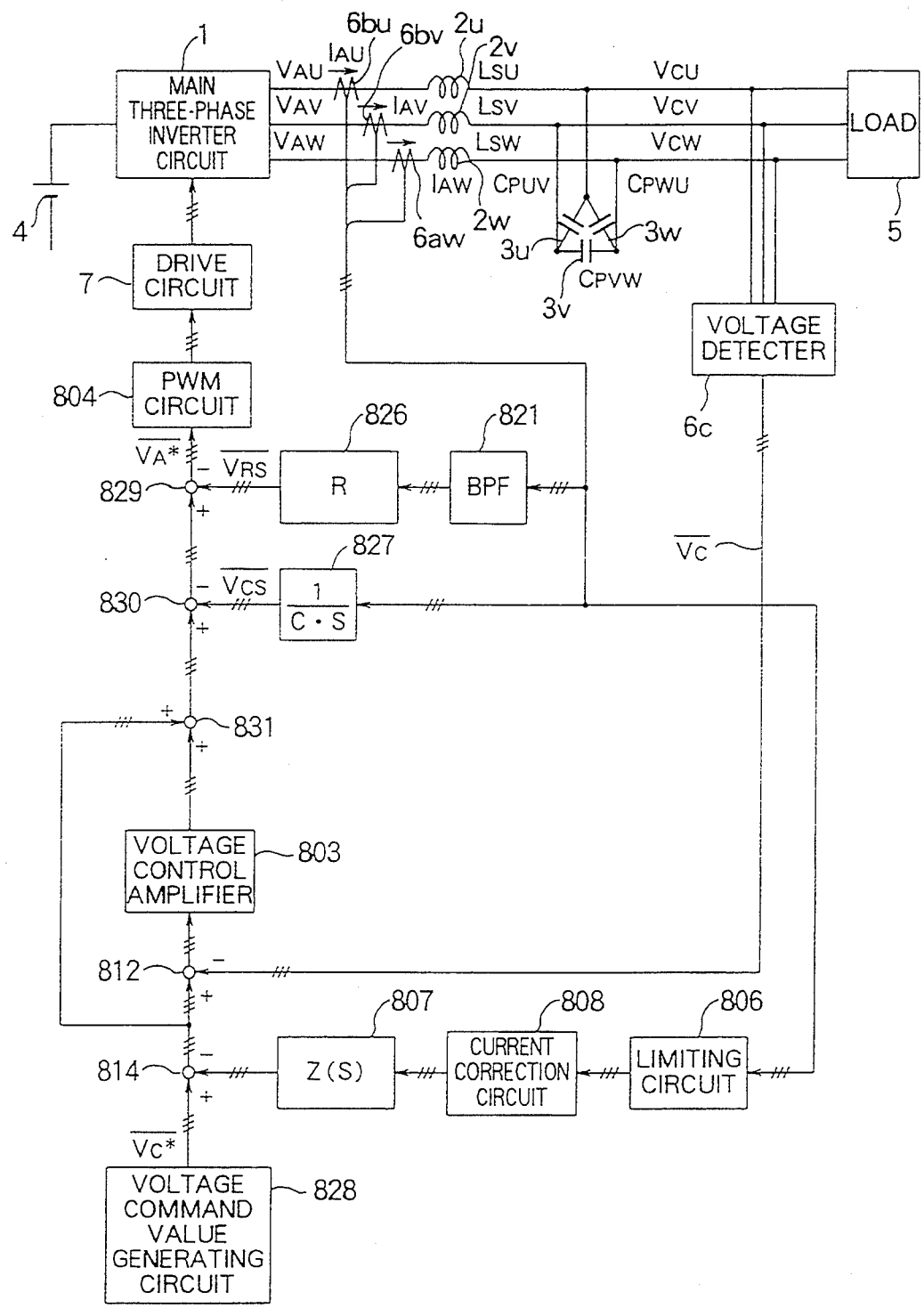

FIG. 51 illustrates a forty-eighth embodiment of the present invention. Referring to FIG. 51, elements corresponding to those according to the forty-seventh embodiment shown in FIG. 50 are given the same reference numerals and their detailed descriptions are omitted here. The difference from the foregoing forty-seventh embodiment lies in that the inverter current $\overline{I_A}$ is used in place of the load current $\overline{I_L}$ to change the output voltage command $\overline{V_C^*}$ to form the virtual output impedance. The residual structures are the same as those of the forty-seventh embodiment.

Referring to FIG. 51, the inverter current $\overline{I_A}$ for each phase is supplied to the limiting circuit 806. If the inverter current $\overline{I_A}$ is larger than a predetermined positive value or smaller than a predetermined negative value, a value obtained by subtracting the predetermined value from the inverter current $\overline{I_A}$ is transmitted for each phase from the limiting circuit 806. The output from the limiting circuit 806 is received by the current correction circuit 808. The current correction circuit 808 transmits a signal so corrected as to make the sum of the supplied signals for the three phases to be zero. The signals are then passed through the transfer function 807 and, for each phase, subtracted from the output voltage command $\overline{V_C^*}$ in the adder/subtracter 814.

Since the voltage control amplifier 803 is operated as to make the output from the adder/subtracter 814 and the output voltage $\overline{V_C}$ coincide with each other, the output voltage command $\overline{V_C^*}$ is dropped with a correction signal with which the sum of the signals for the three phases are made to be zero if the inverter current $\overline{I_A}$ has exceeded a predetermined value set to the limiting circuit 806. The response of the voltage control system causes the output voltage $\overline{V_C}$ to follow. If the output voltage $\overline{V_C}$ has been dropped, also the inverter current $\overline{I_A}$ is decreased so that the converter is protected from excess currents.

Since the forty-eighth embodiment is arranged in such a manner that the LC filter is, by the virtual resistor, made to be a filter which has a high damping coefficient and which cannot therefore easily be resonated, the output impedance at the output voltage frequency is substantially zero and the voltage control amplifier 803 for transmitting the correction of the output voltage command is disposed similarly to the thirty-eighth embodiment, the output voltage can precisely be controlled. In addition, if any one of the instantaneous values of the inverter current $\overline{I_A}$ for the respective phases exceeds the predetermined value set to the limiting circuit 806, the output voltage command $\overline{V_C^*}$ is dropped with a correction signal which makes the sum of the signals for the three phases to be zero. The excess flow of the inverter current $\overline{I_A}$ can be limited at high speed without preventing coherence due to the response of the voltage control system.

Forty-Ninth Embodiment

Figure 52:
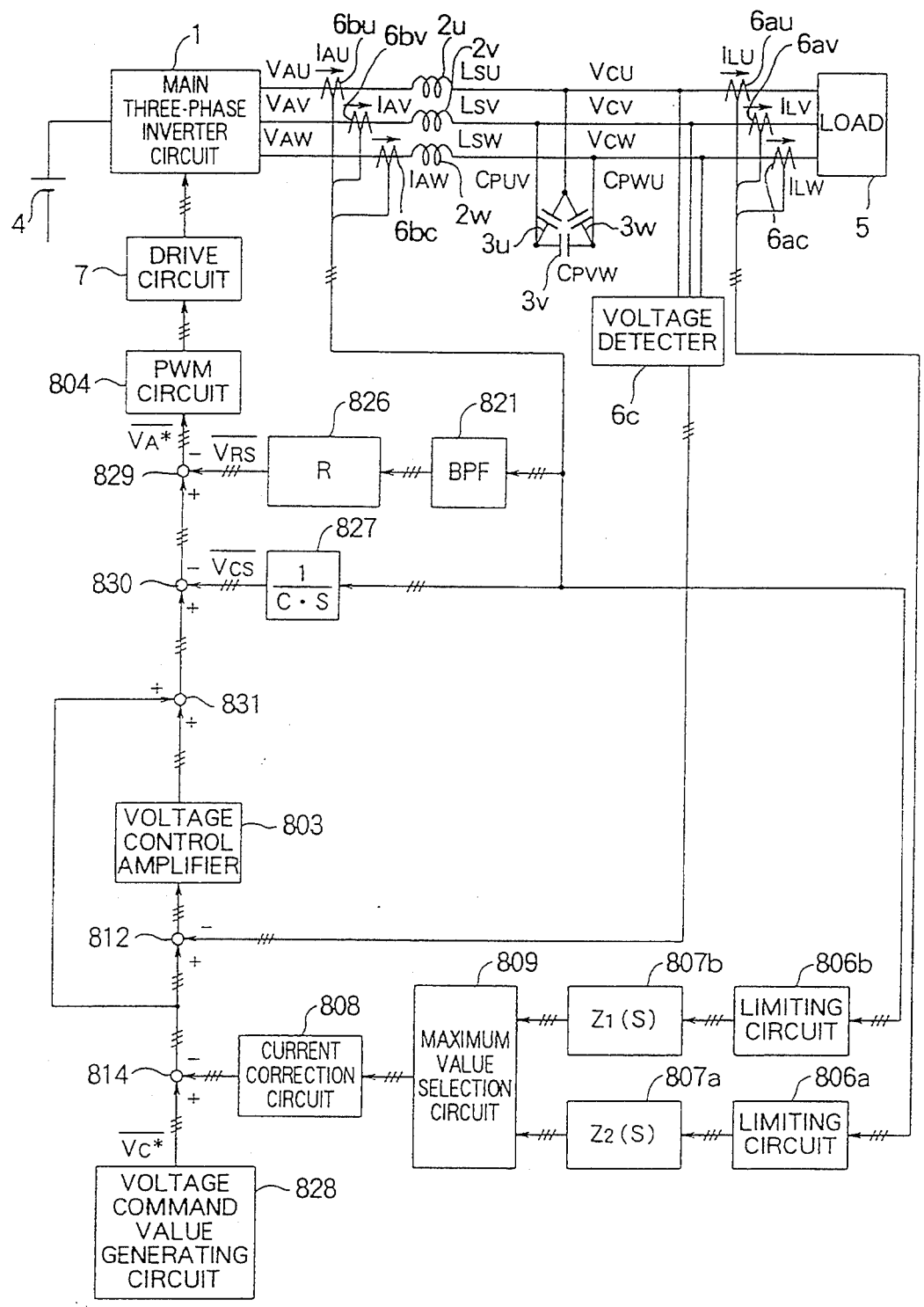

FIG. 52 illustrates a forty-ninth embodiment. Referring to FIG. 52, elements corresponding to those according to the forty-seventh and forty-eighth embodiments respectively shown in FIGS. 50 and 51 are given the same reference numerals and their descriptions are omitted here. As contrasted with the forty-seventh embodiment arranged in such a manner that only the load current $\overline{I_L}$ is limited and the forty-eighth embodiment arranged in such a manner that only inverter current $\overline{I_A}$ is limited, this embodiment is arranged in such a manner that the maximum value selection circuit 809 selects the signal for changing output voltage command $\overline{V_C^*}$ using the load current $\overline{I_L}$ and a signal for changing the output voltage command $\overline{V_C}^*$ using the inverter current $\overline{I_A}$ to form a virtual output impedance. The residual structures are the same as those of the forty-seventh and forty-eighth embodiments.

Referring to FIG. 52, the load current $\overline{I_L}$ is detected by the detector 6a. The limiting circuit 806a has a maximum output current set thereto so that the output from the limiting circuit 806a is zero if the load current $\overline{I_L}$ is smaller than the predetermined value. If the load current $\overline{I_L}$ is larger than the predetermined value, a value obtained by subtracting the predetermined value from the load current $\overline{I_L}$ is transmitted from the limiting circuit 806a. The output from the limiting circuit 806a is passed through the transfer function 807a and supplied to the maximum value selection circuit 809.

On the other hand, the inverter current $\overline{I_A}$ is detected by the current detector 6b. The limiting circuit 806b has a maximum inverter current set thereto. If the inverter current $\overline{I_A}$ is smaller than the predetermined value, the output from the limiting circuit 806b is made to be zero. If the inverter current $\overline{I_A}$ is larger than the predetermined value, a value obtained by subtracting the predetermined value from the inverter current $\overline{I_A}$ is transmitted from the limiting circuit 806b. The output from the limiting circuit 806b is passed through the transfer function 80.6b and received by the maximum value selection circuit 809.

The maximum value selection circuit 809 selects and transmits a signal having a larger absolute value. The output from the maximum value selection circuit 809 is received by the current correction circuit 808. The current correction circuit 808 transmits a signal so corrected that the sum of the supplied signals for the three phases are made to be zero, and the signals for the respective phases are subtracted from the output voltage command $\overline{V_C}^*$ in the adder/subtracter 814.

Since the voltage control amplifier 803 is so operated as to make the output from the adder/subtracter 814 and the output voltage $\overline{V_C}$ coincide with each other, the output voltage command $\overline{V_C}^*$ is dropped with the correction signal which makes the sum of the signals for the three phases to be zero if any one of the instantaneous value of the load current $\overline{I_L}$ for the respective phase has exceeded a predetermined value set to the limiting circuit 806a or that of the inverter current $\overline{I_A}$ has exceeded a predetermined value set to the limiting circuit 806b. The response of the voltage control system causes the output voltage $\backslash X \backslash$ TO($V_C$) to be also dropped. If the output voltage $\overline{V_C}$ is dropped, also the load current $\overline{I_L}$ and the inverter current $\overline{I_A}$ are decreased. Therefore, the output line and the converter can be protected from excess currents.

Since the forty-ninth embodiment is arranged in such a manner that the LC filter is, by the virtual resistor, made to be a filter which has a high damping coefficient and which cannot therefore easily be resonated, the output impedance at the output voltage frequency is substantially zero similarly to the thirty-seventh embodiment and the voltage control amplifier 803 for transmitting the correction of the output voltage command is disposed, the output voltage can precisely be controlled. Since the output voltage command $\overline{V_C}^*$ is dropped with the correction signal which makes the sum of the signals for the three phases to be zero if any one of the instantaneous values for the respective phase has exceeded the predetermined value set to the limiting circuit 806a or that of the inverter current $\overline{I_A}$ has exceeded the predetermined value set to the limited circuit 806b. Therefore, the excess flows of the load current $\overline{I_L}$ and the inverter current $\overline{I_A}$ can be prevented at high speed while preventing coherence due to the response of the voltage control system.

If the predetermined value to be set to the limiting circuit 806a is so determined as to be capable of protecting the output line and if the predetermined value to be set to the limiting circuit 806b is so determined as to be capable of protecting the converter, the load current $\overline{I_L}$ can be limited to a current range in which the output line can be protected and the inverter current $\overline{I_A}$ can be limited to a current range in which the converter can be protected.

Fiftieth Embodiment

Figure 53:
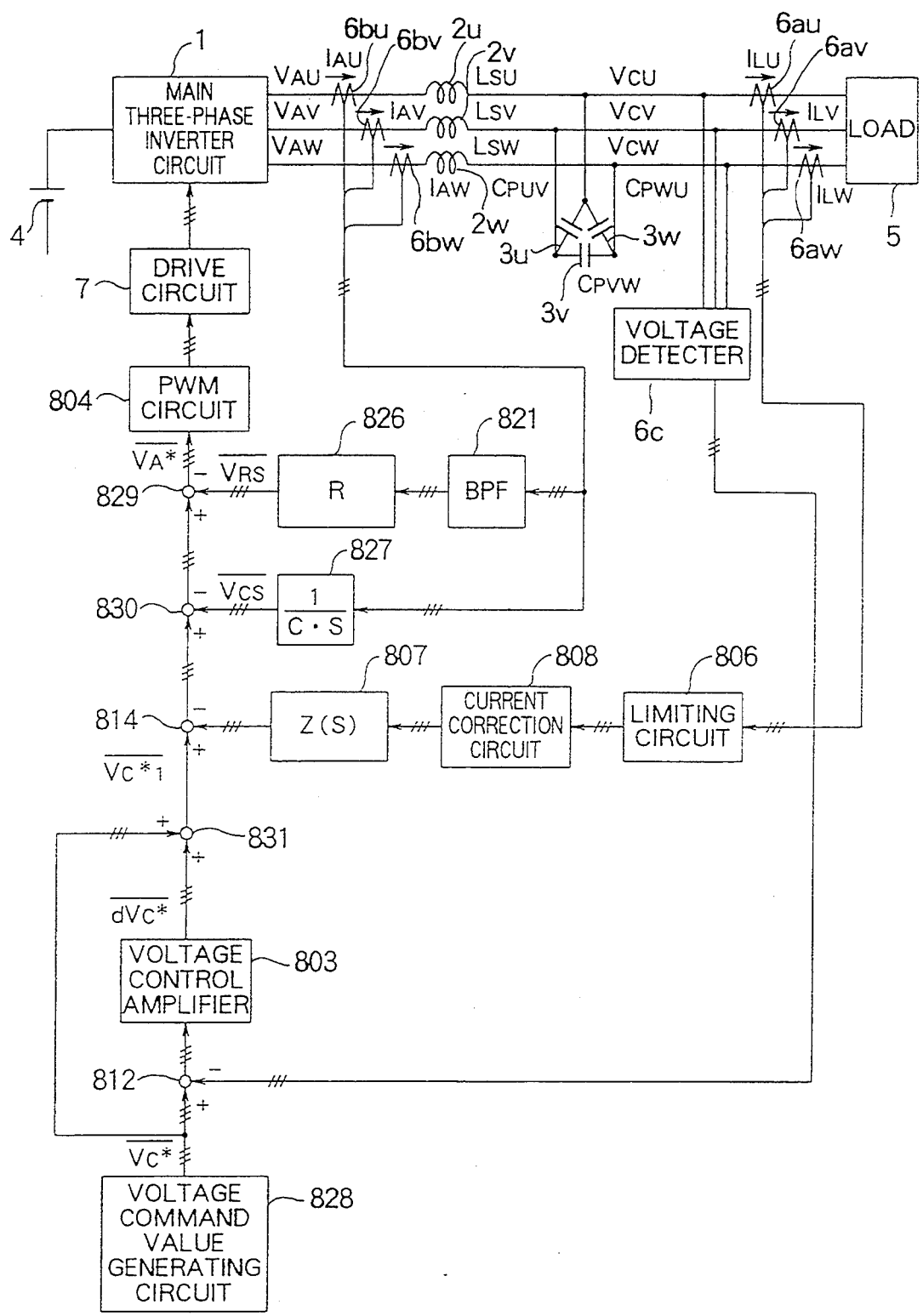

FIG. 53 illustrates a fiftieth embodiment of the present invention. Referring to FIG. 53, elements corresponding to those according to the forty-first embodiment shown in FIG. 44 are given the same reference numerals and their detailed descriptions are omitted here. The difference from the foregoing forty-first embodiment lies in that a control circuit is disposed for each phase and the current correction circuit 808 is added to perform non-coherent control. The residual structures are the same as those of the forty-first embodiment.

Referring to FIG. 53, the load current $\overline{I_L}$ for each phase is supplied to the limiting circuit 806. If the load current $\overline{I_L}$ is larger than a predetermined positive value or smaller than a predetermined negative value, a value obtained by subtracting the predetermined value from the load current $\overline{I_L}$ for each phase is transmitted from the limiting circuit 806. The output from the limiting circuit 806 is received by the current correction circuit 808. The current correction circuit 808 transmits a signal so corrected as to make the sum of the supplied signals for the three phases to be zero. The signals are then passed through the transfer function 807 and, for each phase, subtracted from the output voltage command value $\overline{V_{C1}}^*$ in the adder/subtracter 814.

Then, the output $\overline{V_{RS}}$ from the proportional circuit 826 and output $\overline{V_{CS}}$ from the integrator 827 are further subtracted from the output from the adder/subtracter 814 so that PWM voltage command $\overline{V_A}^*$ is obtained. Therefore, if any one of the instantaneous values of the load current $\overline{I_L}$ is larger than a predetermined value set to the limiting circuit 806, the PWM voltage command $\overline{V_A}^*$ is dropped with a correction signal with which the signals for the three phases are made to be zero. Also the inverter voltage $\overline{V_A}$ is dropped by way of the PWM circuit 804 and the drive circuit 7. If the inverter voltage $\overline{V_A}$ has been dropped, also the load current $\overline{I_L}$ is decreased. As a result, the output line can be protected from excess currents.

Since the fiftieth embodiment is arranged in such a manner that the LC filter is, by the virtual resistor, made to be a filter which has a high damping coefficient and which cannot therefore easily be resonated, the output impedance at the output voltage frequency is substantially zero similarly to the thirty-seventh embodiment and the voltage control amplifier 803 for transmitting the correction of the output voltage command is disposed, the output voltage can precisely be controlled. Since the PWM voltage command $\overline{V_A}^*$ is dropped with the correction-signal which makes the sum of the signals for the three phases to be zero if any one of the instantaneous values of the load current $\overline{I_L}$ for the respective phase has exceeded the predetermined value set to the limiting circuit 806 the excess flow of the load current $\overline{I_L}$ can instantaneously be prevented while preventing coherence due to the response of the PWM circuit 804.

Fifty-First Embodiment

Figure 54:
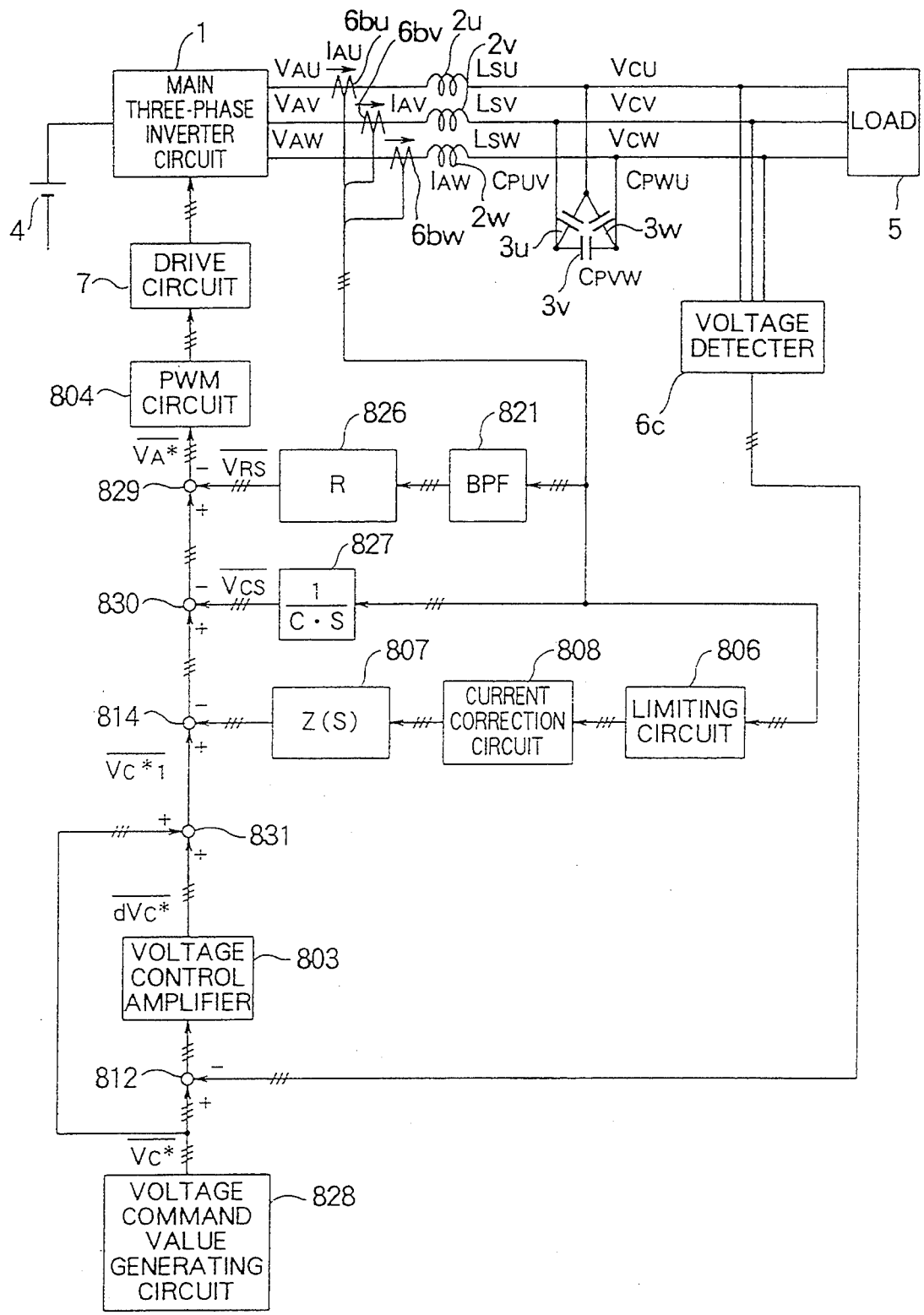

FIG. 54 illustrates a fifty-fifth embodiment of the present invention. Referring to FIG. 54, elements corresponding to those according to the fiftieth embodiment shown in FIG. 53 are given the same reference numerals and, their detailed descriptions are omitted here. The difference from the foregoing fiftieth embodiment lies in that inverter current $\overline{I_A}$ is used in place of load current $\overline{I_L}$ to change the PWM voltage command $\overline{V_A}^*$ to form the virtual output impedance. The residual structures are the same as those of the fiftieth embodiment.

Referring to FIG. 54, the inverter current $\overline{I_A}$ for each phase is supplied to the limiting circuit 806. If the inverter current $\overline{I_A}$ is larger than a predetermined positive value or smaller than a predetermined negative value, a value obtained by subtracting the predetermined value from the inverter current $\overline{I_A}$ for each phase is transmitted from the limiting circuit 806. The output from the limiting circuit 806 is received by the current correction circuit 808. The current correction circuit 808 transmits a signal so corrected as to make the sum of the supplied signals for the three phases to be zero. The signals are then passed through the transfer function 807 and, for each phase, subtracted from the output voltage command value $\overline{V_{C1}}^*$ corrected by the voltage control amplifier 803 in the adder/subtracter 814.

Then, output $\overline{V_{RS}}$ from the proportional circuit 826 and output $\overline{V_{CS}}$ from the integrator 827 are further subtracted from the output from the adder/subtracter 814 so that PWM voltage command \x\ to($V_A^*$) is obtained. Therefore, if the inverter current $\overline{I_A}$ is larger than a predetermined value set to the limiting circuit 806, the PWM voltage command $\overline{V_A}^*$ is dropped with a correction signal with which the signals for the three phases are made to be zero. Also the inverter voltage $\overline{V_A}$ is dropped by way of the PWM circuit 804 and the drive circuit 7. If the inverter voltage $\overline{V_A}$ has been dropped, also the inverter current $\overline{I_A}$ is decreased. As a result, the converter can be protected from excess currents.

Since the fifty-first embodiment is arranged in such a manner that the LC filter is, by the virtual resistor, made to be a filter which has a high damping coefficient and which cannot therefore easily be resonated, the output impedance at the output voltage frequency is substantially zero and the voltage control amplifier 803 for transmitting the correction of the output voltage command is disposed similarly to the thirty-fourth embodiment, the output voltage can precisely be controlled. In addition, if any one of the instantaneous values of the inverter current $\overline{I_A}$ for the respective phases exceeds the predetermined value set to the limiting circuit 806, the PWM voltage command $\overline{V_A}^*$ is dropped with the correction signal which makes the sum of the signals for the three phases to be zero. Therefore, the inverter current $\overline{I_A}$ can instantaneously be limited to be smaller than the predetermined value set to the limiting circuit 806 without coherence due to the response of the PWM circuit 804.

Fifty-Second Embodiment

Figure 55:
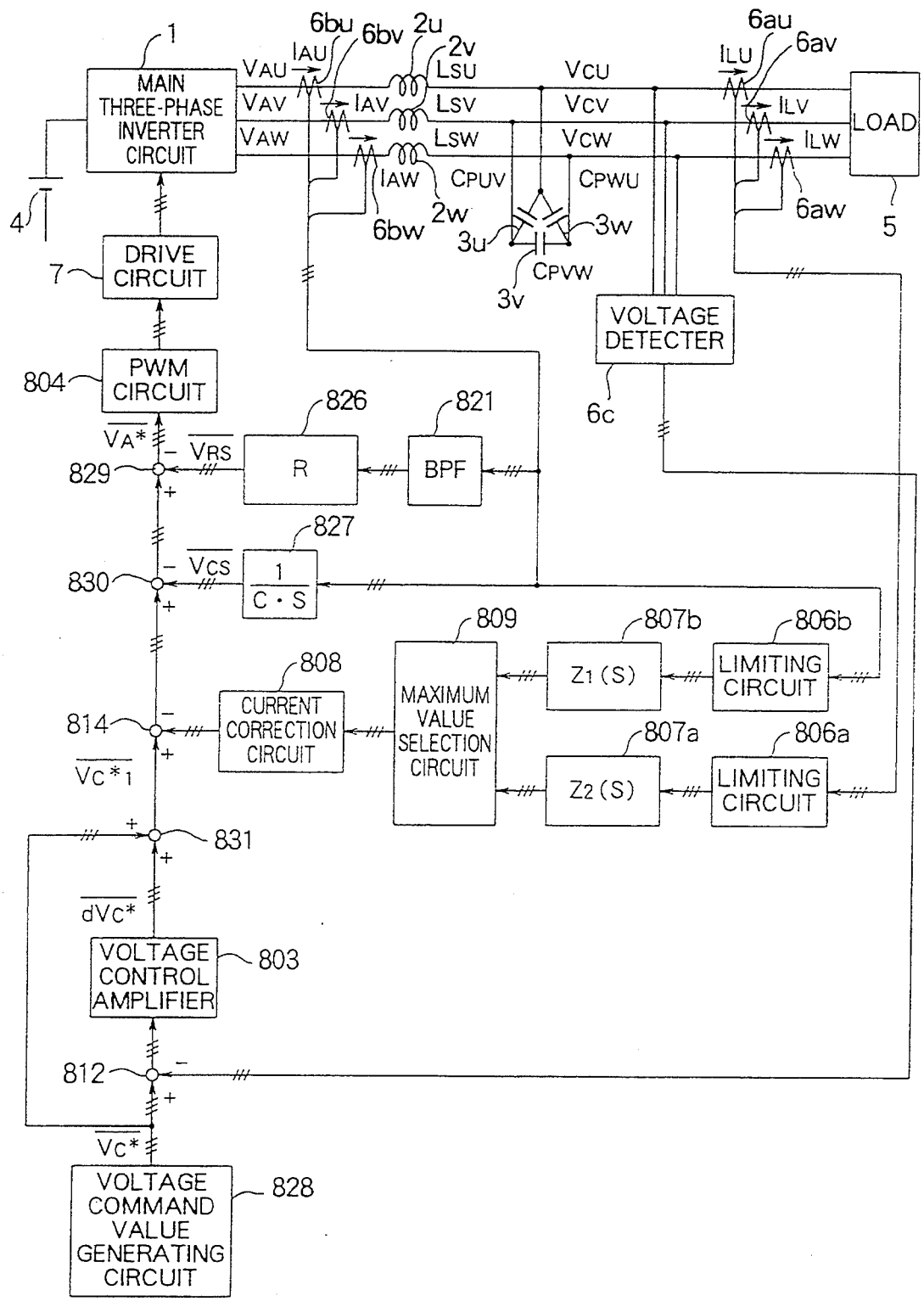

FIG. 55 illustrates a fifty-second embodiment. Referring to FIG. 55, elements corresponding to those according to the fiftieth and fifty-first embodiments respectively shown in FIGS. 53 and 54 are given the same reference numerals and their descriptions are omitted here. As contrasted with the fiftieth embodiment arranged in such a manner that only the load current $\overline{I_L}$ is limited and the fifty-first embodiment arranged in such a manner that only inverter current $\overline{I_A}$ is limited, this embodiment is arranged in such a manner that the maximum value selection circuit 809 selects the signal for changing PWM voltage command $\overline{V_A}^*$ using the load current $\overline{I_L}$ and a signal for changing the PWM voltage command $\overline{V_A}^*$ using the inverter current $\overline{I_A}$ to form a virtual output impedance. The residual structures are the same as those of the fiftieth and fifty-first embodiments.

Referring to FIG. 55, the load current $\overline{I_L}$ is detected by the detector 6a. The limiting circuit 806a has a maximum output current set thereto so that the output from the limiting circuit 806a is zero if the load current $\overline{I_L}$ is smaller than the predetermined value. If the load current $\overline{I_L}$ is larger than the predetermined value, a value obtained by subtracting the predetermined value from the load current $\overline{I_L}$ is transmitted from the limiting circuit 806a. The output from the limiting circuit 806a is passed through the transfer function 807a and supplied to the maximum value selection circuit 809.

On the other hand, the inverter current $\overline{I_A}$ is detected by the current detector 6b. The limiting circuit 806b has a maximum inverter current set thereto. If the inverter current $\overline{I_A}$ is smaller than the predetermined value, the output from the limiting circuit 806b is made to be zero. If the inverter current $\overline{I_A}$ is larger than the predetermined value, a value obtained by subtracting the predetermined value from the inverter current $\overline{I_A}$ is transmitted from the limiting circuit 806b. The output from the limiting circuit 806b is passed through the transfer function 807b and received by the maximum value selection circuit 809.

The maximum value selection circuit 809 selects and transmits a signal having a larger absolute value. The output from the maximum value selection circuit 809 is received by the current correction circuit 808. The current correction circuit 808 transmits a signal so corrected that the sum of the supplied signals for the three phases are made to be zero, and the signals for the respective phases are subtracted from the output voltage command value $\overline{V_{C1}}^*$ in the adder/subtracter 814.

Then, output $\overline{V_{RS}}$ from the proportional circuit 826 and output $\overline{V_{CS}}$ from the integrator 827 are further subtracted from the output from the adder/subtracter 814 so that PWM voltage command $\overline{V_A}^*$ is obtained. Therefore, if any one of the instantaneous values of the load current $\overline{I_L}$ for the respective phases is larger than a predetermined value set to the limiting circuit 806a, or if any one of the instantaneous values of the inverter current $\overline{I_A}$ for the respective phase is larger than a predetermined value set to the limiting circuit 806b, the PWM voltage command $\overline{V_A}^*$ is dropped with a correction signal with which the signals for the three phases are made to be zero. Also the inverter voltage $\overline{V_A}$ is dropped by way of the PWM circuit 804 and the drive circuit 7. If the inverter voltage $\overline{V_A}$ has been dropped, also the load current $\overline{I_L}$ and the inverter current $\overline{I_A}$ are decreased. As a result, the output line and the converter can be protected from excess currents.

Since the fifty-second embodiment is arranged in such a manner that the LC filter is, by the virtual resistor, made to be a filter which has a high damping coefficient and which cannot therefore easily be resonated, the output impedance at the output voltage frequency is substantially zero and the voltage control amplifier 803 for transmitting the correction of the output voltage command is disposed similarly to the thirty-fourth embodiment, the output voltage can precisely be controlled. In addition, if any one the instantaneous values of the load current $\overline{I_L}$ for the respective phases exceeds the predetermined value set to the limiting circuit 806a or if any one of the instantaneous values of the inverter current $\overline{I_A}$ for the respective phases exceeds the predetermined value set to the limiting circuit 806b, the PWM voltage command $\overline{V_A}^*$ is dropped with the correction signal which makes the sum of the signals for the three phases to be zero. Therefore, the load current $\overline{I_L}$ and the inverter current $\overline{I_A}$ can instantaneously be limited to be smaller than the predetermined values set to the limiting circuits 806a and 806b without coherence due to the response of the PWM circuit 804.

If the predetermined value to be set to the limiting circuit 806a is so determined as to be capable of protecting the output line and if the predetermined value to be set to the limiting circuit 806b is so determined as to be capable of protecting the converter, the load current $\overline{I_L}$ can be limited to a current range in which the output line can be protected and the inverter current $\overline{I_A}$ can be limited to a current range in which the converter can be protected.

Although the thirty-first and the thirty-second embodiments are each arranged in such a manner that the limiting circuit 806a and the transfer function G (S) 807a for forming the virtual output impedance using the load current $I_L$ and the limiting circuit 806b and the transfer function G (S) 807b for forming the virtual output impedance using the inverter current $I_A$ are individually disposed, the following common type structure may be employed in a case where the predetermined maximum current and the virtual output impedance have the same characteristics: the instantaneous value of each of the load current $I_L$ and the inverter current $I_A$ are supplied to the maximum value selection circuit 809; and the output from the maximum value selection circuit 809 is passed through the limiting circuit and received by the transfer function G (S), that is, the limiting circuit and the transfer function G (S) are commonly disposed with respect to the load current $I_L$ and the inverter current $I_A$.

Although seventeenth to thirty-second embodiments are each arranged in such a manner that the inverter current $I_A$ is passed through the band pass filter 821 and received by the transfer function Z (S) 822, the sequential order of the flow of the inverter current $I_A$ may, of course, be changed such that the inverter current $I_A$ is passed through the transfer function Z (S) 822 and received by the band pass filter 821.

Although the eighteenth to thirty-second embodiments are arranged in such a manner that damping of the LC filter is improved by causing the inverter current $I_A$ to pass through the band pass filter 821, the band pass filter 821 may be omitted from the structure in a case where no excellent output voltage transient characteristic is required.

Although the forty-sixth, forty-ninth and the fifty-second embodiments are each arranged in such a manner that the limiting circuit 806a and the transfer function 807a for forming the virtual output impedance using the load current $\overline{I_L}$ and the limiting circuit 806b and the transfer function 807b for forming the virtual output impedance using the inverter current $\overline{I_A}$ are individually disposed, the following common type structure may be employed in a case where the predetermined maximum current and the virtual output impedance have the same characteristics: first the instantaneous values of the load current $\overline{I_L}$ and the inverter current $\overline{I_A}$ are supplied to the maximum value selection circuit 809; and the output from the maximum value selection circuit 809 is supplied in the sequential order: the limiting circuit, the transfer function and the current correction circuit or another order: the current correction circuit and the transfer function, that is, the limiting circuit and the transfer function are commonly disposed with respect to the load current $\overline{I_L}$ and the inverter current $\overline{I_A}$.

Although thirty-third to fifty-second embodiments are each arranged in such a manner that the inverter current $I_A$ is passed through the band pass filter 821 and supplied to the proportional circuit 826, the flowing order of the inverter current $I_A$ may, of course, be changed such that the inverter current $I_A$ is passed through the proportional circuit 826 and supplied to the band pass filter 821.

Although thirty-third to fifty-second embodiments are each arranged so that the inverter current $\overline{I_A}$ is supplied to the integrator 827, a first-order delay circuit having an integrating characteristic adjacent to the frequency of the output voltage may, of course, be employed in place of the integrator.

Figure 56:
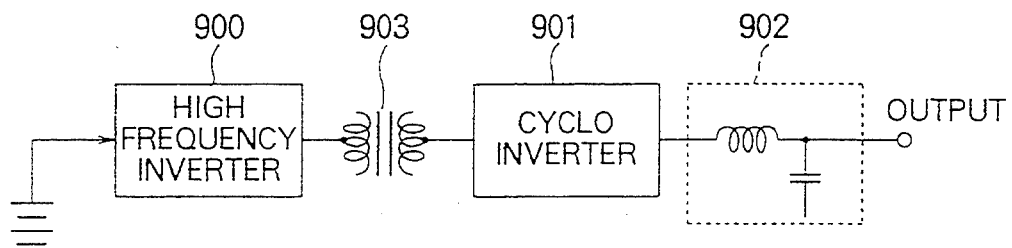
FIG. 56 is a circuit diagram which illustrates another embodiment of the converter according to the present invention.
Figure 57:
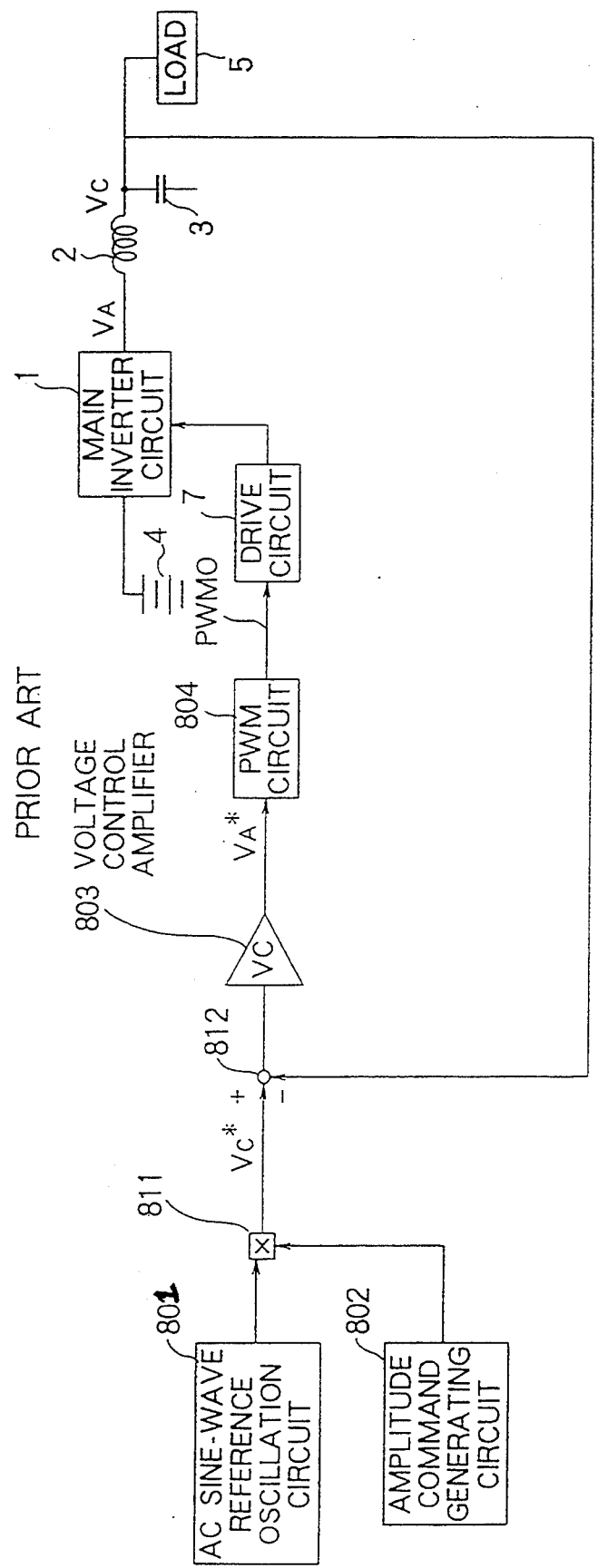
FIG. 57 is a block diagram which illustrates the structure of a conventional system.
Figure 58:
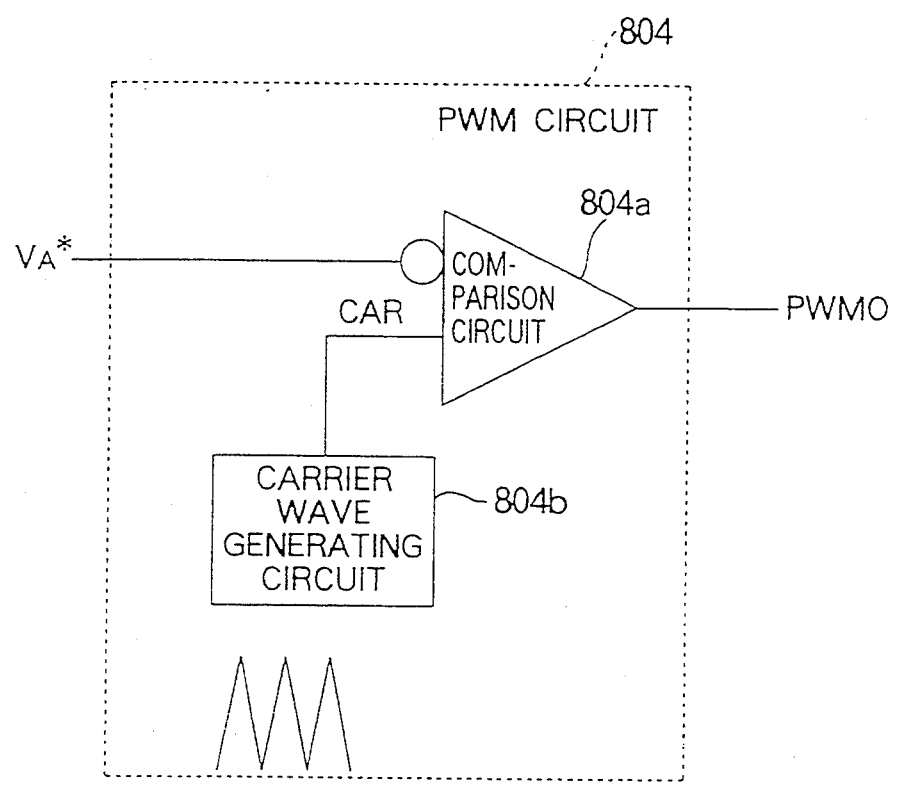
FIG. 58 is a block diagram which illustrates the structure of a PWM circuit shown in FIG. 57.

Although the descriptions have been made about the voltage-type inverter, the present invention can similarly be applied to a type of a combination of an inverter and a cyclone converter which is arranged as shown in FIG. 56 such that the output from a high-frequency inverter 900 is, by way of a high frequency transformer 903, controlled by a cyclone converter 901 to obtain arbitrary frequency and voltage, and the output from it is made to be sine waves by a filter 902 to be supplied to the load.

The effects of the foregoing embodiments will now be concluded.

Since the first embodiment is arranged in such a manner that the output voltage amplitude command is dropped if the mean value of the load current is larger than a predetermined value, an effect of limiting the load current in an averaged manner can be obtained.

Since the second embodiment is arranged in such a manner that the output voltage command is dropped if the instantaneous value of the load current is larger than a predetermined value, an effect can be obtained in that the load current can be limited at high speed due to the response of the voltage control loop.

Since the third embodiment is arranged in such a manner that the PWM voltage command is dropped if the instantaneous value of the load current is larger than a predetermined value, an effect can be obtained in that the load current can instantaneously be limited due to the response of the PWM circuit.

Since the fourth embodiment is arranged in such a manner that the output voltage amplitude command is dropped if the mean value of the inverter currents is larger than a predetermined value, an effect can be obtained in that the inverter currents can be limited in an averaged manner.

Since the fifth embodiment is arranged in such a manner that the output voltage command is dropped if the instantaneous value of the inverter current is larger than a predetermined manner, an effect can be obtained in that the inverter current can be limited at high speed due to the response of the voltage control loop.

Since the sixth embodiment is arranged in such a manner that the PWM voltage command is dropped if the instantaneous value of the inverter current is larger than a predetermined value, an effect can be obtained in that the inverter current can instantaneously be limited due to the response of the PWM circuit.

Since the seventh embodiment is arranged in such a manner that the output voltage amplitude command is dropped if the mean value of the load currents is larger than a predetermined value or if the mean value of the inverter currents is larger than a predetermined current, an effect can be obtained in that the load current and the inverter current can be limited to be smaller than predetermined values.

Since the eighth embodiment is arranged in such a manner that the output voltage command is dropped if the instantaneous value of the load current is larger than a predetermined value or the instantaneous value of the inverter current is larger than a predetermined value, an effect can be obtained in that the load current and the inverter current can be limited at high speed to be smaller than the predetermined values due to the response of the voltage control loop.

Since the ninth embodiment is arranged in such a manner that the PWM voltage command is dropped if the instantaneous value of the load current is larger than a predetermined value or the instantaneous value of the inverter current is larger than a predetermined value, an effect can be obtained in that the load current and the inverter current can be limited at high speed to be smaller than the predetermined values due to the response of the PWM circuit.

Since the tenth embodiment is arranged in such a manner that the output voltage command in a case of a three-phase and three-wire type is instantaneously dropped with a correction signal with which the sum of the signals for the three phases is made to be zero if any one of the instantaneous values of the load currents of the corresponding phases is larger than a predetermined value, an effect can be obtained in that the load current can instantaneously be limited to be smaller than a predetermined value without coherence due to the response of the voltage control loop.

Since the eleventh embodiment is arranged in such a manner that the PWM voltage command in a case of a three-phase and three-wire type is instantaneously dropped with a correction signal with which the sum of the signals for the three phases is made to be zero if any one of the instantaneous values of the load currents of the corresponding phases is larger than a predetermined value, an effect can be obtained in that the load current can instantaneously be limited to be smaller than a predetermined value without coherence due to the response of the PWM circuit.

Since the twelfth embodiment is arranged in such a manner that the output voltage command in a case of a three-phase and three-wire type is instantaneously dropped with a correction signal with which the sum of the signals for the three phases is made to be zero if any one of the instantaneous values of the inverter currents of the corresponding phases is larger than a predetermined value, an effect can be obtained in that the inverter current can instantaneously be limited to be smaller than a predetermined value at high speed without coherence due to the response of the voltage control loop.

Since the thirteenth embodiment is arranged in such a manner that the PWM voltage command in a case of a three-phase and three-wire type is instantaneously dropped with a correction signal with which the sum of the signals for the three phases is made to be zero if any one of the instantaneous values of the inverter currents of the corresponding phases is larger than a predetermined value, an effect can be obtained in that the inverter current can instantaneously be limited to be smaller than a predetermined value without coherence due to the response of the PWM circuit.

Since the fourteenth embodiment is arranged in such a manner that the output voltage command in a case of a three-phase and three-wire type is instantaneously dropped with a correction signal with which the sum of the signals for the three phases is made to be zero if any one of the instantaneous values of the inverter currents of the corresponding phases is larger than a predetermined value, an effect can be obtained in that the inverter current can be limited to be smaller than a predetermined value at high speed and without coherence due to the response of the voltage control loop.

Since the fifteenth embodiment is arranged in such a manner that the PWM voltage command in a case of a three-phase and three-wire type is instantaneously dropped with a correction signal with which the sum of the signals for the three phases is made to be zero if any one of the instantaneous values of the inverter currents of the corresponding phases is larger than a predetermined value, an effect can be obtained in that the load current and the inverter current can instantaneously be limited to be smaller than corresponding predetermined values without coherence due to the response of the PWM circuit.

Since the sixteenth embodiment is arranged in such a manner that the inverter current is used to change the PWM voltage command, an effect can be obtained in that the apparent damping of the LC filter can be improved and the design of the voltage control amplifier can be facilitated.

Since the seventeenth embodiment is arranged in such a manner that the signal obtained by causing the inverter current to pass through the band pass filter is used to change the PWM voltage command, an effect can be obtained in addition to the effect obtainable from the sixteenth embodiment in that output voltage transiency characteristic can be improved in the frequency range in which electric power is supplied.

Since the eighteenth embodiment is arranged in such a manner that the output voltage amplitude command is damped if the mean value of the load currents is larger than a predetermined value, an effect can be obtained in addition to the effect obtainable from the sixteenth embodiment in that the output currents can be limited in an averaged manner.

Since the nineteenth embodiment is arranged in such a manner that the output voltage command is dropped if the instantaneous value of the load current is larger than a predetermined value, an effect can be obtained in addition to the effect obtainable from the seventeenth embodiment in that the output current can be limited at high speed due to the response of the voltage control loop.

Since the twentieth embodiment is arranged in such a manner that the PWM voltage command is dropped if the instantaneous value of the load current is larger than a predetermined value, an effect can be obtained in addition to the effect obtainable from the seventeenth embodiment in that the output current can instantaneously be limited due to the response of the PWM circuit.

Since the twenty-first embodiment is arranged in such a manner that the output voltage amplitude command is dropped if the mean value of the inverter currents is larger than a predetermined value, an effect can be obtained in addition to the effect obtainable from the seventeenth embodiment in that the inverter currents can be limited in an averaged manner.

Since the twenty-second embodiment is arranged in such a manner that the output voltage command is dropped if the instantaneous value of the inverter current is larger than a predetermined value, an effect can be obtained in addition to the effect obtainable from the seventeenth embodiment in that the inverter current can be limited at high speed due to the response of the voltage control loop.

Since the twenty-third embodiment is arranged in such a manner that the PWM voltage command is dropped if the instantaneous value of the inverter current is larger than a predetermined value, an effect can be obtained in addition to the effect obtainable from the seventeenth embodiment in that the inverter current can instantaneously be limited due to the response of the PWM circuit.

Since the twenty-fourth embodiment is arranged in such a manner that the output voltage amplitude command is dropped if the mean value of the load currents is larger than a predetermined value or if the mean value of the inverter currents is larger than a predetermined value, an effect can be obtained in addition to the effect obtainable from the seventeenth embodiment in that the load current and the inverter current can be limited to be smaller than predetermined values in an averaged manner.

Since the twenty-fifth embodiment is arranged in such a manner that the output voltage command is dropped if the instantaneous value of the load current is larger than a predetermined value or if the instantaneous value of the inverter current is larger than a predetermined value, an effect can be obtained in addition to the effect obtainable from the seventeenth embodiment in that the load current and the inverter current can be limited to be smaller than predetermined values at high speed due to the response of the voltage control loop.

Since the twenty-sixth embodiment is arranged in such a manner that the PWM voltage command is dropped if the instantaneous value of the load current is larger than a predetermined value or if the instantaneous value of the inverter current is larger than a predetermined value, an effect can be obtained in addition to the effect obtainable from the seventeenth embodiment in that the load current and the inverter current can instantaneously be limited to be smaller than predetermined values due to the response of the PWM circuit.

Since the twenty-seventh embodiment is arranged in such a manner that the output voltage command in a case of a three-phase and three-wire type is instantaneously dropped with a correction signal with which the sum of the signals for the three phases is made to be zero if any one of the instantaneous values of the load currents of the corresponding phases is larger than a predetermined value, an effect can be obtained in addition to the effect obtainable from the seventeenth embodiment in that the load current can be limited to be smaller than a predetermined value without coherence at high speed due to the response of the voltage control loop.

Since the twenty-eighth embodiment is arranged in such a manner that the PWM voltage command in a case of a three-phase and three-wire type is instantaneously dropped with a correction signal with which the sum of the signals for the three phases is made to be zero if any one of the instantaneous values of the load currents of the corresponding phases is larger than a predetermined value, an effect can be obtained in addition to the effect obtainable from the seventeenth embodiment in that the load current can instantaneously be limited to be smaller than a predetermined value without coherence due to the response of the PWM circuit.

Since the twenty-ninth embodiment is arranged in such a manner that the output voltage command in a case of a three-phase and three-wire type is instantaneously dropped with a correction signal with which the sum of the signals for the three phases is made to be zero if any one of the instantaneous values of the inverter currents of the corresponding phases is larger than a predetermined value, an effect can be obtained in addition to the effect obtainable from the seventeenth embodiment in that the inverter current can be limited to be smaller than a predetermined value at high speed and without coherence due to the response of the voltage control loop.

Since the thirtieth embodiment is arranged in such a manner that the PWM voltage command in a case of a three-phase and three-wire type is instantaneously dropped with a correction signal with which the sum of the signals for the three phases is made to be zero if any one of the instantaneous values of the inverter currents of the corresponding phases is larger than a predetermined value, an effect can be obtained in addition to the effect obtainable from the seventeenth embodiment in that the inverter current can instantaneously be limited to be smaller than a predetermined value without coherence due to the response of the PWM circuit.

Since the thirty-first embodiment is arranged in such a manner that the output voltage command in a case of a three-phase and three-wire type is instantaneously dropped with a correction signal with which the sum of the signals for the three phases is made to be zero if any one of the instantaneous values of the load current or the inverter currents of the corresponding phases is larger than a predetermined value, an effect can be obtained in addition to the effect obtainable from the seventeenth embodiment in that the load current and the inverter current can be limited to be smaller than predetermined values at high speed and without coherence due to the response of the voltage control loop.

Since the thirty-second embodiment is arranged in such a manner that the PWM voltage command in a case of a three-phase and three-wire type is instantaneously dropped with a correction signal with which the sum of the signals for the three phases is made to be zero if any one of the instantaneous values of the load current or the inverter currents of the corresponding phases is larger than a predetermined value, an effect can be obtained in addition to the effect obtainable from the seventeenth embodiment in that the load current and the inverter current can instantaneously be limited to be smaller than predetermined values without coherence due to the response of the PWM circuit.

Since the thirty-third embodiment is arranged in such a manner that the inverter current is used to change the PWM voltage command, an effect can be obtained in that apparent damping of the LC filter can be improved and the output impedance at the output voltage frequency can be substantially made to be zero.

Since the thirty-fourth embodiment is arranged in such a manner that the PWM voltage command is dropped if the load current is larger than a predetermined value, an effect can be obtained in addition to the effect obtainable from the thirty-third embodiment in that the load current can instantaneously be limited due to the response of the PWM circuit.

Since the thirty-fifth embodiment is arranged in such a manner that the PWM voltage command is dropped if the inverter current is larger than a predetermined value, an effect can be obtained in addition to the effect obtainable from the thirty-third embodiment in that the inverter current can instantaneously be limited due to the response of the PWM circuit.

Since the thirty-sixth embodiment is arranged in such a manner that the PWM voltage command is dropped if the load current is larger than a predetermined value or if the inverter current is larger than a predetermined value, an effect can be obtained in addition to the effect obtainable from the thirty-third embodiment in that the load current and the inverter current can instantaneously be limited to be smaller than predetermined values due to the response of the PWM circuit.

Since the thirty-seventh embodiment is arranged in such a manner that the voltage control amplifier for transmitting the correction of the output voltage command is disposed, an effect can be obtained in addition to the effect obtainable from the thirty-third embodiment in that the output voltage can precisely be controlled.

Since the thirty-eighth embodiment is arranged in such a manner that the output voltage command is dropped if the load current is larger than a predetermined value, an effect can be obtained in addition to the effect obtainable from the thirty-seventh embodiment in that the load current can be limited at high speed due to the response of the voltage control system.

Since the thirty-ninth embodiment is arranged in such a manner that the output voltage command is dropped if the inverter current is larger than a predetermined value, an effect can be obtained in addition to the effect obtainable from the thirty-seventh embodiment in that the inverter current can be limited at high speed due to the response of the voltage control system.

Since the fortieth embodiment is arranged in such a manner that the output voltage command is dropped if the load current is larger than a predetermined value or if the inverter current is larger than a predetermined value, an effect can be obtained in addition to the effect obtainable from the thirty-seventh embodiment in that the load current and the inverter current can be limited to be smaller than corresponding predetermined values at high speed due to the response of the voltage control system.

Since the forty-first embodiment is arranged in such a manner that the PWM voltage command is dropped if the load current is larger than a predetermined value, an effect can be obtained in addition to the effect obtainable from the thirty-seventh embodiment in that the load current can instantaneously be limited due to the response of the PWM circuit.

Since the forty-second embodiment is arranged in such a manner that the PWM voltage command is dropped if the inverter current is larger than a predetermined value, an effect can be obtained in addition to the effect obtainable from the thirty-seventh embodiment in that the inverter current can instantaneously be limited due to the response of the PWM circuit.

Since the forty-third embodiment is arranged in such a manner that the PWM voltage command is dropped if the load current is larger than a predetermined value of if the inverter current is larger than a predetermined value, an effect can be obtained in addition to the effect obtainable from the thirty-seventh embodiment in that the load current and the inverter current can instantaneously be limited to be smaller than corresponding predetermined values due to the response of the PWM circuit.

Since the forty-fourth embodiment is arranged in such a manner that the PWM voltage command in a case of a three-phase and three-wire type is instantaneously dropped with a correction signal with which the sum of the signals for the three phases is made to be zero if any one of the instantaneous values of the load currents of the corresponding phases is larger than a predetermined value, an effect can be obtained in addition to the effect obtainable from the thirty-fourth embodiment in that the load current can instantaneously be limited to be smaller than a predetermined value without coherence due to the response of the PWM circuit.

Since the forty-fifth embodiment is arranged in such a manner that the PWM voltage command in a case of a three-phase and three-wire type is instantaneously dropped with a correction signal with which the sum of the signals for the three phases is made to be zero if any one of the instantaneous values of the inverter currents of the corresponding phases is larger than a predetermined value, an effect can be obtained in addition to the effect obtainable from the thirty-fourth embodiment in that the inverter current can instantaneously be limited to be smaller than a predetermined value without coherence due to the response of the PWM circuit.

Since the forty-sixth embodiment is arranged in such a manner that the PWM voltage command in a case of a three-phase and three-wire type is instantaneously dropped with a correction signal with which the sum of the signals for the three phases is made to be zero if any one of the instantaneous values of the load currents of the corresponding phases is larger than a predetermined value or if any of the instantaneous values of the inverter currents of the corresponding phases is larger than a predetermined value, an effect can be obtained in addition to the effect obtainable from the thirty-fourth embodiment in that the load current and the inverter current can instantaneously be limited to be smaller than corresponding predetermined values without coherence due to the response of the PWM circuit.

Since the forty-seventh embodiment is arranged in such a manner that the output voltage command in a case of a three-phase and three-wire type is instantaneously dropped with a correction signal with which the sum of the signals for the three phases is made to be zero if any one of the instantaneous values of the load currents of the corresponding phases is larger than a predetermined value, an effect can be obtained in addition to the effect obtainable from the thirty-eighth embodiment in that the load current can be limited to be smaller than a predetermined value at high speed and without coherence due to the response of the voltage control loop.

Since the forty-eighth embodiment is arranged in such a manner that the output voltage command in a case of a three-phase and three-wire type is instantaneously dropped with a correction signal with which the sum of the signals for the three phases is made to be zero if any one of the instantaneous values of the inverter currents of the corresponding phases is larger than a predetermined value, an effect can be obtained in addition to the effect obtainable from the thirty-eighth embodiment in that the inverter current can be limited to be smaller than a predetermined value at high speed and without coherence due to the response of the voltage control loop.

Since the forty-ninth embodiment is arranged in such a manner that the output voltage command in a case of a three-phase and three-wire type is instantaneously dropped with a correction signal with which the sum of the signals for the three phases is made to be zero if any one of the instantaneous values of the load currents of the corresponding phases is larger than a predetermined value or if any of the instantaneous values of the inverter currents of the corresponding phases is larger than a predetermined value, an effect can be obtained in addition to the effect obtainable from the thirty-eighth embodiment in that the load current and the inverter current can be limited to be smaller than corresponding predetermined values at high speed and without coherence due to the response of the voltage control loop.

Since the fiftieth embodiment is arranged in such a manner that the PWM voltage command in a case of a three-phase and three-wire type is instantaneously dropped with a correction signal with which the sum of the signals for the three phases is made to be zero if any one of the instantaneous values of the load currents of the corresponding phases is larger than a predetermined value, an effect can be obtained in addition to the effect obtainable from the forty-first embodiment in that the load current can instantaneously be limited to be smaller than a predetermined value and without coherence due to the response of the PWM circuit.

Since the fifty-first embodiment is arranged in such a manner that the PWM voltage command in a case of a three-phase and three-wire type is instantaneously dropped with a correction signal with which the sum of the signals for the three phases is made to be zero if any one of the instantaneous values of the inverter currents of the corresponding phases is larger than a predetermined value, an effect can be obtained in addition to the effect obtainable from the forty-first embodiment in that the inverter current can instantaneously be limited to be smaller than a predetermined value without coherence clue to the response of the PWM circuit.

Since the fifty-second embodiment is arranged in such a manner that the PWM voltage command in a case of a three-phase and three-wire type is instantaneously dropped with a correction signal with which the sum of the signals for the three phases is made to be zero if any one of the instantaneous values of the load currents of the corresponding phases is larger than a predetermined value or if any of the instantaneous values of the inverter currents of the corresponding phases is larger than a predetermined value, an effect can be obtained in addition to the effect obtainable from the forty-first embodiment in that the load current and the inverter current can instantaneously be limited to be smaller than corresponding predetermined values without coherence due to the response of the PWM circuit.

What is claimed is:

1. A control apparatus for controlling a power converter having a plurality of switching devices and enabling AC-converted output to be obtained to supply arbitrary AC outputs to a load, said apparatus for controlling a power converter comprising:

voltage command value generating means for generating a voltage command voltage to be transmitted from said power converter including:
    a reference sine-wave oscillation circuit for generating reference sine-waves,
    a command amplitude value generating means for generating a command amplitude value for commanding the amplitude of the voltage to be transmitted from said power converter, and
    a multiplier for multiplying the referenced sine-wave and the command amplitude value;
    voltage control means for controlling a plurality of switching devices of said power converter in accordance with command voltage level;
    electric current detection means for detecting an output electric current to be supplied from said power converter to said load; and
    electric current limiting means for restricting said command voltage level to be supplied to said voltage control means in accordance with a value detected by said electric current detection means.

2. A control apparatus according to claim 1 further comprising a filter including a serial reactor and a capacitor for filtering an AC output from said power converter.

3. A control apparatus according to claim 2 wherein said electric current detection means is a first electric-current detector connected between said power converter and said serial reactor of said filter and arranged to detect a converter electric current transmitted from said power converter.

4. A control apparatus according to claim 2 wherein said electric current detection means is a second electric-current detector connected between said serial reactor of said filter and said load and arranged to detect a load electric current to be supplied to said load.

5. A control apparatus according to claim 2 wherein said electric current detection means includes
    a first electric-current detector connected between said power converter and said serial reactor of said filter and arranged to detect a converter electric current transmitted from said power converter, and
    a second electric-current detector connected between said serial reactor of said filter and said load and arranged to detect a load electric current to be supplied to said load.

6. A control apparatus according to claim 1 wherein said electric current limiting means includes
    an average value detection circuit for calculating an average value of values detected by said electric current detection means,
    a limiting circuit for subjecting said calculating average value and a predetermined value to a comparison and transmitting a deviation between said two values if said average value exceeds said predetermined value.

7. A control apparatus according to claim 6 wherein said electric current limiting means includes first transfer means for restricting an output from said limiting means with a predetermined impedance.

8. A control apparatus according to claim 1 wherein said electric current limiting means includes a first subtracter for subtracting said deviation between a value detected by said electric current detection means and said predetermined value from said command amplitude value.

9. A control apparatus according to claim 5 wherein said electric current limiting means includes a first limiting circuit for subjecting a value detected by said first electric current detector and said first predetermined value to a comparison and transmitting a deviation between said two values if said detected value exceeds said first .predetermined value, a second limiting circuit for subjecting a value detected by said second electric current detector and said second predetermined value to a comparison and transmitting a deviation between said two values if said detected value exceeds said second predetermined value, and a selection circuit for selecting an output signal from said first limiting circuit and that from said second limiting circuit that has a larger absolute value.

10. A control apparatus according to claim 9 wherein said electric current limiting means includes; a first average-value detection circuit for calculating an average value of values detected by said first electric-current detector and a second average-value detection circuit for calculating an average value of values detected by said second electric-current detector, wherein said first limiting circuit subjects said average value calculated by said first average-value detection circuit and said first predetermined value to a comparison and, if said average value exceeds said first predetermined value, transmits a deviation between said two values, and said second limiting circuit subjects said average value calculated by said second average-value detection circuit and said second predetermined value to a comparison and transmits a deviation between said two values if said average value exceeds said second predetermined value.

11. A control apparatus according to claim 10 wherein said electric current limiting means includes first and second transfer function circuits for controlling outputs from said first and second limiting circuits with a predetermined impedance, and said selection circuit selects an output signal from said first transfer function circuit or that from said second transfer function circuit that has a larger absolute value.

12. A control apparatus according to claim 1 wherein said voltage control means includes a voltage detector for detecting output voltage from said power converter, a second subtracter for calculating a deviation between said detected output voltage and the command voltage level, a PWM circuit for generating a PWM signal in accordance with said calculated deviation, and a drive circuit for operating said plurality of switching devices of said power converter in response to said PWM signal.

13. A control apparatus according to claim 1 wherein said electric current limiting means includes a third subtracter for subtracting a deviation between a value detected by said electric current detection means and a predetermined value from the command voltage level.

14. A control apparatus according to claim 12 wherein said electric current limiting means includes a fourth subtracter for subtracting a deviation between a value detected by said electric current detection means and a predetermined value from said deviation calculated by said second subtracter.

15. A control apparatus according to claim 1 wherein said electric current limiting means is second transfer function means having a predetermined impedance value.

16. A control apparatus according to claim 15 wherein said electric current limiting means includes extracting means for permitting only specific frequency component of an output electric current detected by said electric current detection means to pass through and transmitting the same to said second transfer function means.

17. A control apparatus according to claim 5 wherein said electric current limiting means restricts said command voltage level to be supplied to said voltage control means in accordance with said value detected by said first electric-current detector and restricts said command voltage level to be supplied to said voltage control means if said value detected by said second electric-current detector has exceeded said second predetermined value.

18. A control apparatus according to claim 3 wherein said electric current limiting means restricts said command voltage level to be supplied to sad voltage control means in accordance with said value detected by said first electric-current detector and decreases, if said value detected by said first electric-current detector has exceeded said first predetermined value, said command voltage level by a deviation between said two values.

19. A control apparatus according to claim 5 wherein said electric current limiting means restricts said commanded voltage level to be supplied to said voltage control means in accordance with said value detected by said first electric-current detector and decreases said commanded voltage level if said value detected by said first electric-current detector or said value detected by second electric-current detector has exceeded said first or second predetermined value, said electric current limiting means decreasing said commanded voltage level in accordance with a larger deviation of deviations from said two predetermined values.

20. A control apparatus according to claim 3 wherein said electric current limiting means includes compensating means for transmitting voltage for compensating voltage drop occurring due to the serial reactor of said filter in accordance with said converter electric current detected by said first electric current detector, and second transfer function means for decreasing, with a predetermined impedance, said converter electric current detected by said first electric-current detector, said electric current limiting means being arranged to restrict said command voltage level to be supplied to said voltage control means in accordance with an output from said compensating means and that from said second transfer function means.

21. A control apparatus according to claim 3 wherein said electric current limiting means includes compensating means for transmitting voltage for compensating voltage drop occurring due to the serial reactor of said filter in accordance with said converter electric current detected by said first electric current detector, second transfer function means for decreasing said converter electric current detected by said first electric current detector with a predetermined impedance, and a first limiting circuit arranged in such a manner that, if said converter electric current detected by said first electric current detector has exceeded said first predetermined value, said first limiting circuit transmits a deviation between said two values, and said electric current limiting means restricts said commanded voltage level to be supplied to said voltage control means in accordance with an output from said compensating means, an output from said second transfer function means and an output from said first limiting circuit.

22. A control apparatus according to claim 5 wherein said electric current limiting means includes compensating means for transmitting voltage for compensating voltage drop occurring due to the serial reactor of said filter in accordance with said converter electric current detected by said first electric current detector, second transfer function means for decreasing said converter electric current detected by said first electric current detector with a predetermined impedance, and a second limiting circuit arranged in such a manner that, if said load electric current detected by said second electric current detector has exceeded said second predetermined value, said second limiting circuit transmits a deviation between said two values, and said electric current limiting means restricts said commanded voltage level to be supplied to said voltage control means in accordance with an output from said compensating means, an output from said second transfer function means and an output from said second limiting circuit.

23. A control apparatus according to claim 5 wherein said electric current limiting means includes compensating means for transmitting voltage for compensating voltage drop occurring due to the serial reactor of said filter in accordance with said converter electric current detected by said first electric current detector, second transfer function means for decreasing said converter electric current detected by said first electric current detector with a predetermined impedance, a first limiting circuit arranged in such a manner that, if said converter electric current detected by said first electric-current detector has exceeded said first predetermined value, said first limiting circuit transmits a deviation between said two values, a second limiting circuit arranged in such a manner that, if said load electric current detected by said second electric-current detector has exceeded said second predetermined value, said second limiting circuit transmits a deviation between said two values, and a selection circuit for selecting an output signal from said first limiting circuit and an output signal from said second limiting circuit that has a larger absolute value, and said electric current limiting means restricts said commanded voltage level to be supplied to said voltage control means in accordance with an output from said compensating means, an output from said second transfer function means and an output from said selection circuit.

24. A control apparatus according to claim 1 for controlling a power converter having a plurality of switching devices and enabling a converted three-phase AC output to be obtained.

25. A control apparatus according to claim 24 wherein said electric current detection means detects an electric current for each phase, and said electric current limiting means includes electric current compensating means for performing correction in such a manner that the sum of output electric currents for the three phases is made to be zero if any one of values of said electric currents for the three phases detected by said electric current detection means has exceeded a predetermined value, said electric current limiting means restricting said command voltage level to be supplied to said voltage control means in accordance with an output from said electric current compensating means.

* * * * *